United States Patent
Hyde et al.

(10) Patent No.: US 8,634,648 B2
(45) Date of Patent: *Jan. 21, 2014

(54) REPORTING INFORMATIONAL DATA INDICATIVE OF A POSSIBLE NON-IMAGED PORTION OF A SKIN

(75) Inventors: Roderick A. Hyde, Redmond, WA (US); Jordin T. Kare, Seattle, WA (US); Eric C. Leuthardt, St. Louis, MO (US); Erez Lieberman, Cambridge, MA (US); Dennis J. Rivet, Chesapeake, VA (US); Elizabeth A. Sweeney, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/374,005

(22) Filed: Dec. 7, 2011

(65) Prior Publication Data

US 2013/0148870 A1    Jun. 13, 2013

Related U.S. Application Data

(63) Continuation-in-part of application No. 13/374,002, filed on Dec. 7, 2011, and a continuation-in-part of application No. 13/374,000, filed on Dec. 7, 2011, which is a continuation-in-part of application No. 13/373,998, filed on Dec. 7, 2011.

(51) Int. Cl.
*G06K 9/46* (2006.01)
*G06K 9/00* (2006.01)

(52) U.S. Cl.
USPC ............................... 382/190; 382/128; 378/1

(58) Field of Classification Search
None
See application file for complete search history.

(56) References Cited

U.S. PATENT DOCUMENTS

| | | | |
|---|---|---|---|
| 4,361,830 A | 11/1982 | Honma et al. | |
| 4,685,143 A | 8/1987 | Choate | |
| 4,961,231 A | 10/1990 | Nakayama et al. | |
| 5,016,173 A * | 5/1991 | Kenet et al. | 382/128 |
| 5,054,094 A | 10/1991 | Barski | |
| 5,627,907 A * | 5/1997 | Gur et al. | 382/132 |
| 5,748,776 A * | 5/1998 | Yoshida | 382/195 |
| 5,836,872 A * | 11/1998 | Kenet et al. | 600/306 |
| 5,905,807 A * | 5/1999 | Kado et al. | 382/118 |

(Continued)

OTHER PUBLICATIONS

"Edge Detection"; Wikipedia; printed on Oct. 13, 2011; pp. 1-8.

(Continued)

*Primary Examiner* — Manav Seth
(74) *Attorney, Agent, or Firm* — Dorsey & Whitney LLP

(57) ABSTRACT

Described embodiments include a system, method, and program product. A described system includes a circuit that extracts a human-perceivable feature included in each medical skin image of a plurality of medical skin images. Each medical skin image includes a respective portion of a region of interest of a surface of the skin of the individual human, and was acquired by a handheld device. A circuit determines a substantial correspondence between (x) a human-perceivable feature included in a border region segment of a selected medical skin image and (y) a human-perceivable feature included in each medical skin image of the plurality of medical skin images other than the selected medical skin image. A circuit gathers the determined substantial correspondences. A circuit outputs informational data indicative of a possible non-imaged portion of the region of interest of the skin of the individual human adjacent to the selected medical skin image.

40 Claims, 33 Drawing Sheets

(56) References Cited

U.S. PATENT DOCUMENTS

| | | | |
|---|---|---|---|
| 6,067,369 A * | 5/2000 | Kamei | 382/125 |
| 6,081,612 A | 6/2000 | Gutkowicz-Krusin et al. | |
| 6,208,749 B1 | 3/2001 | Gutkowicz-Krusin et al. | |
| 6,243,492 B1 * | 6/2001 | Kamei | 382/181 |
| 6,332,041 B1 | 12/2001 | Yoshida | |
| 6,539,099 B1 | 3/2003 | Kellner | |
| 6,826,316 B2 * | 11/2004 | Luo et al. | 382/305 |
| 6,885,761 B2 * | 4/2005 | Kage | 382/118 |
| 6,928,231 B2 | 8/2005 | Tajima | |
| 7,397,934 B2 | 7/2008 | Bloch et al. | |
| 7,466,846 B2 | 12/2008 | David et al. | |
| 7,787,697 B2 * | 8/2010 | Ritzau et al. | 382/224 |
| 2004/0218792 A1 | 11/2004 | Spoonhower et al. | |
| 2005/0033142 A1 | 2/2005 | Madden et al. | |
| 2008/0146887 A1 | 6/2008 | Rao et al. | |
| 2008/0161661 A1 | 7/2008 | Gizewski | |
| 2008/0194928 A1 | 8/2008 | Bandic et al. | |
| 2008/0226151 A1 | 9/2008 | Zouridakis et al. | |
| 2009/0118600 A1 | 5/2009 | Ortiz et al. | |
| 2010/0105102 A1 | 4/2010 | Hanes et al. | |
| 2010/0185064 A1 | 7/2010 | Bandic et al. | |
| 2010/0254581 A1 | 10/2010 | Neeser et al. | |
| 2011/0110579 A1 | 5/2011 | Walford | |

OTHER PUBLICATIONS

"Feature Extraction (winter semester 2005/2006)"; Feature Extraction Course; bearing dates of 2005/2006, printed on Oct. 12, 2011; pp. 1-12; located at: http://clopinet.com/isabelle/Projects/ETH/#Introduction.

Gebhardt, Chris; "RCC Imagery Analysis Procedures Explored in STS-127 TPS Documentation"; NASASpaceFlight.com; bearing dates of Jul. 23, 2009 and 2005-2009, printed on Oct. 13, 2011; pp. 1-6; NASASpaceFlight.com.

Hauber et al.; "Controlled Topographic Image Mosaics from Combination of Viking Orbiter Images and Mars Orbiter Laser Altimeter Data"; International Archives of Photogrammetry and Remote Sensing; bearing a date of 2000; pp. 360-364; vol. XXXIII, Part B4; Amsterdam.

"PhotoModeler Dec. 2010 Newsletter"; PhotoModeler Newsletter, Measuring & Modeling the Real World.; bearing dates of Dec. 2010 and 2010, printed on Oct. 13, 2011; pp. 1-3; Eos Systems Inc.

Qureshi et al.; "Evaluation of digital skin images submitted by patients who received practical training or an online tutorial"; Journal of Telemedicine and Telecare; bearing dates of Jun. 26, 2005 and 2006; pp. 79-82; vol. 12, No. 2.

"Zero Crossing Detector"; Feature Detectors—Zero Crossing Detector; printed on Oct. 13, 2011; pp. 1-6.

* cited by examiner

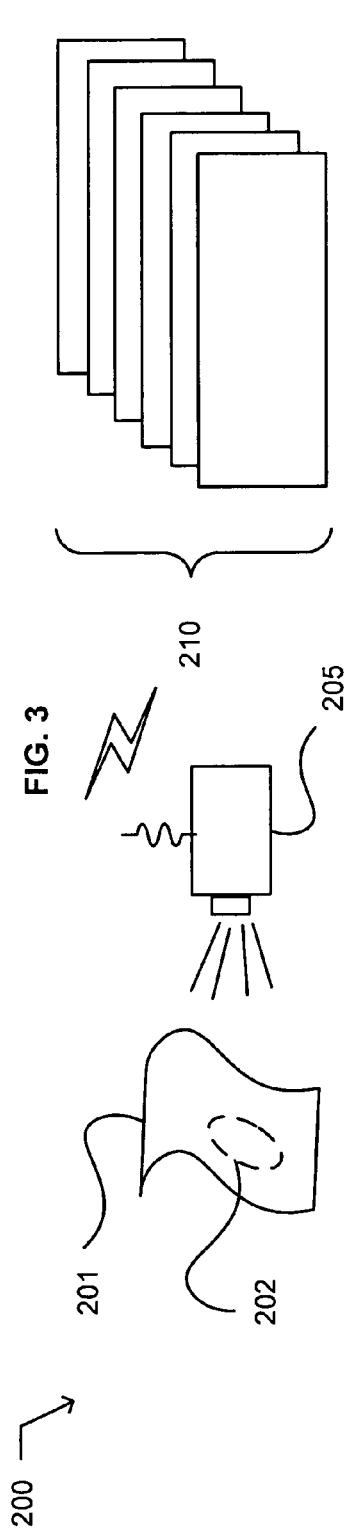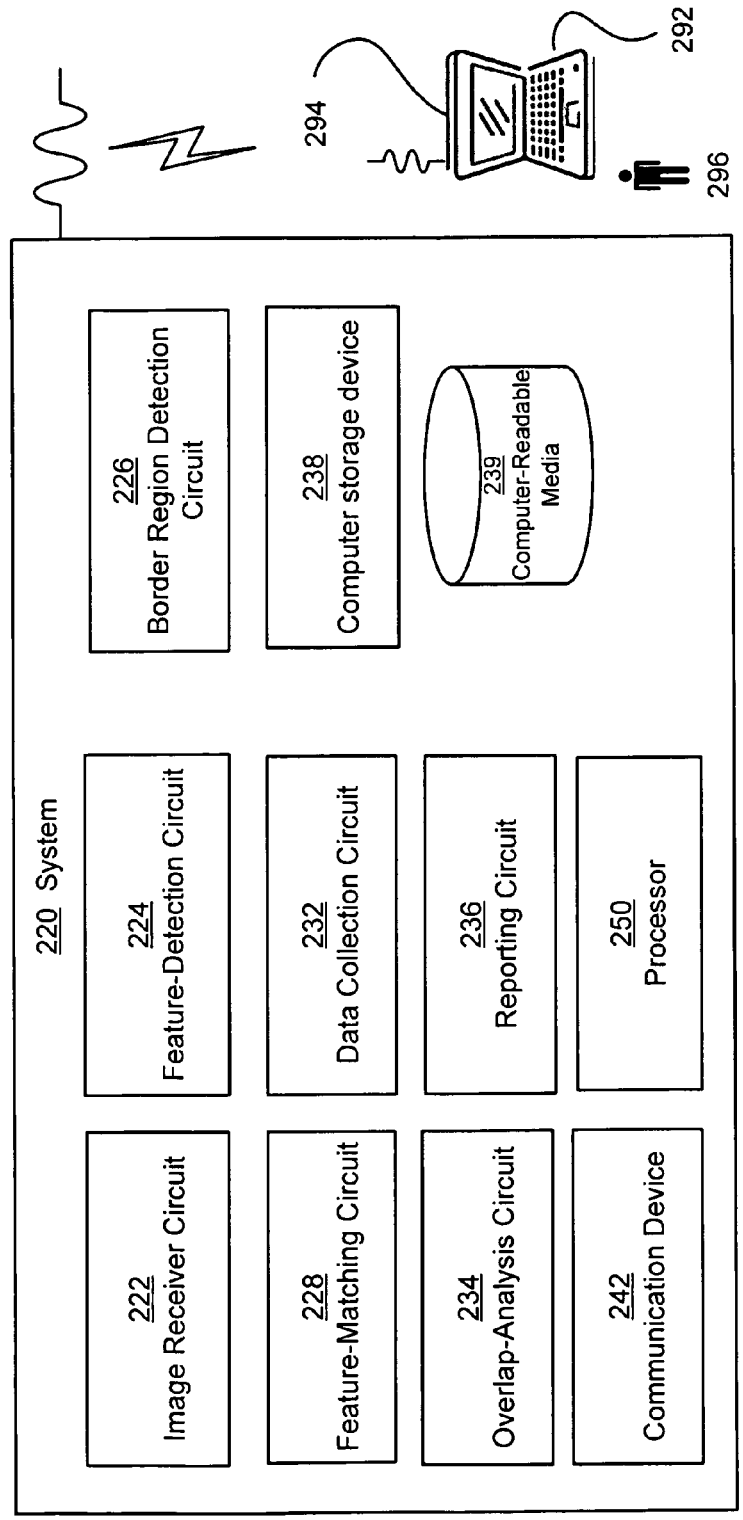
FIG. 3

410 Computer-readable media.

420 Program instructions which, when executed by a processor of a computing device, cause the computing device to perform a process including:

(a) at least one respective perceivable feature included in each digital image of a plurality of digital images, the each digital image of the plurality of digital images includes a respective portion of a region of interest of a surface;

(b) determining a substantial correspondence between (x) an extracted perceivable feature included in a border region segment of a selected digital image of the plurality of digital images and (y) an extracted at least one respective perceivable feature included in each digital image of the plurality of digital images other than the selected digital image;

(c) gathering the determined substantial correspondences for the extracted perceivable feature included in the border region segment of the selected digital image; and (d) outputting informational data indicative of a possible non-imaged portion of the region of interest of the surface, the informational data responsive to an absence of a determined substantial correspondence between the extracted perceivable feature included in the border region segment of the selected digital image and the extracted at least one respective perceivable feature included in each digital image of the plurality of digital images other than the selected digital image.

422 Transforming the informational data into a particular visual depiction of a possible non-imaged portion of the region of interest of the surface, and outputting the transformed informational data.

424 Providing a notification at least partially based on the informational data to at least one of a human, computer, or system.

412 The computer-readable media includes a tangible computer-readable media.

414 The computer-readable media includes a communications media.

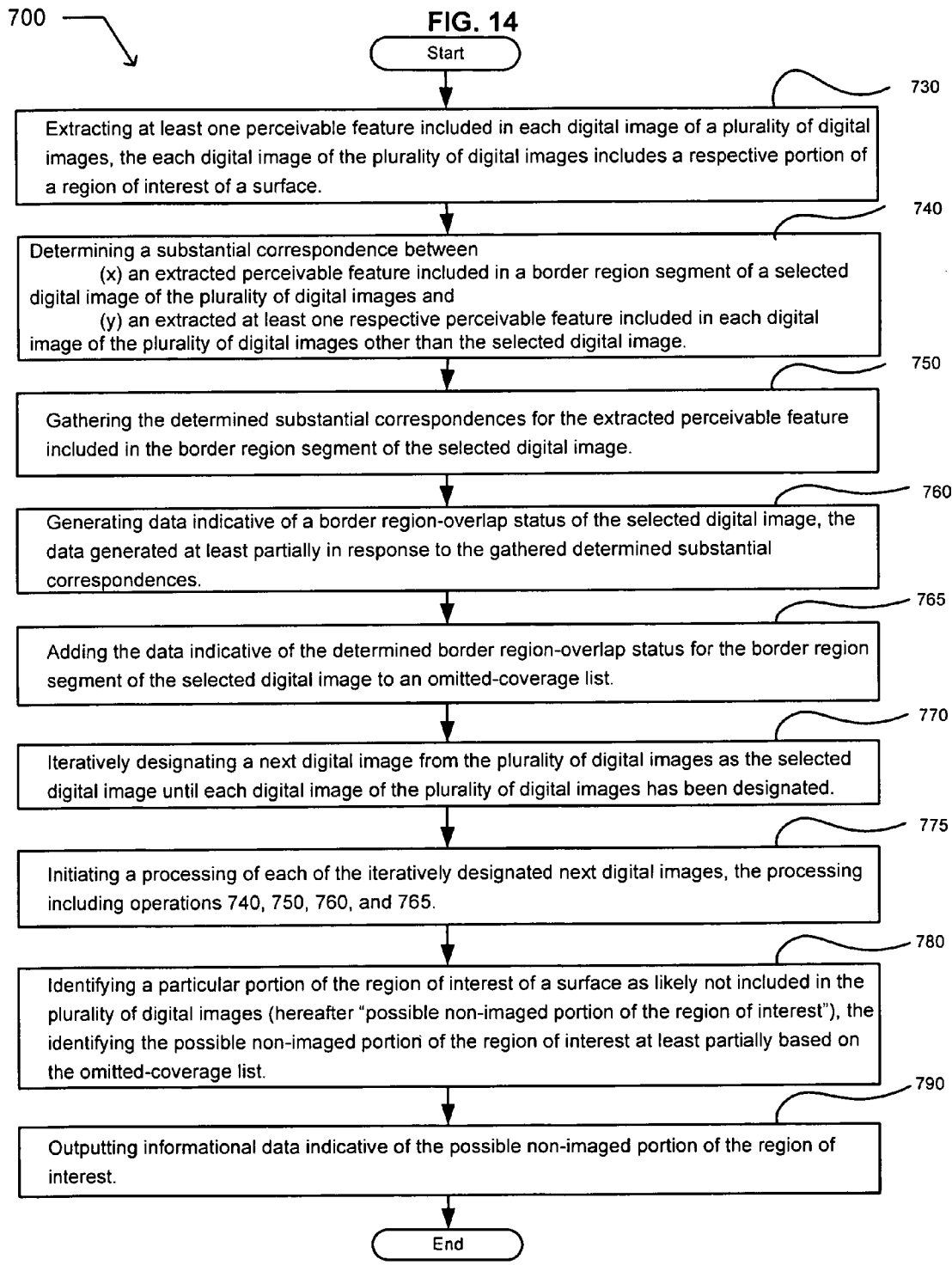

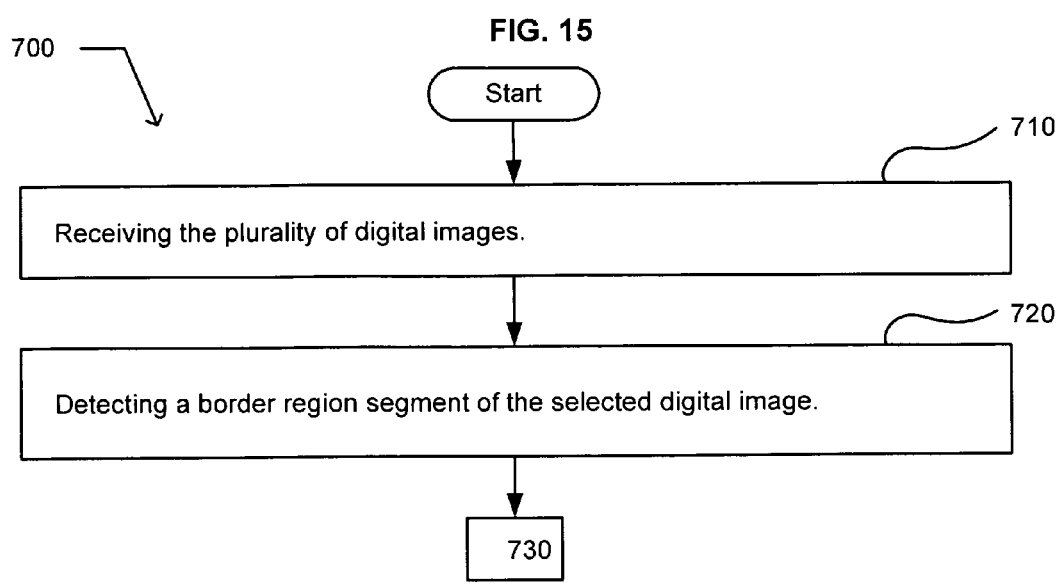

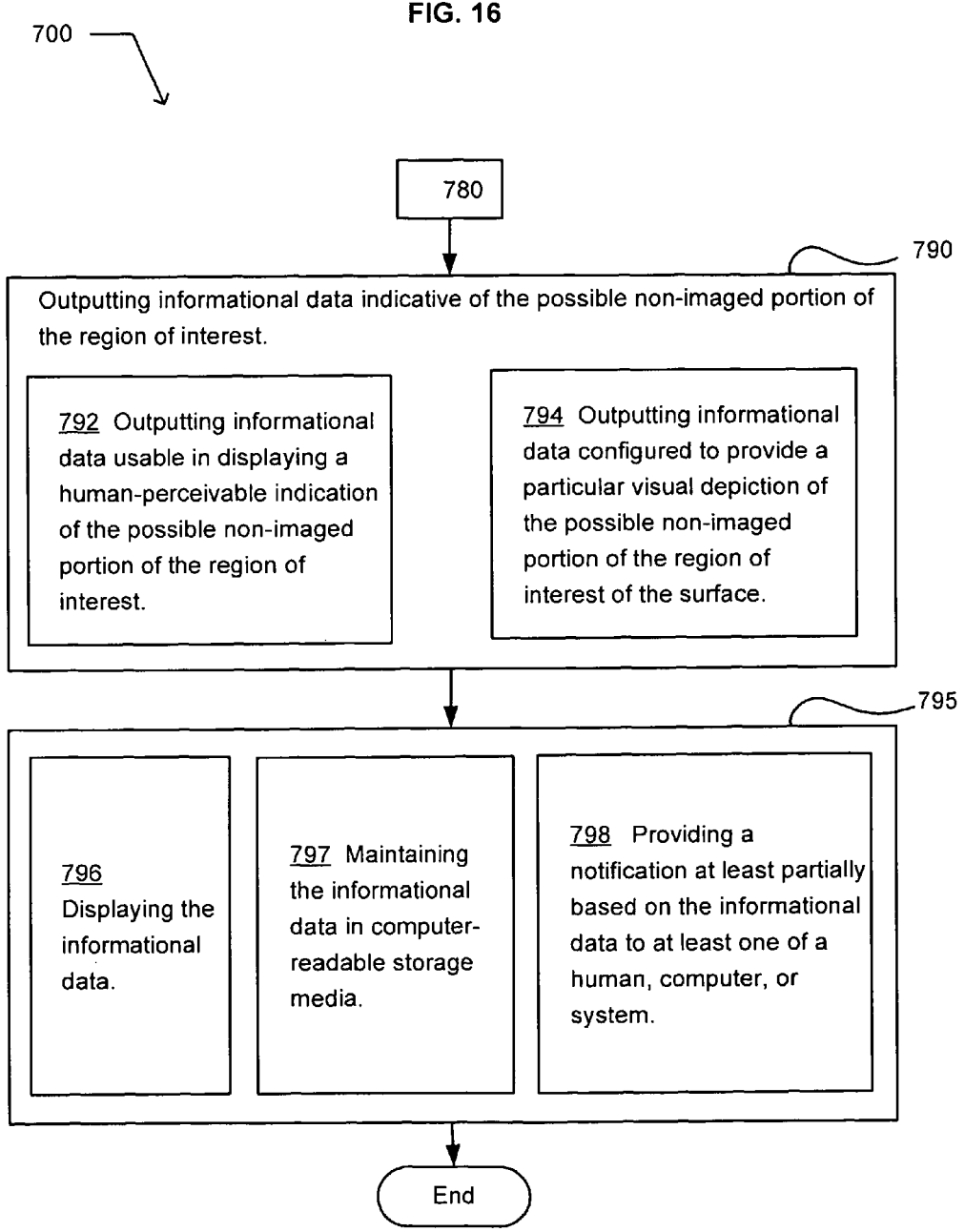

810 A computer-readable media.

820 Program instructions which, when executed by a processor of a computing device, cause the computing device to perform a process including:

(a) extracting at least one respective perceivable feature included in each digital image of a plurality of digital images, the each digital image of the plurality of digital images includes a respective portion of a region of interest of a surface;

(b) determining a substantial correspondence between (x) an extracted perceivable feature included in a border region segment of a selected digital image of the plurality of digital images and (y) an extracted at least one respective perceivable feature included in the each digital image of the plurality of digital images other than the selected digital image;

(c) gathering the determined substantial correspondences for the extracted perceivable feature included in the border region segment of the selected digital image;

(d) generating data indicative of a border region-overlap status of the selected digital image, the data generated at least partially in response to the gathered determined substantial correspondences;

(e) adding the data indicative of the determined border region-overlap status for the border region segment of the selected digital image to an omitted-coverage list;

(f) iteratively designating a next digital image from the plurality of digital images as the selected digital image until each digital image of the plurality of digital images has been designated;

(g) processing of each of the iteratively designated next digital images, the processing including operations (b), (c), (d), and (e);

(h) identifying a particular portion of the region of interest as likely not included in the plurality of digital images (hereafter "possible non-imaged portion of the region of interest"), the identifying the possible non-imaged portion of the region of interest at least partially based on the omitted-coverage list; and (i) outputting informational data indicative of the possible non-imaged portion of the region of interest.

822 (i) Transforming the informational data into a particular visual depiction of a possible non-imaged portion of the region of interest of the surface, and outputting the transformed informational data.

824 (i) Providing a notification at least partially based on the informational data to at least one of a human, computer, or system.

812 The computer-readable media includes a tangible computer-readable media.

814 The computer-readable media includes a communications media.

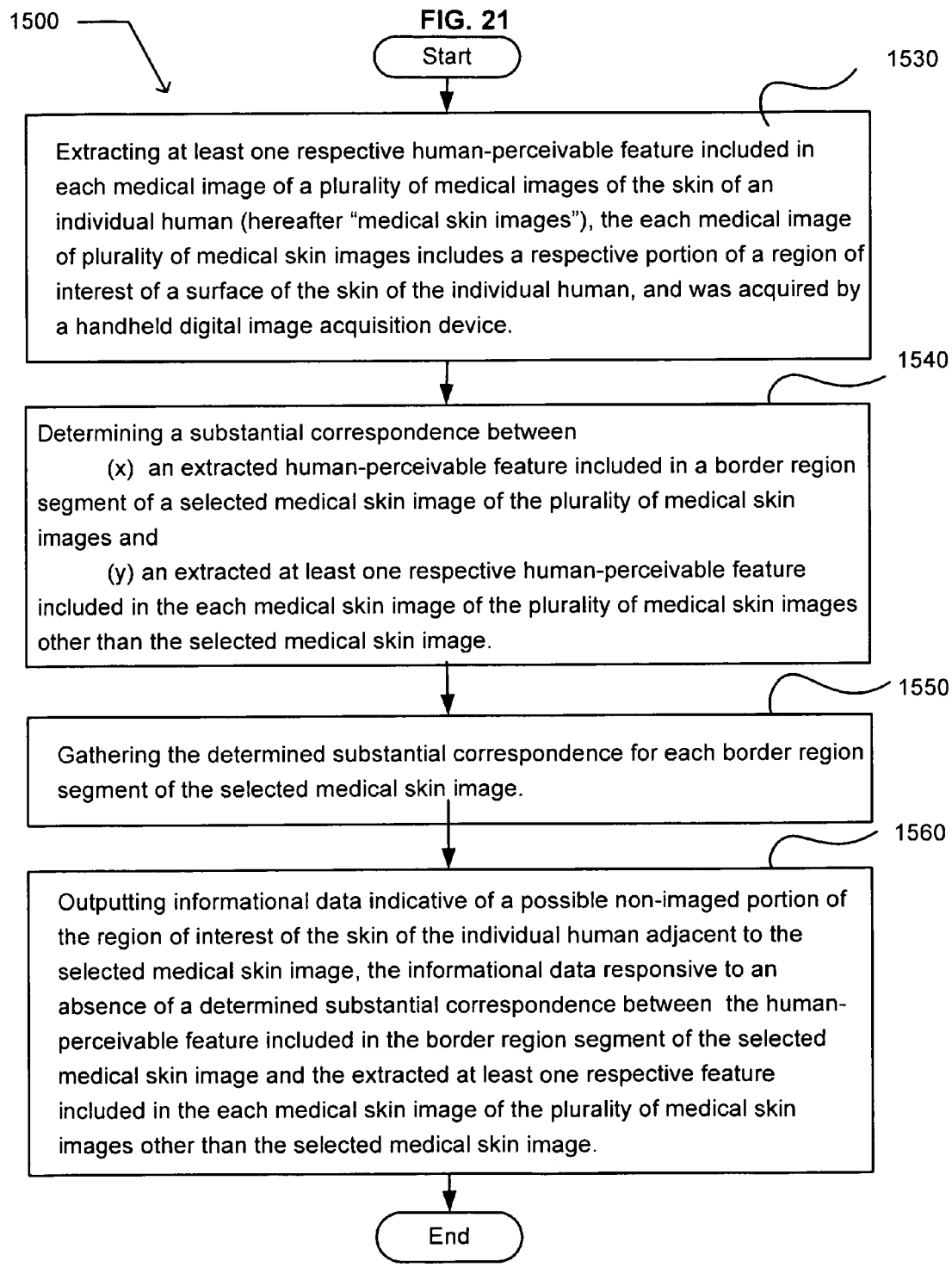

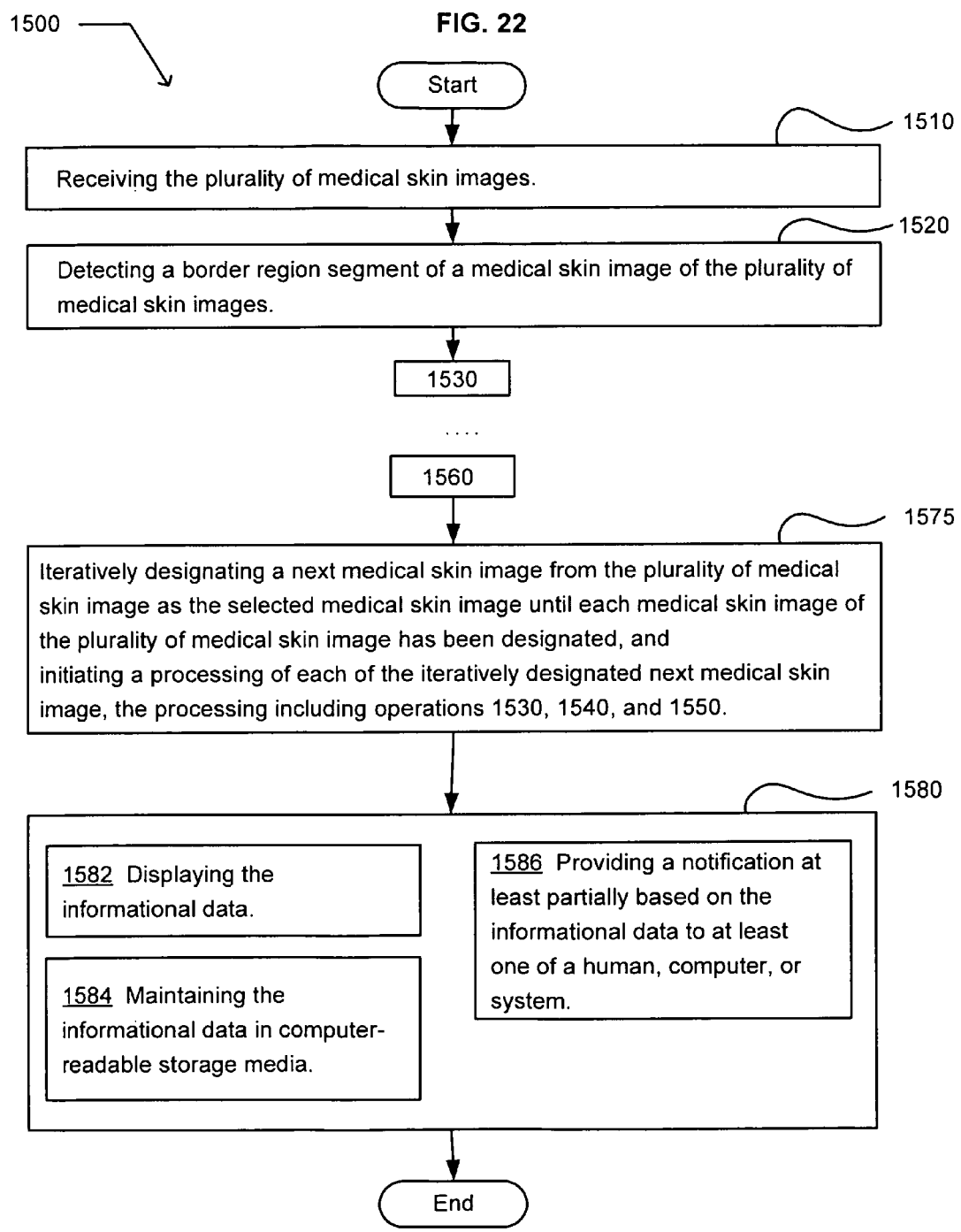

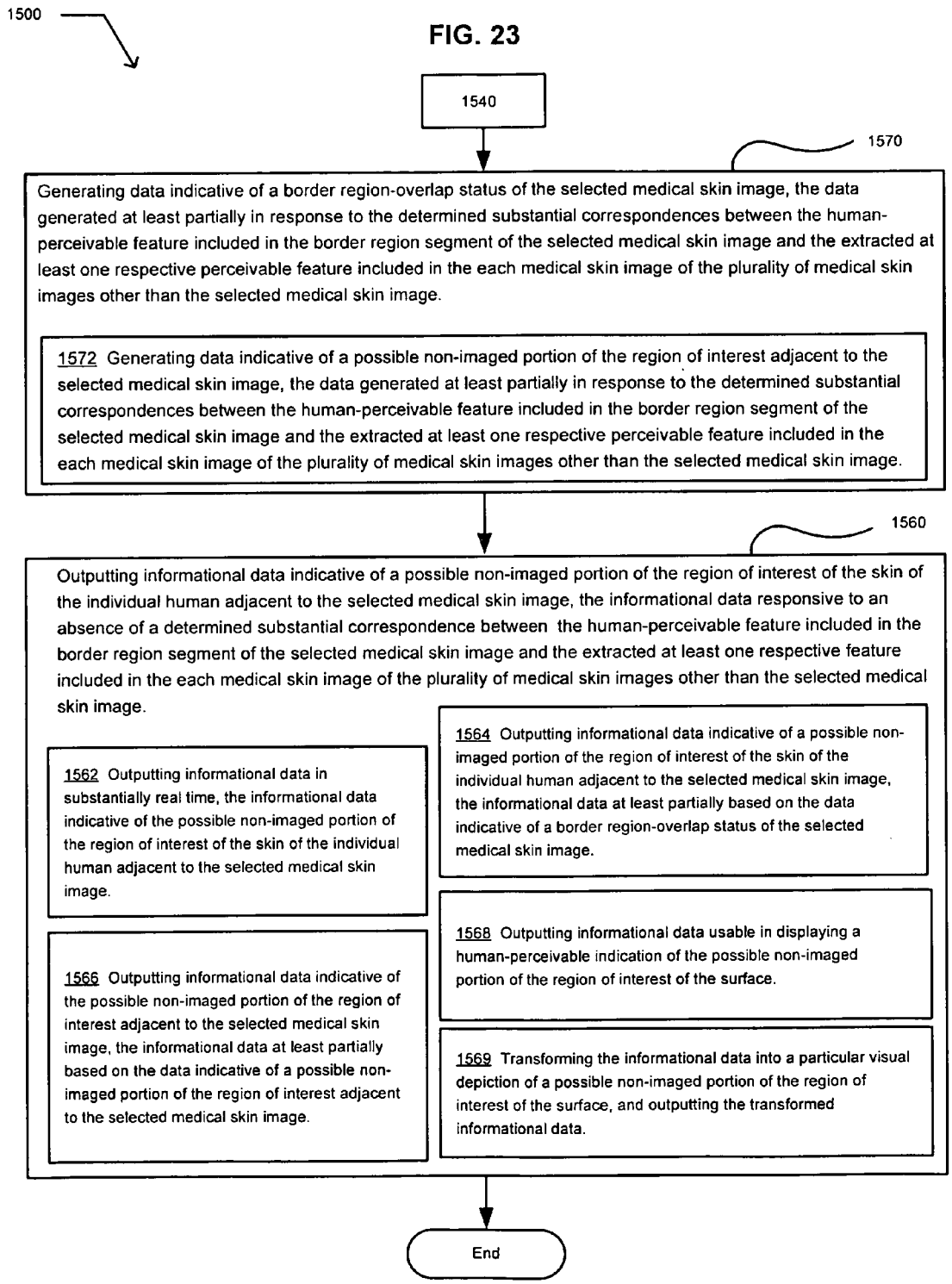

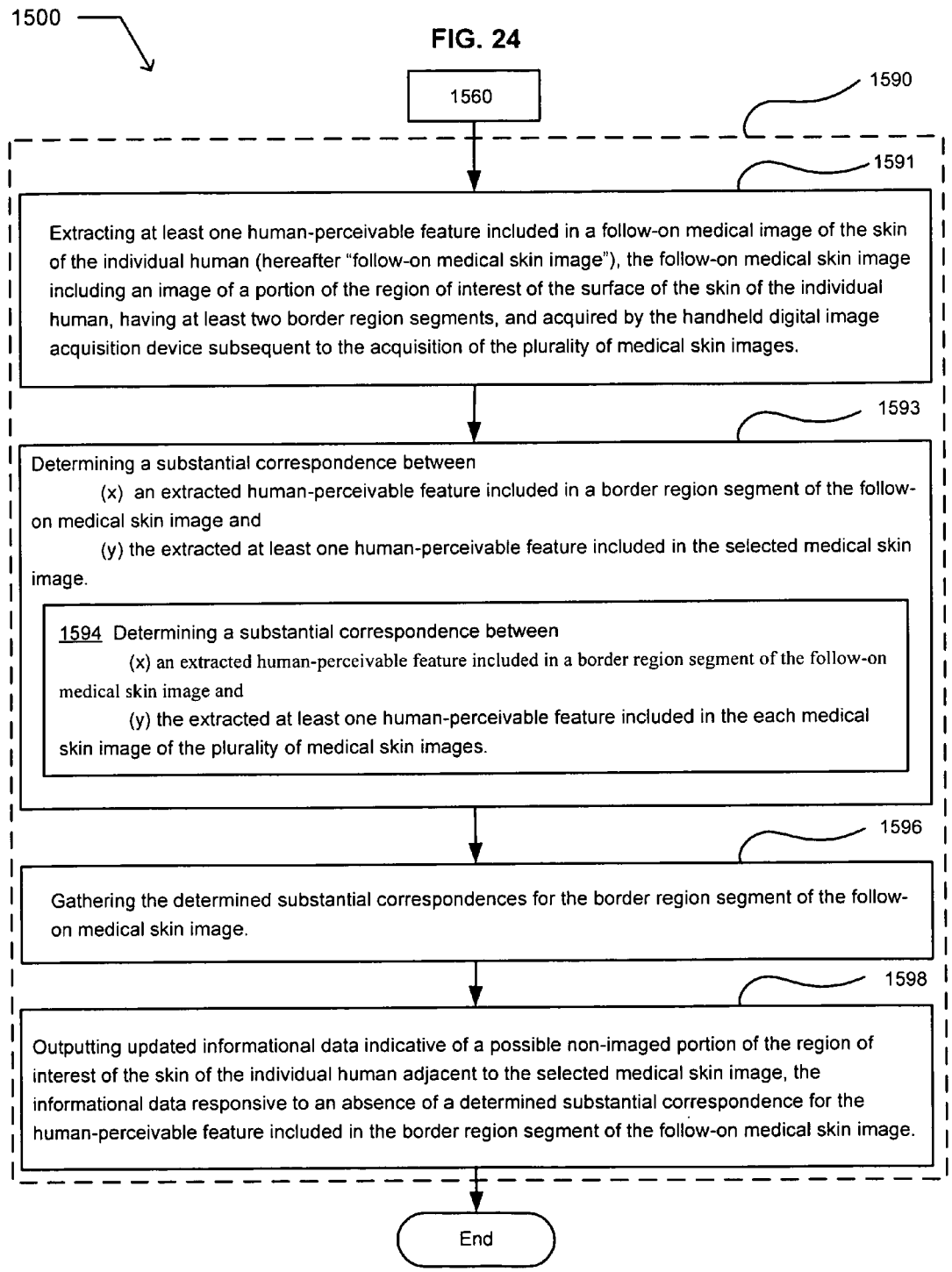

1610 Computer-readable media.

1620 Program instructions which, when executed by a processor of a computing device, cause the computing device to perform a process including:

(a) extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;

(ii) determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image;

(iii) gathering the determined substantial correspondences for the border region segment of the selected medical skin image; and (iv) outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

1612 The computer-readable media includes tangible computer-readable media.

1614 The computer-readable media includes communications media.

1610 A computer-readable media.

1620 Program instructions which, when executed by a processor of a computing device, cause the computing device to perform a process including:

(a) extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;

(b) determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image;

(c) gathering the determined substantial correspondences for the border region segment of the selected medical skin image; and (d) outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

1622 Receiving the plurality of medical skin images.

1624 Detecting a border region segment of the at least two border region segments of a medical skin image of the plurality of medical skin images.

1626 Displaying the informational data.

1628 Maintaining the informational data in computer-readable storage media.

1710 Means for extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device.

1720 Means for determining a substantial correspondence between (x) a extracted human-perceivable feature included in a border region segment of a selected medical skin image of the plurality of medical skin images and (y) an extracted at least one respective human-perceivable feature included in the each medical skin image of the plurality of medical skin images other than the selected medical skin image.

1730 Means for gathering the determined substantial correspondence for each border region segment of the selected medical skin image.

1740 Means for outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

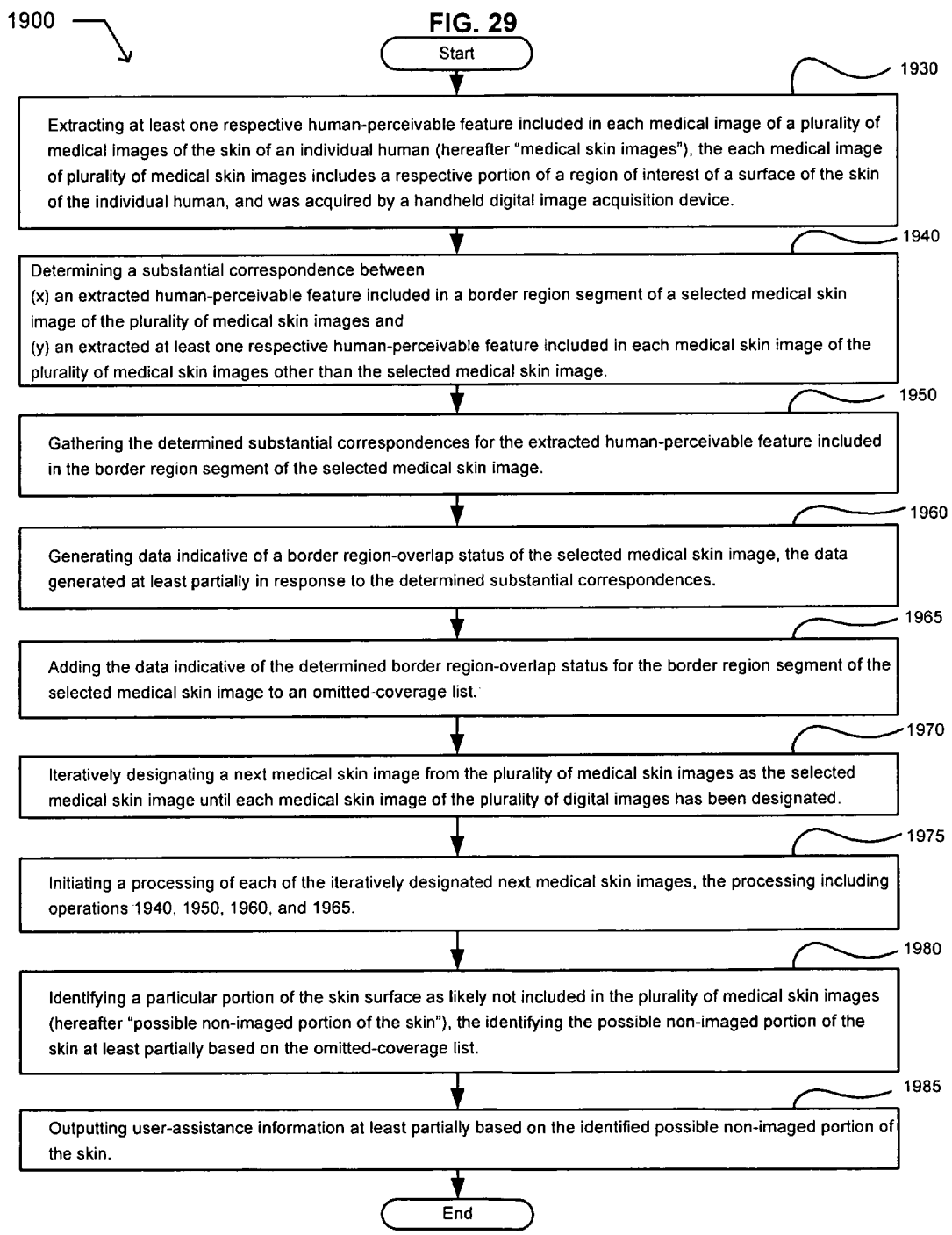

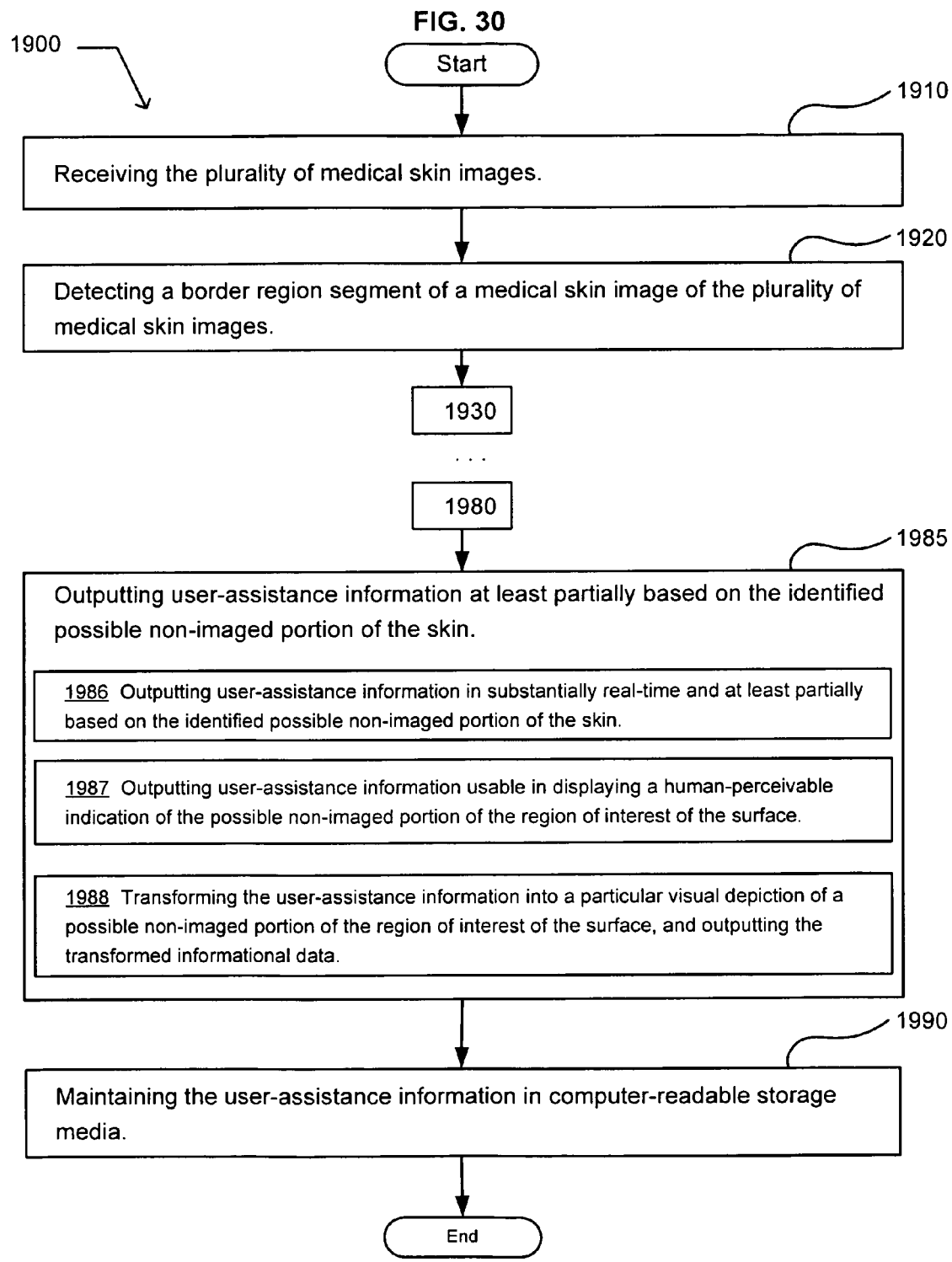

2010 Computer-readable media.

2020 Program instructions which, when executed by a processor of a computing device, cause the computing device to perform a process including:

(i) extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;

(ii) determining a substantial correspondence between (x) an extracted human-perceivable feature included in a border region segment of a selected medical skin image of the plurality of medical skin images and (y) an extracted at least one respective human-perceivable feature included in each medical skin image of the plurality of medical skin images other than the selected medical skin image;

(iii) gathering the determined substantial correspondences for the extracted human-perceivable feature included in the border region segment of the selected medical skin image;

(iv) generating data indicative of a border region-overlap status of the selected medical skin image, the data generated at least partially in response to the determined substantial correspondences;

(v) adding the data indicative of the determined border region-overlap status for the border region segment of the selected medical skin image to an omitted-coverage list;

(vi) iteratively designating a next medical skin image from a plurality of medical skin images as the selected medical skin image until each medical skin image of the plurality of medical skin images has been designated;

(vii) processing of each of the iteratively designated next medical skin images, the processing including operations (ii), (iii), (iv), and (v);

(viii) identifying a particular portion of the skin surface as likely not included in the plurality of medical skin images (hereafter "possible non-imaged portion of the skin"), the identifying the possible non-imaged portion of the skin at least partially based on the omitted-coverage list; and (ix) outputting user-assistance information at least partially based on the identified possible non-imaged portion of the skin.

2012 The computer-readable media includes tangible computer-readable media.

2014 The computer-readable media includes communications media.

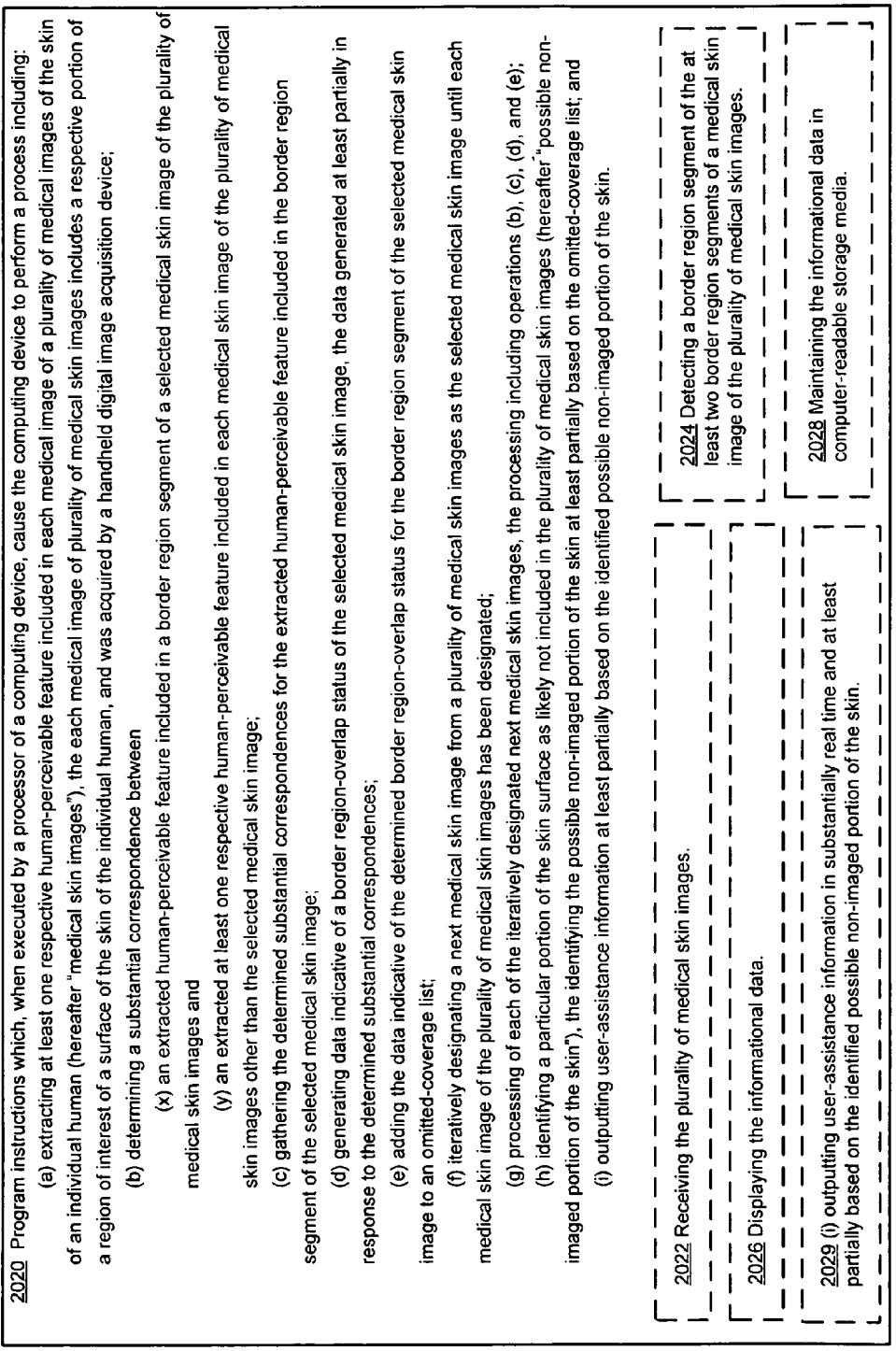

REPORTING INFORMATIONAL DATA INDICATIVE OF A POSSIBLE NON-IMAGED PORTION OF A SKIN

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 13/374,002, entitled INFORMATIONAL DATA INDICATIVE OF A POSSIBLE NON-IMAGED PORTION OF A REGION OF INTEREST, naming Roderick A. Hyde, Jordin T. Kare, Eric C. Leuthardt, Erez Lieberman, Dennis J. Rivet, Elizabeth A. Sweeney, Lowell L. Wood, Jr., as inventors, filed Dec. 7, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,000, entitled REPORTING INFORMATIONAL DATA INDICATIVE OF A POSSIBLE NON-IMAGED PORTION OF A REGION OF INTEREST, naming Roderick A. Hyde, Jordin T. Kare, Eric C. Leuthardt, Erez Lieberman, Dennis J. Rivet, Elizabeth A. Sweeney, Lowell L. Wood, Jr., as inventors, filed Dec. 7, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,998, entitled USER-ASSISTANCE INFORMATION AT LEAST PARTIALLY BASED ON AN IDENTIFIED POSSIBLE NON-IMAGED PORTION OF A SKIN, naming Roderick A. Hyde, Jordin T. Kare, Eric C. Leuthardt, Erez Lieberman, Dennis J. Rivet, Elizabeth A. Sweeney, Lowell L. Wood, Jr., as inventors, filed Dec. 7, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An example of an embodiment of environment 200 of FIG. 3 in use may include determining whether the plurality of digital images 210 covers the entire region of interest 202 of the surface 201, or whether there are any possible non-imaged portions of the region of interest that are not covered by the plurality of digital images. This may be useful when a surface has been imaged from several different locations rather than imaged from a relatively fixed or known location such as by satellite or aerial photography. Examples of imaging a surface from several different locations may include examining a surface of an object for perceivable defects, such as missing protective tiles on a spacecraft, or when examining the skin of a person or the surface of an internal organ of a person for diseases, conditions, or changes over time. It is anticipated that a person or machine examining a surface would like to know whether the plurality of digital images covers the entire region of interest of the surface, or whether there are possible non-imaged portions of the region of interest. It is further anticipated that a person or machine examining such a surface would like to know where any possible non-imaged portions of the region of interest are located so that the examination may be adjusted for that fact, or so that additional digital images of possible non-imaged portions of the region of interest may be acquired.

This example of the environment 200 in use includes, without limitation, an embodiment of the system 220 in use. In this example, the system includes an image receiver circuit 222 configured to receive the plurality of digital images 210. The plurality of digital images each includes a respective portion of the region of interest 202 of the surface 201. See FIG. 6. For example, the surface may include the skin of a person's back, or the lining of a person's stomach. To lay the ground work for determining whether there is possible non-imaged portion 218 of the region of interest of the surface in the plurality of digital images, the system finds at least one respective perceivable feature located anywhere in the field of view for each of the plurality of digital images, including the border regions of the digital images. To this end, the system includes a feature-detection circuit 224 configured to extract at least one perceivable feature included in each digital image of the plurality of digital images. For example, where the surface is the skin, an extracted perceivable feature may include a mole, a wrinkle, a fold, a human-vision perceivable discontinuity, a hair pattern, or a vein. The system includes a border region detection circuit 226 configured to detect a border region segment of a digital image. The dimensions of the border region segment may be selected for example as is appropriate for the resolution of digital images included in the plurality of digital images and the processing power of the system.

In this example of the system 220 in use, the system looks to see if there is a common perceivable feature included in both a border region segment of a selected digital image and in another digital image of the plurality of digital images. If there is no common perceivable feature, the system reports a possible non-imaged portion of the region of interest. For example, see FIGS. 5 and 6. In this regard, a feature-matching circuit 228 of the system looks for a common perceivable feature in both a border region segment of a selected digital image and anywhere in the field of view of another digital image of the plurality of digital images. The system accomplishes this by determining if a substantial correspondence exists between (x) a perceivable feature included in a border region segment of the selected digital image of the plurality of digital images and (y) at least one respective perceivable feature included in each digital image of the plurality of digital images other than the selected digital image. For example, the feature matching circuit may output a "0" if no substantial correspondence is found, and output a "1" if a substantial correspondence is found. In an embodiment, the system proceeds around the several border regions of the selected digital image and similarly determine a substantial correspondence for each respective feature included in the several border regions with respect to each digital image of the plurality of digital images other than the selected digital image. The system includes a data collection circuit 232 configured to gather the determined substantial correspondence in the form of "1" and "0" for the perceivable feature included in the border region segment of the selected digital image.

In this example of the system 220 in use, the system includes a reporting circuit 236 configured to output informational data indicative of a possible non-imaged portion of the region of interest adjacent to the selected digital image. The informational data is responsive to an absence of a determined substantial correspondence (all 0's) between the perceivable feature included in the border region segment of the selected digital image and at least one respective perceivable feature included in each digital image of the plurality of digital images other than the selected digital image. For example, the system in generating the informational data treats a determination of an absence of substantial correspondence (all 0's) for the perceivable feature of the border region segment of the selected digital image as an indication that there likely is no border region overlap with any other feature of the remaining digital images and outputs that there is a possible adjacent non-imaged portion. For example, the system in generating the informational data treats a determination of a substantial correspondence (at least a single 1) for the perceivable feature of the border region segment of the selected digital image as an indication that there likely is a possible border region overlap with at least one detected border region feature of the remaining digital images, concludes the adjacent portion is likely imaged, and does not output that there is a possible adjacent non-imaged portion.

For example, and without limitation, an embodiment of the subject matter described herein includes a system. In this embodiment, the system includes a feature-detection circuit configured to extract at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The system includes a feature-matching circuit configured to determine a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The system includes a data collection circuit configured to gather the determined substantial correspondences for the human-perceivable feature included in the border region segment of the selected medical skin image. The system includes a reporting circuit configured to output informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

In an embodiment, the system includes an image receiver circuit configured to receive the plurality of medical skin images. In an embodiment, the reporting circuit includes a reporting circuit configured to output the informational data in substantially real-time. In an embodiment, the system includes a border region detection circuit configured to detect a border region segment of a medical skin image of the plurality of medical skin images. In an embodiment, the system includes an overlap-analysis circuit configured to generate data indicative of a border region-overlap status of the selected medical skin image. The data is generated at least partially in response to the determined substantial correspondence between the perceivable feature included in the border region segment of the at least two border region segments of the selected medical skin image and at least one respective perceivable feature included in each medical skin image of the plurality of medical skin images other than the selected medical skin image. In an embodiment, the system is physically incorporated within the handheld digital image acquisition device. In an embodiment, the system is configured to wirelessly communicate with the handheld digital image acquisition device. In an embodiment, the system includes computer-readable media configured to maintain the informational data indicative of the possible non-imaged portion of the region of interest adjacent to the selected medical skin image. In an embodiment, the system includes a communication device configured to provide a notification at least partially based on the informational data to at least one of a human, computer, or system. In an embodiment, the system includes a communication device configured to display a human-perceivable depiction of the informational data. In an embodiment, the system includes a communication device configured to output a signal usable in displaying a human-perceivable depiction of the informational data.

For example, and without limitation, an embodiment of the subject matter described herein includes a method implemented in a computing device. In this embodiment, the method includes an operation (a) extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The method includes an operation (b) determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The method includes an operation (c) gathering the determined substantial correspondence for the border region segment of the selected medical skin image. The method includes an operation (d) outputting informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

In an embodiment, the method includes an operation receiving the plurality of medical skin images. In an embodiment, the method includes detecting a border region segment of a medical skin image of the plurality of medical skin images. In an embodiment, the method includes an operation generating data indicative of a border region-overlap status of the selected medical skin image. The data is generated at least partially in response to the determined substantial correspondences between the extracted human-perceivable feature included in the border region segment of the selected medical skin image and the extracted at least one respective perceivable feature included in the each medical skin image of the plurality of medical skin images other than the selected medical skin image. In an embodiment, the method includes an operation iteratively designating a next medical skin image from the plurality of medical skin images as the selected medical skin image until each medical skin image of the plurality of medical skin images has been designated. In an embodiment, the method includes an operation initiating a processing of each of the iteratively designated next medical skin image, the processing includes operations (b), (c), and (d). In an embodiment, the method includes an operation maintaining the informational data in computer-readable storage media. In an embodiment, the method includes an operation providing a notification that is at least partially based on the informational data to at least one of a human, computer, or system.

In an embodiment, the method includes an operation extracting at least one respective human-perceivable feature included in a follow-on medical image of the skin of the individual human (hereafter "follow-on medical skin image"). The follow-on medical skin image includes an image of a portion of the region of interest of the surface of the skin of the individual human, and acquired by the handheld digital image acquisition device subsequent to the acquisition of the plurality of medical skin images. This operation also includes determining a substantial correspondence between (x) an extracted human-perceivable feature included in a border region segment of the follow-on medical skin image and (y) an extracted at least one human-perceivable feature included in the selected medical skin image. This operation also includes gathering the determined substantial correspondence for the border region segment of the follow-on medical skin image. This operation also includes outputting updated informational data indicative of a possible non-imaged portion of the region of interest of the skin of the individual human adjacent to the selected medical skin image. The updated informational data responsive to an absence of a determined substantial correspondence for the extracted human-perceivable feature included in the border region segment of the follow-on medical skin image.

For example, and without limitation, an embodiment of the subject matter described herein includes a computer program product. In this embodiment, the computer program product includes computer-readable media bearing program instructions. The program instructions, when executed by a processor of a computing device, cause the computing device to perform a process. The process includes extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The process includes determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The process includes gathering the determined substantial correspondence for the border region segment of the selected medical skin image. The process includes outputting informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

In an embodiment, the process includes receiving the plurality of medical skin images. In an embodiment, the process includes detecting a border region segment of a medical skin image of the plurality of medical skin images. In an embodiment, the process includes displaying the informational data. In an embodiment, the process includes maintaining the informational data in computer-readable storage media. In an embodiment, the computer-readable media includes a tangible computer-readable media. In an embodiment, the computer-readable media includes a communications media.

For example, and without limitation, an embodiment of the subject matter described herein includes a system. In this embodiment, the system includes means for extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The system includes means for determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The system includes means for gathering the determined substantial correspondence for the border region segment of the selected medical skin image. The system includes means for outputting informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 illustrates an example environment in which embodiments may be implemented;

FIG. 10 illustrates an example computer program product;

FIG. 14 illustrates an example operational flow;

FIG. 15 illustrates an alternative embodiment of the example of the operational flow of FIG. 14;

FIG. 16 illustrates an alternative embodiment of the example of the operational flow of FIG. 14;

FIG. 17 illustrates an example computer program product;

FIG. 21 illustrates an example operational flow;

FIG. 22 illustrates an alternative embodiment of the operational flow of FIG. 21;

FIG. 23 illustrates an alternative embodiment of the operational flow of FIG. 21;

FIG. 24 illustrates an alternative embodiment of the operational flow of FIG. 21;

FIG. 25 illustrates an example computer program product;

FIG. 26 illustrates an alternative embodiment of the computer program product of FIG. 25;

FIG. 27 illustrates an example system;

FIG. 29 illustrates an example operational flow;

FIG. 30 illustrates an alternative embodiment of the operational flow of FIG. 29;

FIG. 31 illustrates an example computer program product;

FIG. 32 illustrates an alternative embodiment of the computer program product of FIG. 31.

DETAILED DESCRIPTION

Figure 1:
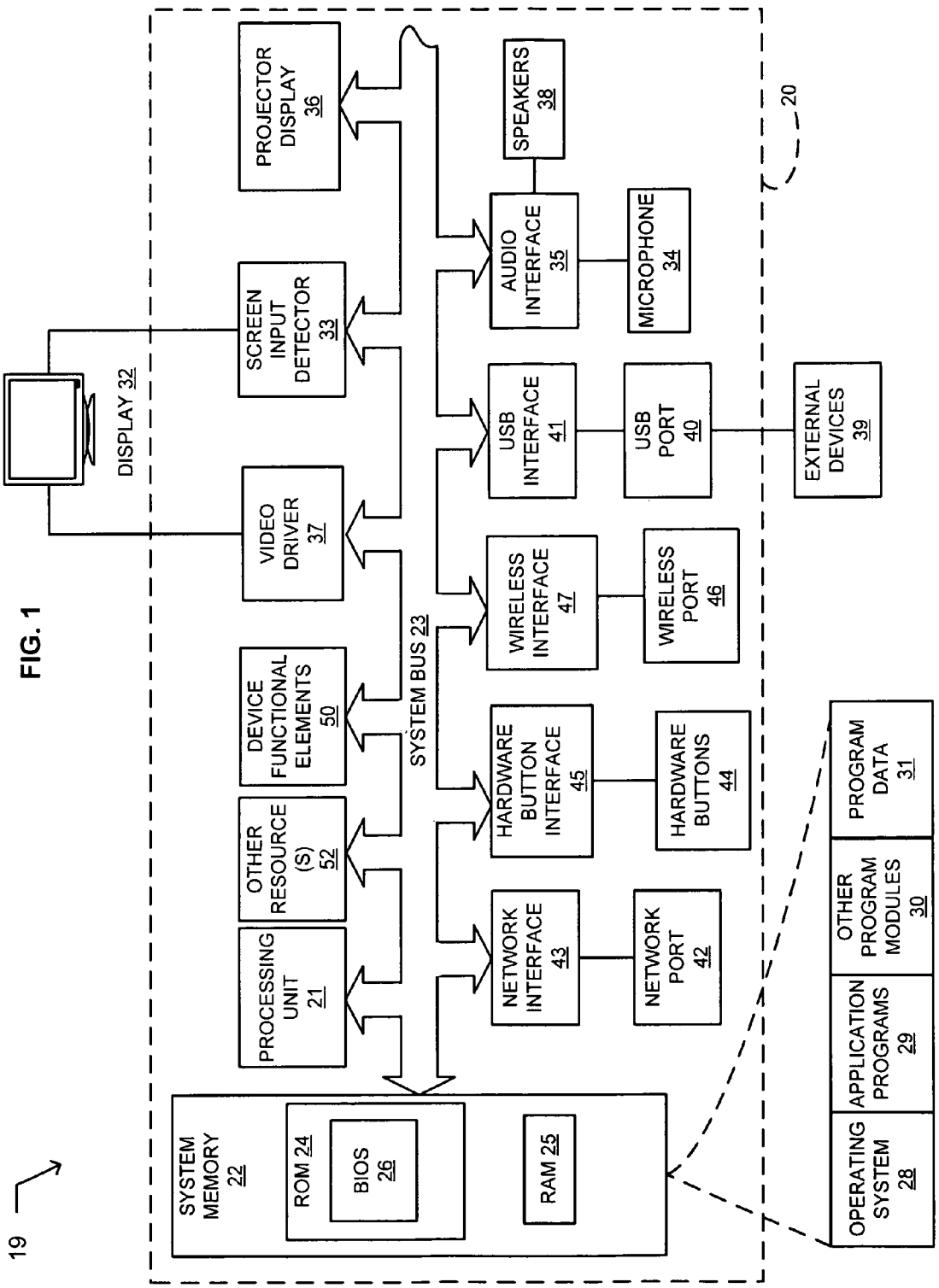
FIG. 1 illustrates an example embodiment of a thin computing device in which embodiments may be implemented.

In the following detailed description, reference is made to the accompanying drawings, which form a part hereof In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
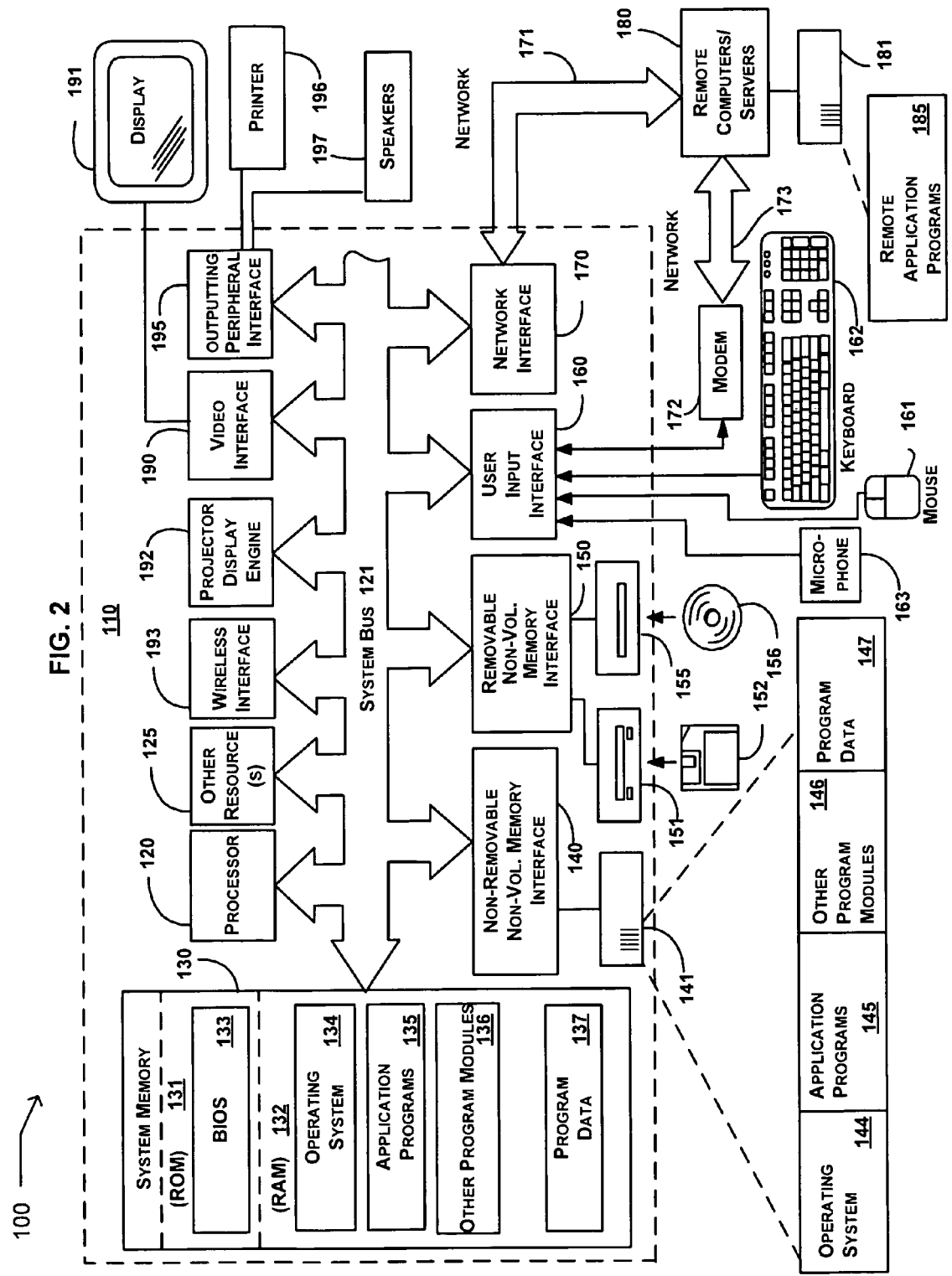
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive display, or one or more switches or buttons with suitable input detection circuitry. A touch-sensitive display is illustrated as a display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS"® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/nonremovable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch sensitive display, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing communication link between the computers may be used.

In certain instances, one or more elements of the computing device 110 may be deemed not necessary and omitted. In other instances, one or more other elements may be deemed necessary and added to the computing device.

FIG. 3 illustrates an example environment 200 in which embodiments may be implemented. The environment includes a surface 201, a digital image acquisition device 205 (illustrated as a camera), a plurality of digital images 210, a system 220, and a computing device 292 having a screen 294 visible to a person 296. In an embodiment, two or more of the devices of the environment may communicate wirelessly with each other. In another embodiment, two or more of the devices of the environment may communicate via wired link.

Figure 4:
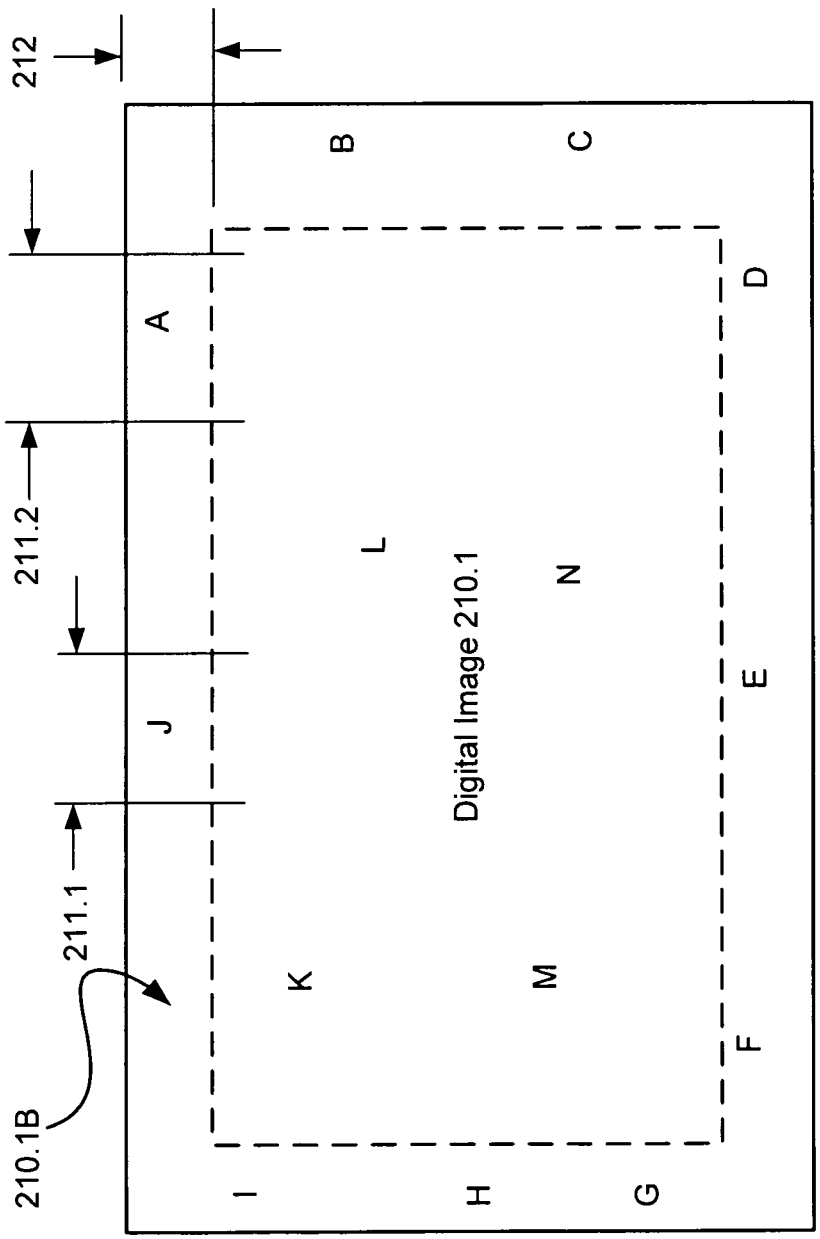
FIG. 4 illustrates an example digital image of the plurality of digital images.
Figure 5:
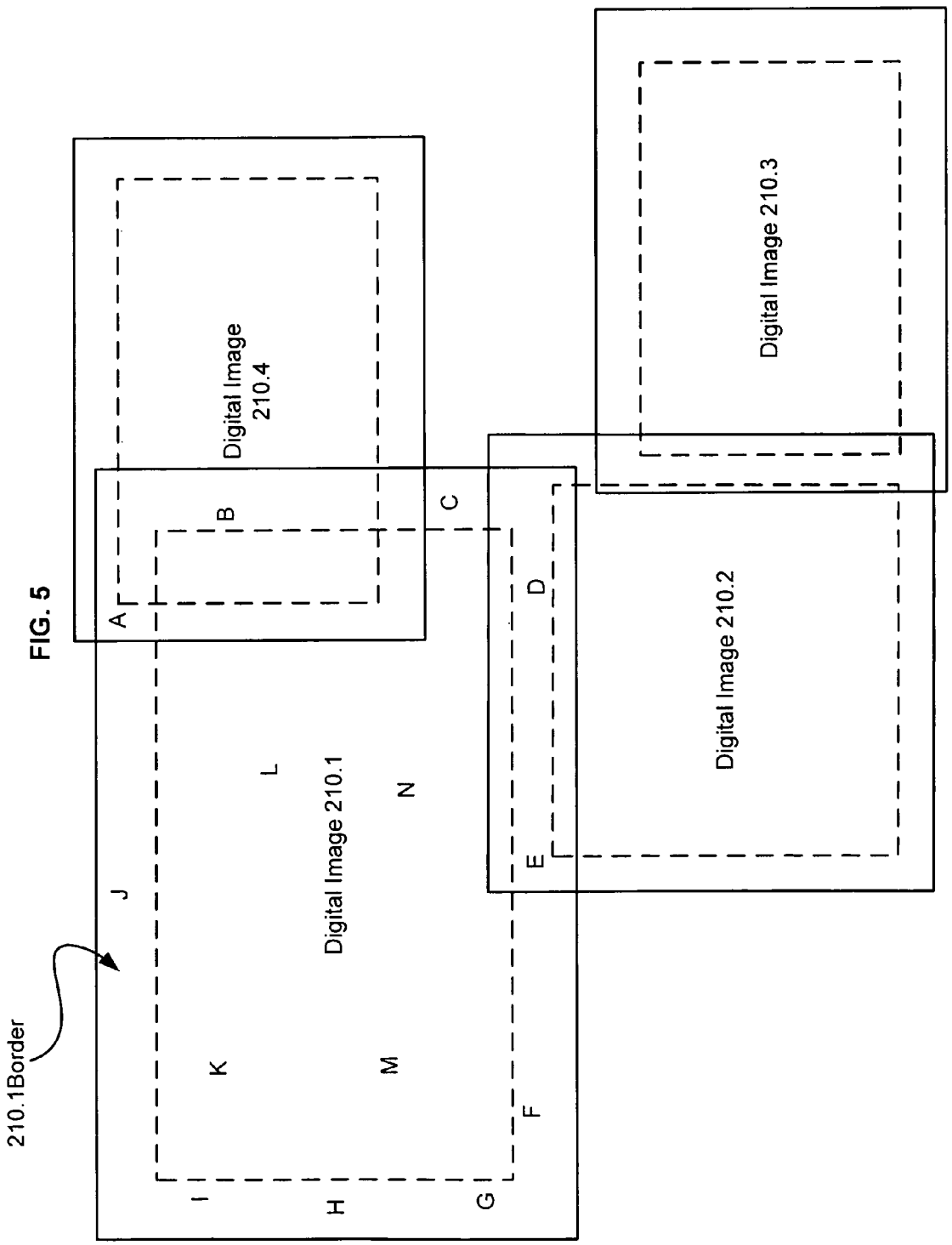
FIG. 5 illustrates an example of certain digital images of the plurality of digital images.

FIGS. 4-5 illustrate an example of the digital images 210. FIG. 4 illustrates an example digital image 210.1 of the plurality of digital images 210. The digital image 210.1 includes perceivable features A-N located in the field of view of the digital image 210.1. The field of view of the digital image 210.1 includes a peripheral border region 210.1B. The peripheral border region may be divided into at least two border region segments for image processing. The at least two border region segments are illustrated as border region segments 211.1 and 211.2. The border segments may abut each other in an embodiment, but are illustrated in FIG. 4 as spaced apart for clarity. Each border region segment has a length (no reference number) and a width 212. The length and/or width of the at least two border segments may or may not be equal. Perceivable features A-J are also illustrated as located within the border region 210.1B of the digital image 210.1

FIG. 5 illustrates an example of digital images 210.1-210.4 of the plurality of digital images 210. Certain perceivable features of perceivable features A-N are also illustrated as lying within the field of view of the digital images 210.2 and 210.4. For example, perceivable features A and B lie with the field of view of the digital image 210.4, and perceivable features D and E lie within the field of view of the digital image 210.2.

Figure 6:
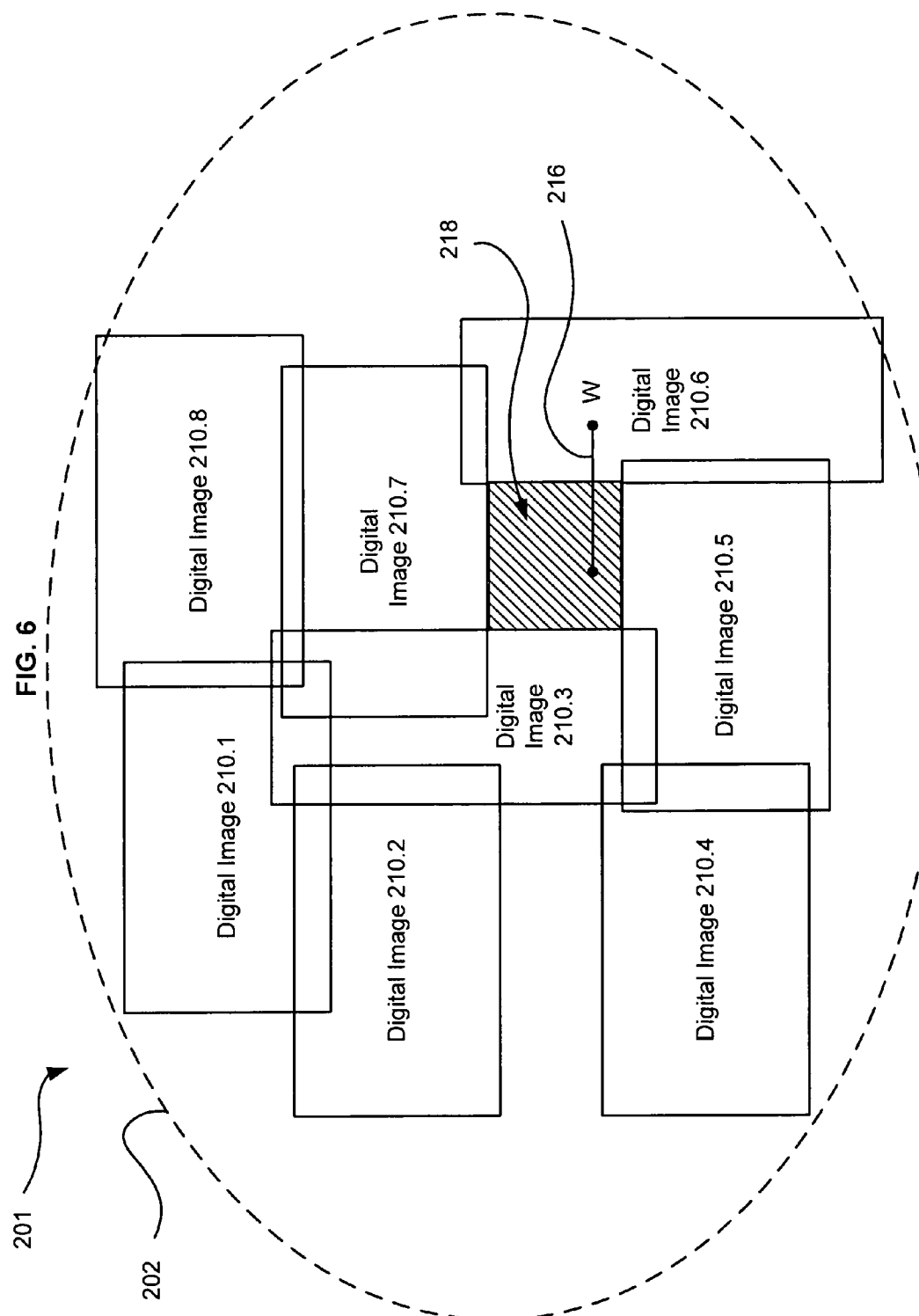
FIG. 6 illustrates an example of certain digital images of the plurality of digital images.

FIG. 6 illustrates an example of digital images 210.1-210.8 of the plurality of digital images 210. In this example, the digital images 210.1-210.8 include respective portions of a region of interest 202 of the surface 201. FIG. 6 also illustrates a possible non-imaged portion 218 of a region of interest 202 of the surface 201 as adjacent to digital images 210.3, 210.5, 210.6, and 210.7. FIG. 6 also illustrates digital image 210.6 as including an example perceivable feature W. FIG. 6 also illustrates an embodiment of a spatial relationship or orientation between the perceivable feature W and the possible non-imaged or unimaged portion 218 indicated by a line 216. In an embodiment, the line may be established perpendicular to an edge of the digital image 210.6.

Returning to FIG. 3, the system 220 includes a feature-detection circuit 224. The feature detection circuit is configured to extract at least one respective perceivable feature included in each digital image of the plurality of digital images 210. The each digital image of the plurality of digital images includes a respective portion of a region of interest of a surface a respective portion of the region of interest 202 of the surface 201. An example circuit or system configured to extract at least one respective perceivable feature included in each digital image of the plurality of digital images is provided by Photomodeler and PhotoModeler Scanner products by PhotoModeler® of Vancouver, BC, Canada.

For example, a perceivable feature may include a discernable shape. For example, a perceivable feature may be discernable under natural lighting or under a particular lighting, such as infrared lighting. For example, a perceivable feature may be a static perceivable feature of the surface. For example, where the surface is a surface of a human skin, a perceivable feature may include a hair, wrinkle, surface, color, structure, or texture variation. For example, a perceivable feature may include a color and/or texture change and/or shift in skin or tissue pigments (e.g., melanoma or other tumor borders, burns, scar tissue, necrotic tissue). For example, a perceivable feature may include a perceivable surface vascular feature of a cavity or lumen. For example, a perceivable feature may include a perceivable surface anomaly. For example, a perceivable feature may include a perceivable surface anatomical feature. For example, a perceivable feature may include a perceivable surface vascular feature. For example, a perceivable feature may include a perceivable surface vessel, blood vessel, vascular structure, or a pattern presented by one or more blood vessels of a surface of a human or animal. For example, a perceivable feature may include a perceivable physical structure, void, border, component, tissue, structural feature, or density variation of a surface. For example, a perceivable feature may include a perceivable pattern presented by one or more features. For example, a perceivable feature may include a perceivable fiducial formed by one or more structures, colors, or shapes of a surface. For example, a perceivable feature may include a perceivable relative size or spatial relationship of two or more perceivable physical structures, voids, borders, components, tissues, structural features, or density variations of a surface. For example, a perceivable feature may include a perceivable normal surface feature. For example, a perceivable feature may include a perceivable usual, regular, or typical surface feature. For example, perceivable feature may include a perceivable abnormal surface feature. For example, a perceivable abnormal feature may include perceivable unusual, irregular, or disease state. For example, a perceivable abnormal feature may include perceivable scar tissue, healed lesion, nodule, or encapsulated foreign object. For example, a perceivable feature may include a perceivable feature of a surface that is machine distinguishable from another surface feature. For example, a perceivable feature may include a perceivable surface feature that is machine differentiable from another perceivable surface feature. For example, a computing machine may be able to differentiate between first surface feature and second surface feature, but may not be able to distinguish or discern why they are not the same. For example, where the surface is a surface of an object, the perceivable feature may include a structural element, or a surface variation. For example, a surface color variation may include a red rust spot on a blue car. For example a surface texture variation may include a rust corrosion spot on an otherwise intact surface.

In an embodiment, the perceivable feature includes a human-vision perceivable feature. For example, a human-vision perceivable feature may include a feature that is visible to the naked eye or using natural human vision, including corrective lenses. In an embodiment, the perceivable feature includes an augmented human-vision perceivable feature, such as a feature visible to the naked eye as a result of computer implemented enhancement, or computer augmented vision. In an embodiment, the perceivable feature includes a machine-vision perceivable feature.

Continuing with reference to FIG. 3, the system 220 includes a feature matching circuit 228. The feature matching circuit is configured to determine a substantial correspondence between (x) an extracted perceivable feature included in a border region segment of a selected digital image of the plurality of digital images and (y) an extracted at least one respective perceivable feature included in the each digital image of the plurality of digital images other than the selected digital image (i.e., the plurality digital images minus the selected digital image). For example, if the feature matching circuit determines a substantial correspondence, it may be configured to output a "1", and if the feature matching circuit does not determine a substantial correspondence, it may be configured to output a "0". With reference to FIG. 5 for example, if the selected digital image is digital image 210.1, the feature matching circuit would find a substantial correspondence between (x) the perceivable feature A included in a border region segment of the digital image 210.1 and (y) the perceivable feature A included in the digital image 210.4, and would thus output a "1". The feature matching circuit would not find a substantial correspondence between (x) the perceivable feature A included in the border region segment of the selected digital image 210.1 and (y) any of the other the perceivable features included in the digital images 210.2 and 210.3, and would respectively output a "0" in response to at least one respective perceivable feature included in each digital image of the plurality of digital images 210.2-210.3. For example, with reference to FIG. 5, the feature matching circuit would not find a substantial correspondence between (x) the perceivable feature C included in another border region segment of the selected digital image 210.1 and (y) any of the other the perceivable features included in the digital images 210.2-210.4, and would respectively output a "0" in response to at least one respective perceivable feature included in each digital image of the digital images 210.2-210.4.

Continuing with reference to FIG. 3, the system 220 also includes a data collection circuit 232 configured to gather the determined substantial correspondences for the extracted perceivable feature included in the border region segment of the selected digital image. With reference to the example of FIG. 5 described above, in an embodiment, the data collection circuit would gather the "1" and "0" outputted by the feature matching circuit 228. With reference to the perceivable feature A included in a border region segment of the selected digital image 210.1, the gathered outputs would be a single "1" for the digital image 210.04 and at least one "0" for digital images 210.2 and 210.3, i.e. [1,0,0]. With reference to the perceivable feature C included in a border region segment of the selected digital image 210.1, the gathered outputs would be all "0" for digital images 210.2-210.4, i.e. [0,0,0].

The system 220 also includes a reporting circuit 236. The reporting circuit is configured to output informational data indicative of a possible non-imaged portion of the region of interest 202 of the surface 201. For example, the informational data may be indicative of the possible non-imaged portion 218 of the region of interest 202 of the surface 201 illustrated in FIG. 6. The informational data is responsive to an absence of a determined substantial correspondence between the extracted perceivable feature included in the border region segment of the selected digital image and the extracted at least one respective perceivable feature included in the each digital image of the plurality of digital images other than the selected digital image. With reference to the example of FIG. 5 described above, the data collection circuit 232 would have gathered an absence of a determined substantial correspondence [0,0,0] between the perceivable feature C included in a border region segment of the selected digital image 210.1 and at least one respective perceivable feature included in each digital image of the plurality of digital images 210.2-210.4 other than the selected digital image. In an embodiment, the reporting circuit interprets an absence of a determined substantial correspondence as indicia of a possible non-imaged portion of the region of interest adjacent to the selected digital image.

In an embodiment of the system, each digital image of the plurality of digital images includes an indication of a position or location relative to the region of interest of the surface. In an embodiment, the plurality of digital images respectively includes a plurality of medical images of a portion of a region of interest of a surface of an individual mammal. In an embodiment, each medical image of the plurality of medical images respectively includes a portion of a region of interest of an internal surface of an individual mammalian body part. In an embodiment, the plurality of medical images of an internal surface of an individual mammalian body part was acquired by a body-insertable device. In an embodiment, the plurality of medical images of an internal surface of an individual mammalian body part were acquired by an ex vivo device. In an embodiment, each medical image of the plurality of medical images respectively includes a portion of a region of interest of an external surface of an individual mammal. In an embodiment, each digital image of the plurality of digital images respectively includes a portion of a region of interest of a surface of an object. For example, the object may include the earth or planetary surface, a planetary body, ocean floor, a product, an aircraft, a machine, or a boat. In an embodiment, each digital image of the plurality of digital images includes a respective identifier. For example, an identifier may include an alpha-numeric identifier. In an embodiment, the identifier may be used to identify a digital image adjacent to the possible non-imaged portion of the region of interest. In an embodiment, each digital image of the plurality of digital images includes a respective identifier assigned by a receiver circuit operatively coupled to the system. In an embodiment, each digital image of the plurality of digital images includes a respective identifier assigned by the system. In an embodiment, each digital image of the plurality of digital images includes a respective identifier assigned by the system after receipt by an image receiver circuit. In an embodiment, each digital image of the plurality of digital images includes a respective identifier assigned by another system.

In an embodiment, the feature matching circuit 228 includes a feature matching circuit configured to determine a substantial correspondence between (x) an extracted perceivable feature included in a border region segment of a selected digital image of the plurality of digital images and (y) an extracted at least one respective perceivable feature of a border region segment of the each digital image of the plurality of digital images other than the selected digital image. For example, this may be thought of as edge-feature to edge-feature correspondence or matching. In this embodiment, the feature matching circuit is matching with respect to perceivable features in border region segments of both images. In an embodiment, the feature matching circuit includes a feature matching circuit configured to determine a substantial correspondence between (x) an extracted perceivable feature included in a border region segment of a selected digital image and (y) an extracted at least one respective perceivable feature of a field of view of each digital image of the plurality of digital images other than the selected digital image.

In an embodiment, the system 220 includes an image receiver circuit configured to receive the plurality of digital images. In an embodiment, the system includes a border region detection circuit 226 configured to detect a border region segment of a digital image. In an embodiment, the border region detection circuit includes a border region detection circuit configured to select a length and/or a width parameter of the border regions. The border region detection circuit is also configured to detect a border region segment having the selected length and/or width. For example, the length and/or a width parameter of the border regions may be a percentage of a dimension of the image, or may be a specific length, or a specific number of pixels. For example, the length and/or a width parameter of the border regions may be dynamically varied depending on a result of the feature matching, or depending on speed and processing horsepower available to the system. For example, the length and/or a width parameter of the border regions may be dynamically varied to provide an increased resolution in transition regions. In an embodiment, the border region detection circuit includes a border region detection circuit configured to receive a selected length and/or a width parameter of the border regions. The border region detection circuit is also configured to detect a border region segment of a digital image having the selected length and/or width parameter. In an embodiment, the feature-matching circuit 228 includes a feature-matching circuit configured to determine a substantial correspondence between (x) a perceivable feature included in the detected border region segment of a selected digital image of the plurality of digital images and (y) at least one respective perceivable feature included in each digital image of the plurality of digital images other than the selected digital image.

In an embodiment, the feature-matching circuit 228 includes a feature-matching circuit configured to (i) determine a substantial correspondence between (x) a perceivable feature included in a border region segment of a selected digital image of the plurality of digital images and (y) at least one respective perceivable feature included in each digital image of the plurality of digital images other than the selected digital image. The feature-matching circuit is also configured to (ii) iteratively designate a next perceivable feature included in a next border region segment of the selected digital image. The feature matching circuit is further configured to (iii) initiate a determination of a substantial correspondence of the iteratively designated next perceivable feature included in the next border region segment pursuant to element (i). With reference to FIG. 5 for example, this embodiment will step through at least two iterations by looking for substantial correspondence for perceivable feature A and perceivable feature B. In an embodiment, the data collection circuit 232 includes a data collection circuit configured to gather the determined substantial correspondences for the respective perceivable feature included in the respective border region segments of the selected digital image. In an embodiment, the reporting circuit 236 includes a reporting circuit configured to output informational data indicative of a possible non-imaged portion of the region of interest of the surface. The informational data is responsive to an absence of a determined substantial correspondences between the extracted respective perceivable feature included in the respective border region segments of the at least two border region segments of the selected digital image and the extracted at least one respective perceivable feature included in the each digital image of the plurality of digital images other than the selected digital image.

In an embodiment, the system 220 includes an overlap-analysis circuit 234 configured to generate data indicative of a border region-overlap status of the selected digital image. The data is generated at least partially in response to the determined substantial correspondence between the extracted perceivable feature included in the border region segment of the selected digital image and the extracted at least one respective perceivable feature included in the each digital image of the plurality of digital images other than the selected digital image. For example, a determined absence of a substantial correspondence for perceivable feature in one border region segment of the selected digital image may result in generation of data indicative on a "border region not overlapped" status. With reference to the example of FIG. 5 described above, and in reference to the perceivable feature C included in a border region segment of the selected digital image 210.1; where the gathered determined substantial correspondences for perceivable feature C are all "0" (i.e. [0,0,0]), the overlap-analysis circuit generates data indicative of a "border region not overlapped" status for the border region segment of the digital image 210.1 that includes perceivable feature C. For example, a determined a substantial correspondence for a perceivable feature in one detected border region segment of the selected digital image may result in generation of data indicative of a "border region overlapped" status. With reference to the example of FIG. 5 described above, and in reference to the perceivable feature A included in a border region segment of the selected digital image 210.1; where the gathered determined substantial correspondences for the perceivable feature A include a "1" with respect to digital image 210.4, the overlap-analysis circuit generates data indicative of a "border region overlapped" status for the border region segment of the digital image 210.1 that includes perceivable feature A. In an embodiment, the reporting circuit 236 includes a reporting circuit configured to output informational data indicative of the border region-overlap status of the selected digital image. The informational data is at least partially based on the data indicative of a border region-overlap status of the selected digital image.

In an embodiment, the overlap-analysis circuit 234 includes an overlap-analysis circuit configured to generate data indicative of a possible non-imaged portion of the region of interest adjacent to the selected digital image. In an embodiment, the reporting circuit 236 includes a reporting circuit configured to output informational data indicative of the possible non-imaged portion of the region of interest adjacent to the selected digital image. The informational data is at least partially based on the data indicative of the possible non-imaged portion of the region of interest adjacent to the selected digital image. In an embodiment, the overlap-analysis circuit includes an overlap-analysis circuit configured to generate data indicative of a possible non-imaged portion of the region of interest adjacent to both the selected digital image and another selected digital image. In an embodiment, the overlap-analysis circuit includes an overlap-analysis circuit configured to generate data indicative of a predicted possible non-imaged portion of the region of interest adjacent to the selected digital image. In an embodiment, the prediction may be based on filtering or applying a prediction algorithm.

Continuing with FIG. 3, in an embodiment, the overlap-analysis circuit 234 includes an overlap-analysis circuit configured to generate data indicative of a possible imaged portion of the region of interest adjacent to the selected digital image. In an embodiment, the overlap-analysis circuit 234 includes an overlap-analysis circuit configured to generate data indicative of a possible non-imaged portion of the region of interest adjacent to the selected digital image and indicative of a spatial relationship between the possible non-imaged portion of the region of interest and the feature. In an embodiment, the spatial relationship may be indicated with respect to a site, center, or quadrant of the border region segment of the selected digital image. FIG. 6 provides a partial illustration of this embodiment. The embodiment provides data indicative of a spatial relationship 216 between the possible non-imaged portion 218 of the region of interest 202 and the perceivable feature included in the border region segment (although FIG. 6 illustrates a situation where the perceivable feature W is not included in the border region). In an embodiment, the overlap-analysis circuit 234 includes an overlap-analysis circuit configured to generate data indicative of a possible non-imaged portion of the region of interest adjacent to the selected digital image; and indicative of a spatial relationship between the possible non-imaged portion of the region of interest and the feature included in a border region segment of the selected digital image. The spatial relationship is indicated by a line anchored by a feature, site, center, or quadrant of the selected digital image. FIG. 6 provides an illustration of this embodiment. The data of this embodiment provides an indication of the spatial relationship 216 between the possible non-imaged portion 218 that is anchored by the perceivable feature W. In an embodiment, the determined spatial relationship is indicated by a line anchored by a feature, site, center, or quadrant of the selected digital image and substantially perpendicular to an edge of the field of view of the digital image.

In an embodiment, the overlap-analysis circuit 234 includes an overlap-analysis circuit configured to generate data indicative of a possible non-imaged portion of the region of interest adjacent to the selected digital image and indicative of a spatial relationship between the possible non-imaged portion of the region of interest and a human-perceivable feature included in the border region segment of the selected digital image. The determined spatial relationship indicated by a line anchored by a feature, site, center, or quadrant of the selected digital image.

In an embodiment, the reporting circuit 236 includes a reporting circuit configured to output informational data indicative of a possible non-imaged portion of the region of interest adjacent to the selected digital image of the surface. For example, the informational data may include an identification number assigned to the selected digital image, or location information associated with the selected digital image. In an embodiment, the reporting circuit includes a reporting circuit configured to output informational data indicative of a possible non-imaged portion of the region of interest of the surface. The informational data is responsive to (i) an absence of a determined substantial correspondence between the extracted perceivable feature included in the border region segment of the selected digital image and a first extracted perceivable feature included in a first digital image of the plurality of digital images other than the selected digital image, and to (ii) an absence of a determined substantial correspondence between the extracted perceivable feature included in the border region segment of the selected digital image and a second extracted perceivable feature included in a second digital image of the plurality of digital images other than the selected digital image.

In an embodiment, the system 220 includes computer-readable media 239 configured to maintain the informational data. In an embodiment, the computer-readable media may be managed by a computer storage device 238. In an embodiment, the computer-readable media may include a computer-readable media configured to maintain and to provide access to the informational data. In an embodiment, the computer-readable media may include a tangible computer-readable media. In an embodiment, the computer-readable media may include a communications media. In an embodiment, the system includes a communication device configured to provide a notification at least partially based on the informational data to at least one of a human, computer, or system. For example, the communications device may be incorporated into the system, as illustrated by the communication device 242. In another example, the communication device may be a third-party device in communication with the system as illustrated by the computing device 292 having the screen 294. In an embodiment, the communication device is configured to display a human-perceivable depiction of the informational data. In an embodiment, the communication device is configured to output a signal usable in displaying a human-perceivable depiction of the informational data. For example, the human-perceivable depiction may include a visual or an audio human-perceivable depiction of the informational data.

In an embodiment, the system 220 includes a processor 250. In an embodiment, the processor may be at least substantially similar to the processing unit 21 described in conjunction with FIG. 1. In an embodiment, the processor may be at least substantially similar to the processor 120 described in conjunction with FIG. 2.

FIG. 3 also illustrates an alternative embodiment of a system 200. The alternative embodiment of the system includes the feature-matching circuit 228 configured to determine a substantial correspondence between (x) a perceivable feature included in a border region segment of a selected digital image of a plurality of digital images and (y) at least one respective perceivable feature included in each digital image of the plurality of digital images other than the selected digital image, the each digital image of the plurality of digital images includes a respective portion of a region of interest of a surface. The data collection circuit 232 is configured to gather the determined substantial correspondences for the perceivable feature included in the border region segment of the selected digital image. The reporting circuit 236 is configured to output informational data indicative of a possible non-imaged portion of the region of interest of the surface. The informational data is responsive to an absence of a determined substantial correspondence in the gathered determined substantial correspondences. In an embodiment, the reporting circuit is configured to output informational data indicative of a possible non-imaged portion of the region of interest of the surface. The informational data is responsive to an absence of any determined substantial correspondences in the gathered determined substantial correspondences.

Figure 7:
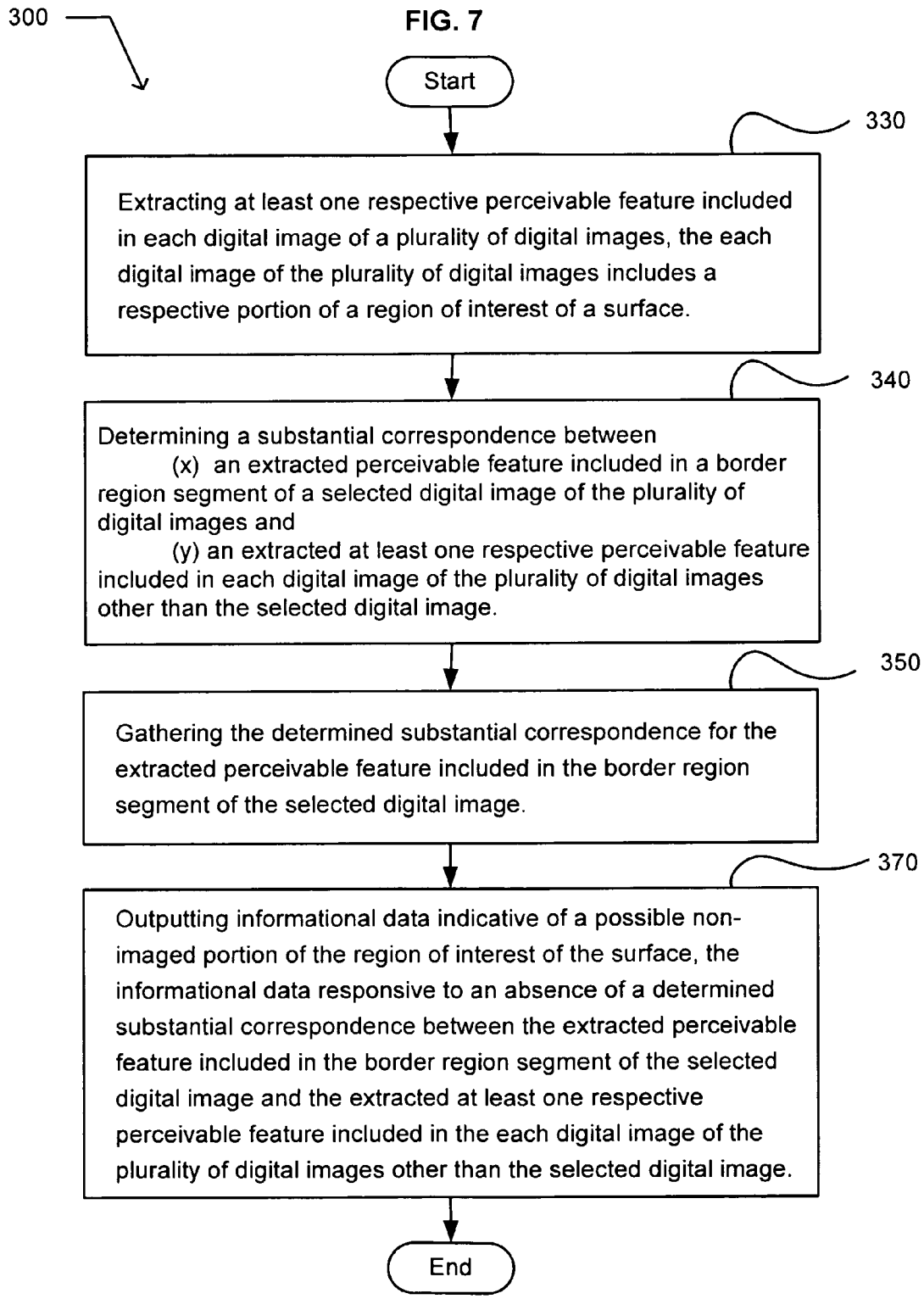
FIG. 7 illustrates an example operational flow.

FIG. 7 illustrates an example operational flow 300 implemented in a computing device. After a start operation, the operational flow includes a detection operation 330. The detection operation includes extracting at least one respective perceivable feature included in each digital image of a plurality of digital images. The each digital image of the plurality of digital images includes a respective portion of a region of interest of a surface. In an embodiment, the detection operation may be implemented using the feature-detection circuit 224 described in conjunction with FIG. 3. A feature correspondence operation 340 includes determining a substantial correspondence between (x) an extracted perceivable feature included in a border region segment of a selected digital image of the plurality of digital images and (y) an extracted at least one respective perceivable feature included in each digital image of the plurality of digital images other than the selected digital image. In an embodiment, the feature correspondence operation may be implemented using the feature matching circuit 228 described in conjunction with FIG. 3. A data collection operation 350 includes gathering the determined substantial correspondences for the extracted perceivable feature included in the border region segment of the selected digital image. In an embodiment, the data collection operation may be implemented using the data collection circuit 232 described in conjunction with FIG. 3. A reporting operation 370 includes outputting informational data indicative of a possible non-imaged portion of the region of interest of the surface. The informational data is responsive to an absence of a determined substantial correspondence between the extracted perceivable feature included in the border region segment of the selected digital image and the extracted at least one respective perceivable feature included in the each digital image of the plurality of digital images other than the selected digital image. In an embodiment, the reporting operation may be implemented using the reporting circuit 236 described in conjunction with FIG. 3. The operational flow includes an end operation.

Figure 8:
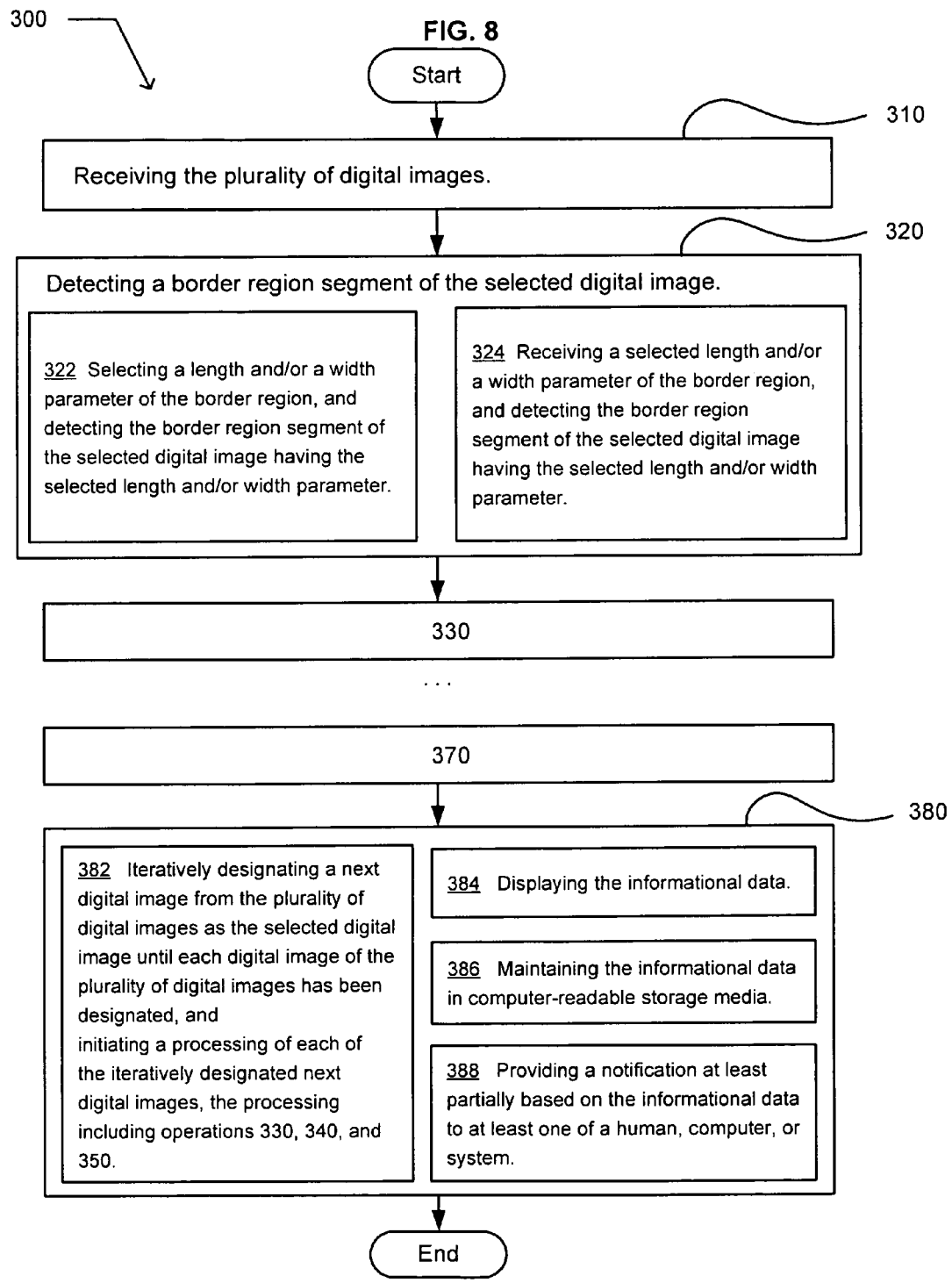
FIG. 8 illustrates an alternative embodiment of the example operational flow of FIG. 7.

FIG. 8 illustrates an alternative embodiment of the example operational flow 300 of FIG. 7. The alternative embodiment may include at least one additional operation. An additional operation may include an operation 310, an operation 320, or an operation 380. The operation 310 includes receiving the plurality of digital images. The operation 320 includes detecting a border region segment of the selected digital image. In an embodiment, the operation 320 may include at least one additional operation, such as an operation 322 or an operation 324. The operation 322 includes selecting a length and/or a width parameter of the border region, and detecting the border region segment of the selected digital image having the selected length and/or width parameter. The operation 324 includes receiving a selected length and/or a width parameter of the border region, and detecting the border region segment of the selected digital image having the selected length and/or width parameter. The operation 380 may include at least one additional operation, such as an operation 382, an operation 384, an operation 386, or an operation 388. The operation 382 includes iteratively designating a next digital image from the plurality of digital images as the selected digital image until each digital image of the plurality of digital images has been designated. The operation 382 includes initiating a processing of each of the iteratively designated next digital images. The processing includes operations 330, 340 and 350. The operation 384 includes displaying the informational data. The operation 386 includes maintaining the informational data in computer-readable storage media. The operation 388 includes providing a notification at least partially based on the informational data to at least one of a human, computer, or system.

Figure 9:
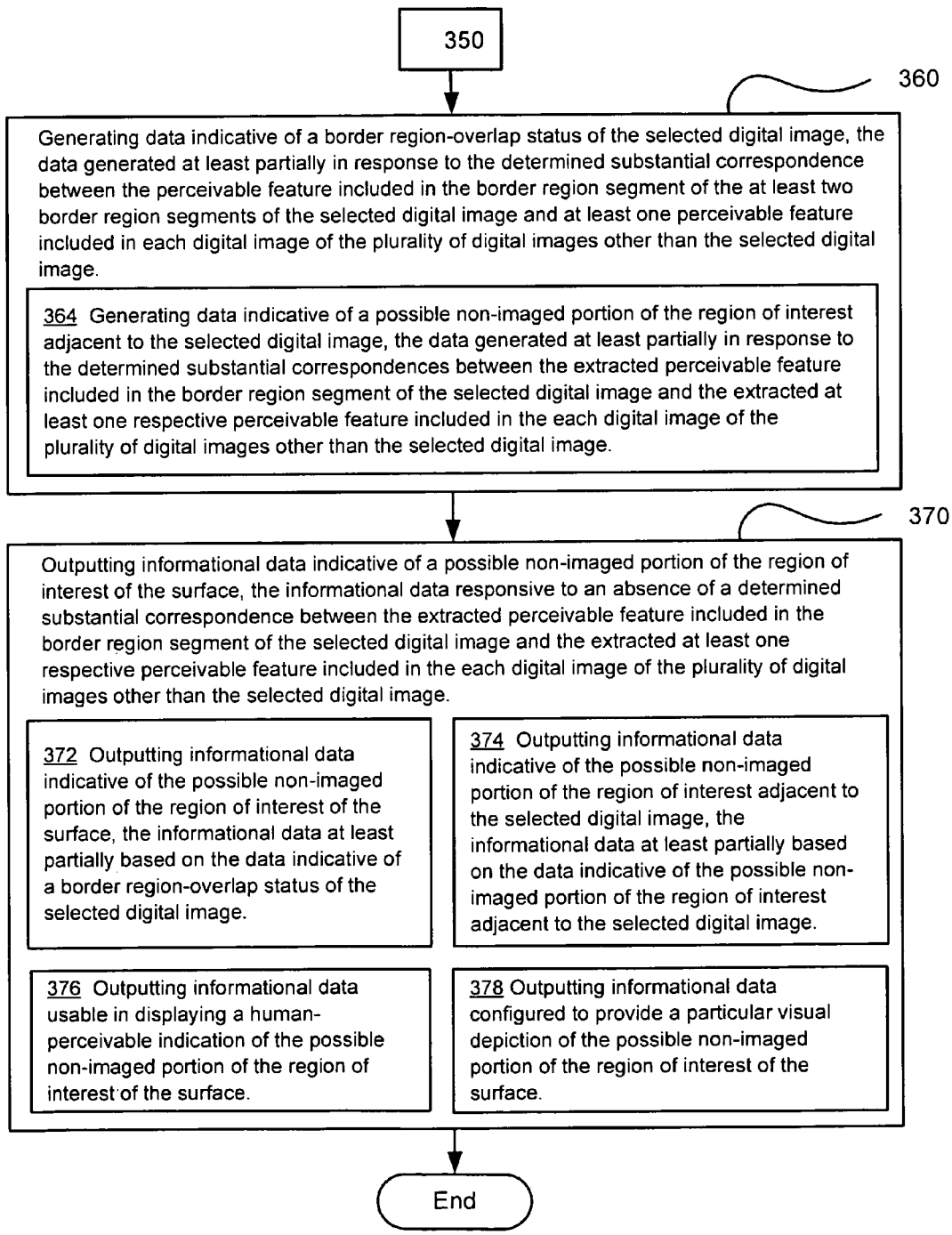
FIG. 9 illustrates an alternative embodiment of the example operational flow of FIG. 7.

FIG. 9 illustrates an alternative embodiment of the example operational flow 300 of FIG. 7. The operational flow may include an overlap-analysis operation 360. The overlap-analysis operation includes generating data indicative of a border region-overlap status of the selected digital image. The data is generated at least partially in response to the determined substantial correspondences between the extracted perceivable feature included in the border region segment of the selected digital image and the extracted at least one respective perceivable feature included in the each digital image of the plurality of digital images other than the selected digital image. The overlap-analysis operation 360 may include at least one additional operation, such as the operation 364. The operation 364 includes generating data indicative of a possible non-imaged portion of the region of interest adjacent to the selected digital image. The data is generated at least partially in response to the determined substantial correspondences between the extracted perceivable feature included in the border region segment of the selected digital image and the extracted at least one respective perceivable feature included in the each digital image of the plurality of digital images other than the selected digital image. The reporting operation 370 may include at least one additional operation. The at least one additional operation may include an operation 372, an operation 374, an operation 376, or an operation 378. The operation 372 includes outputting informational data indicative of a possible non-imaged portion of the region of interest of the surface. The informational data is at least partially based on the data indicative of a border region-overlap status of the selected digital image. The operation 374 includes outputting informational data indicative of the possible non-imaged portion of the region of interest adjacent to the selected digital image. The informational data is at least partially based on the data indicative of the possible non-imaged portion of the region of interest adjacent to the selected digital image. The operation 376 includes outputting informational data usable in displaying a human-perceivable indication of the possible non-imaged portion of the region of interest of the surface. The operation 378 includes outputting informational data configured to provide a particular visual depiction of a possible non-imaged portion of the region of interest of the surface.

FIG. 7 illustrates an alternative embodiment of the operational flow 300 implemented in a computing device. After a start operation, the operational flow includes a feature correspondence operation 340. The feature correspondence operation includes determining a substantial correspondence between (x) a perceivable feature included in a border region segment of a selected digital image of a plurality of digital images and (y) at least one respective perceivable feature included in each digital image of the plurality of digital images other than the selected digital image, the each digital image of the plurality of digital images includes a respective portion of a region of interest of a surface. In an embodiment, the feature correspondence operation may be implemented using the feature matching circuit 228 described in conjunction with FIG. 3. A data collection operation 350 includes gathering the determined substantial correspondences for the perceivable feature included in the border region segment of the selected digital image. In an embodiment, the data collection operation may be implemented using the data collection circuit 232 described in conjunction with FIG. 3. A reporting operation 370 includes outputting informational data indicative of a possible non-imaged portion of the region of interest of the surface, the informational data responsive to an absence of a determined substantial correspondence in the gathered determined substantial correspondences. In an embodiment, the reporting operation may be implemented using the reporting circuit 236 described in conjunction with FIG. 3. The operational flow includes an end operation.

FIG. 10 illustrates an example computer program product 400. The computer program product includes computer-readable media 410 bearing program instructions 420. The program instruction, when executed by a processor of a computing device, cause the computing device to perform a process. The process includes (a) extracting at least one respective perceivable feature included in each digital image of a plurality of digital images. The each digital image of the plurality of digital images includes a respective portion of a region of interest of a surface. The process also includes (b) determining a substantial correspondence between (x) an extracted perceivable feature included in a border region segment of a selected digital image of the plurality of digital images and (y) an extracted at least one respective perceivable feature included in each digital image of the plurality of digital images other than the selected digital image. The process also includes (c) gathering the determined substantial correspondences for the extracted perceivable feature included in the border region segment of the selected digital image. The process also includes (d) outputting informational data indicative of a possible non-imaged portion of the region of interest of the surface. The informational data is responsive to an absence of a determined substantial correspondence between the extracted perceivable feature included in the border region segment of the selected digital image and the extracted at least one respective perceivable feature included in each digital image of the plurality of digital images other than the selected digital image.

In an alternative embodiment, the process (d) outputting informational data includes 422 transforming the informational data into a particular visual depiction of a possible non-imaged portion of the region of interest of the surface, and outputting the transformed informational data. In an embodiment, the process may include 424 (e) providing a notification at least partially based on the informational data to at least one of a human, computer, or system. In an embodiment, the computer-readable media includes a tangible computer-readable media 412. In an embodiment, the computer-readable media includes a communications media 414.

Figure 11:
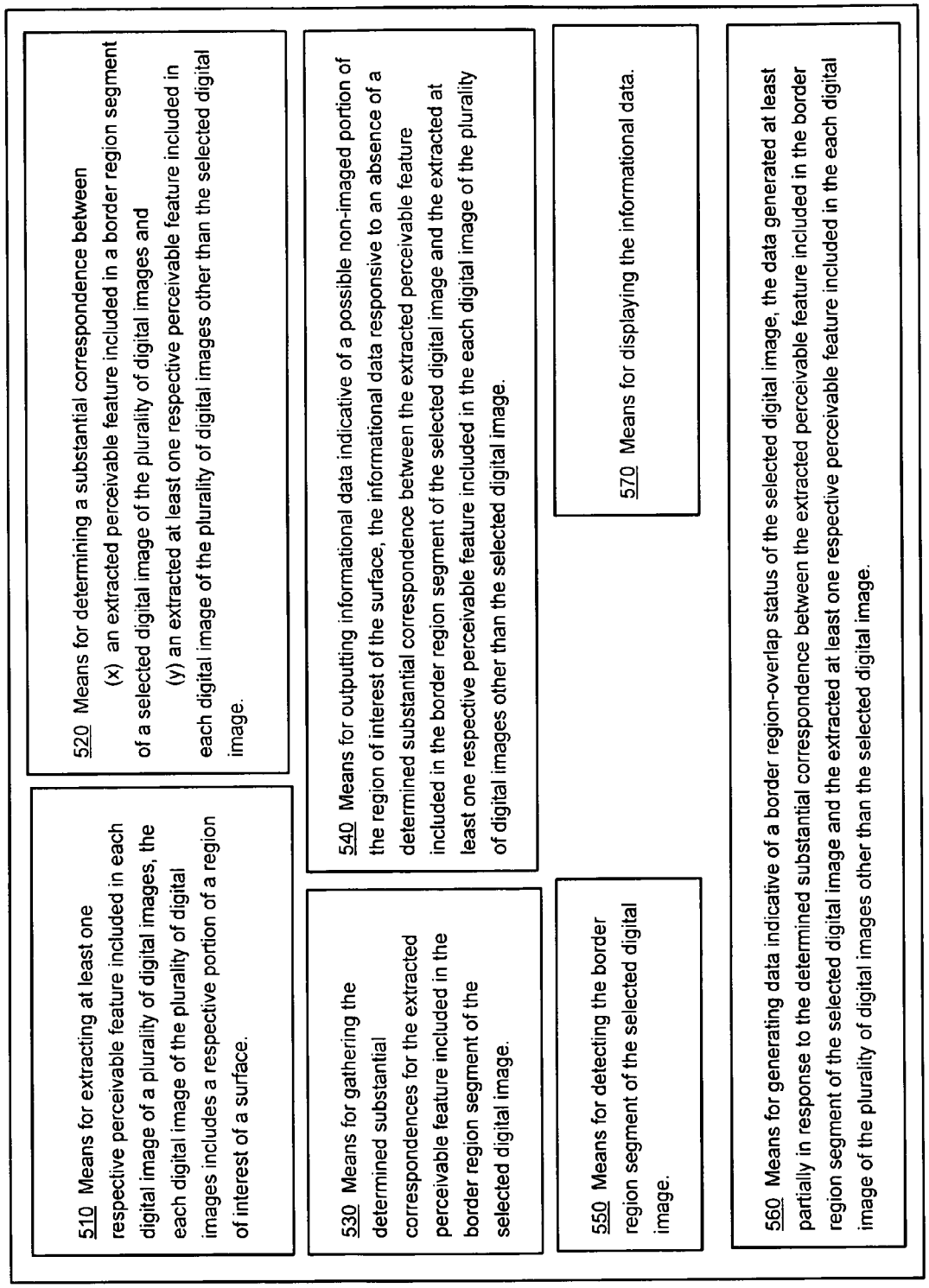
FIG. 11 illustrates an example system.

FIG. 11 illustrates an example system 500. The system includes means 510 for extracting at least one respective perceivable feature included in each digital image of a plurality of digital images. The each digital image of the plurality of digital images includes a respective portion of a region of interest of a surface. The system includes means 520 for determining a substantial correspondence between (x) an extracted perceivable feature included in a border region segment of a selected digital image of the plurality of digital images and (y) an extracted at least one respective perceivable feature included in each digital image of the plurality of digital images other than the selected digital image. The system includes means 530 for gathering the determined substantial correspondences for the extracted perceivable feature included in the border region segment of the selected digital image. The system includes means 540 for outputting informational data indicative of a possible non-imaged portion of the region of interest of the surface. The informational data responsive to an absence of a determined substantial correspondence between the extracted perceivable feature included in the border region segment of the selected digital image and the extracted at least one respective perceivable feature included in the each digital image of the plurality of digital images other than the selected digital image.

In an alternative embodiment, the system may include means 550 for detecting a border region segment of the selected digital image. In an alternative embodiment, the system may include means 560 for generating data indicative of a border region-overlap status of the selected digital image. The data is generated at least partially in response to the determined substantial correspondence between the extracted perceivable feature included in the border region segment of the selected digital image and the extracted at least one respective perceivable feature included in the each digital image of the plurality of digital images other than the selected digital image. In an alternative embodiment, the system may include means 570 for displaying the informational data.

Figure 12:
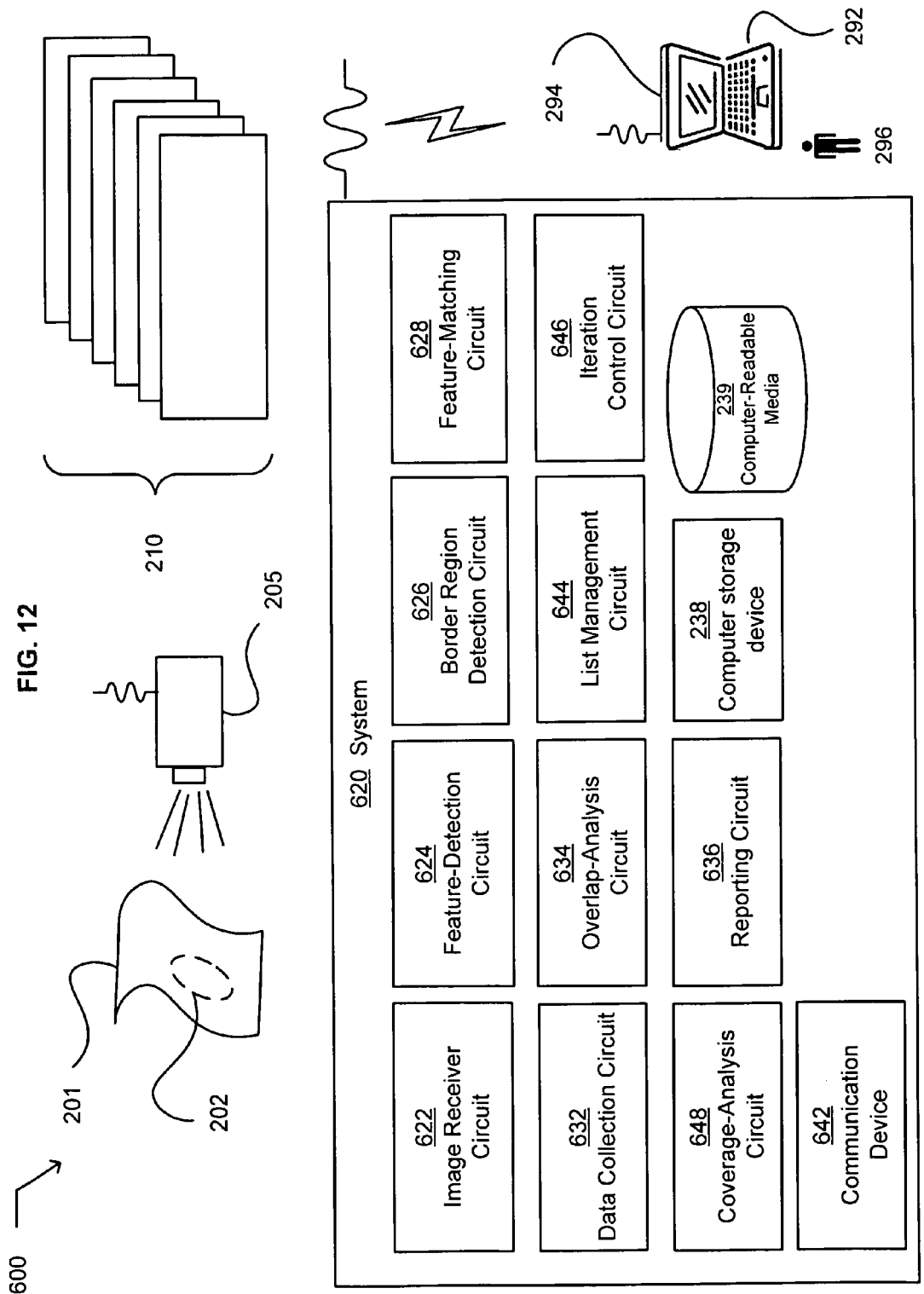
FIG. 12 illustrates an example environment.

FIG. 12 illustrates an example environment 600. The environment includes the surface 201, the digital image acquisition device 205, the plurality of digital images 210, a system 620, and the computing device 292 having the screen 294 visible to the person 296.

The system 620 includes a feature-detection circuit 624 configured to extract at least one respective perceivable feature included in each digital image of a plurality of digital images 210. The each digital image of the plurality of digital images includes a respective portion of the region of interest 202 of the surface 201. The system includes a feature-matching circuit 628 configured to determine a substantial correspondence between (x) an extracted perceivable feature included in a border region segment of a selected digital image of the plurality of digital images and (y) an extracted at least one respective perceivable feature included in each digital image of the plurality of digital images other than the selected digital image. The system includes a data collection circuit 632 configured to gather the determined substantial correspondences for the extracted perceivable feature included in the border region segment of the selected digital image. The system includes an overlap-analysis circuit 634 configured to generate data indicative of a border region-overlap status of the selected digital image. The data is generated at least partially in response to the gathered determined substantial correspondences. The system includes a list management circuit 644 configured to add the data indicative of the determined border region-overlap status for the border region segment of the selected digital image to an omitted-coverage list. For example, in an embodiment, the determined border region-overlap status may include "likely not overlapped," or "likely overlapped."

The system 620 includes 646 an iteration control circuit configured to iteratively designate a next digital image from the plurality of digital images as the selected digital image until each digital image of the plurality of digital images has been designated. The iteration control circuit is also configured to initiate a processing of each of the iteratively designated next digital images by the feature-matching circuit 628, the data collection circuit 632, the overlap-analysis circuit 634, and the list management circuit 644. In an alternative embodiment, the iteration circuit is also configured to initiate a processing of each of the iteratively designated next digital images by a border region detection circuit 626. The system includes a coverage-analysis circuit 648 configured to identify a particular portion of the region of interest of a surface as likely not included in the plurality of digital images (hereafter "possible non-imaged portion of the region of interest"). The identification of the possible non-imaged portion of the region of interest is at least partially based on the omitted-coverage list. In an embodiment, the coverage-analysis circuit is configured to at least one of determine, classify, find, or locate a possible non-imaged portion of the region of interest. The system includes a reporting circuit 636 configured to output informational data indicative of the possible non-imaged portion of the region of interest. In an embodiment, the informational data includes an indication that the possible non-imaged portion of the region of interest may be adjacent to a particular digital image of the plurality of digital images.

In an alternative embodiment, the system 620 includes an image receiver circuit 622 configured to receive a plurality of digital images. In an alternative embodiment, the system includes a border region detection circuit 626 configured to detect a border region segment of a digital image of the plurality of digital images. In an alternative embodiment, the feature matching circuit 628 includes a feature-matching circuit configured to determine a substantial correspondence between (x) an extracted perceivable feature included in a detected border region segment of a selected digital image of the plurality of digital images and (y) an extracted at least one respective perceivable feature included in each digital image of the plurality of digital images other than the selected digital image.

In an alternative embodiment, the data collection circuit 632 includes a data collection circuit configured to gather and assemble the determined substantial correspondences for the extracted perceivable feature included in the border region segment of the selected digital image. In an alternative embodiment, the data collection circuit includes a data collection circuit configured to gather the determined substantial correspondences for a respective perceivable feature included in each respective border region segment of the selected digital image.

In an alternative embodiment, the coverage-analysis circuit 648 includes a coverage-analysis circuit configured to identify a particular portion of the region of interest of a surface as likely not included in the plurality of digital images (hereafter "possible non-imaged portion of the region of interest") and to identify at least one digital image of the plurality of digital images (hereafter "signpost digital image") as spatially proximate to the possible non-imaged portion of the region of interest. The identification of the possible non-imaged portion of the region of interest and the identification of the signpost digital image is at least partially based on the omitted-coverage list. With reference to the example of FIG. 6 described above, the coverage-analysis circuit may identify for example at least one of images 210.3, 210.5, 210.6, and 210.7 as the signpost digital image spatially proximate to the possible non-imaged portion of the region of interest 218. In an alternative embodiment, for example, if the digital image 210.8 included a readily perceivable feature such as a mole, the coverage-analysis circuit may identify the digital image 210.8 as the signpost digital image adjacent to the possible non-imaged portion of the region of interest 218 even though the digital image 210.8 is not immediately adjacent. Continuing with FIG. 12, in an alternative embodiment, reporting circuit 636 includes a reporting circuit configured to output informational data indicative of the possible non-imaged portion of the region of interest adjacent to the selected digital image and of the signpost digital image.

In an alternative embodiment, the coverage-analysis circuit 648 includes a coverage-analysis circuit configured to identify a particular portion of the region of interest of a surface as likely not included in the plurality of digital images (hereafter "possible non-imaged portion of the region of interest"). The identification of the possible non-imaged portion of the region of interest is at least partially based on application of a filter or a template to the omitted-coverage list. For example, the filter may include a threshold requirement that a certain minimum number of adjacent border region segments of the selected digital image have a "likely not overlapped" determined border region-overlap status before identification of a particular portion of the region of interest of a surface as likely not included in the plurality of digital images.

Figure 13:
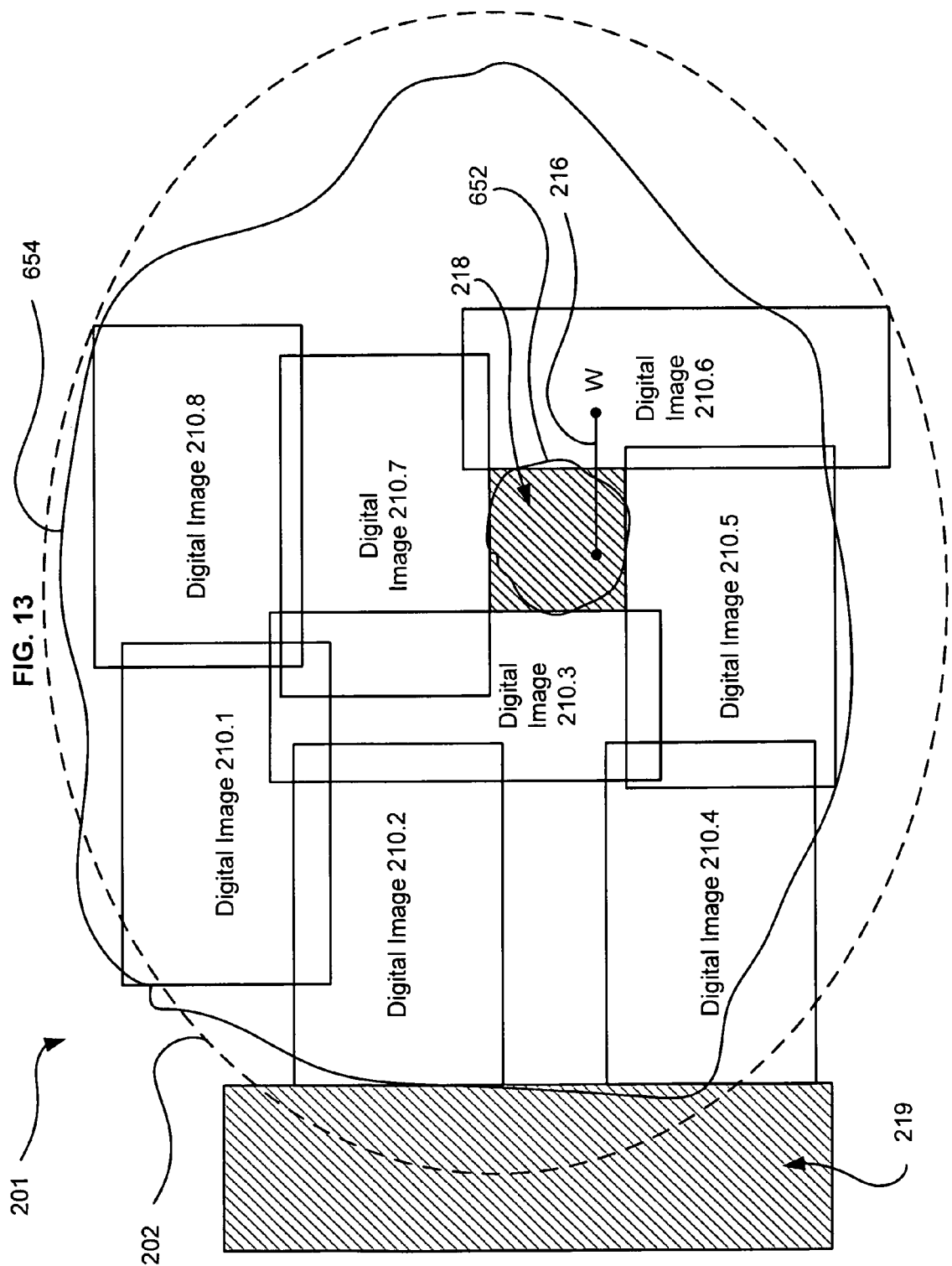
FIG. 13 partially illustrates an application of an alternative embodiment of the coverage-analysis circuit to the plurality of digital images previously illustrated in FIG. 6.

FIG. 13 partially illustrates an application of an alternative embodiment of the coverage-analysis circuit 648 to the plurality of digital images 210 previously illustrated in FIG. 6. In the alternative embodiment, the coverage-analysis circuit 648 includes a coverage-analysis circuit configured to (i) identify a particular portion 218 of the region of interest 202 of a surface 201 as likely not included in the plurality of digital images (hereafter "possible non-imaged portion of the region of interest"). The identification of the possible non-imaged portion of the region of interest is at least partially based on the omitted-coverage list. The coverage-analysis circuit is also configured to (ii) identify at least three digital images of the plurality of digital images immediately adjacent to the possible non-imaged portion of the region of interest. The identification of the at least three digital images is at least partially based on the omitted-coverage list. In a first example, a first set of identified at least three digital images includes digital images 210.3, 210.5, 210.6, and 210.7. The coverage-analysis circuit is also configured to (iii) define a simple closed curve formed by linking at least one detected border region segment of each of the at least three identified digital images, wherein the border region segments each have an overlap status of "likely not overlapped". For example, a simple closed curve, sometimes known as a Jordan curve, includes a non-self intersecting closed curve, i.e., a connected curve that does not cross itself and ends at the same point where it begins. A first simple closed curve 652 is formed by linking at least one detected border region segment of each of the at least three identified digital images, wherein the border region segments each have an overlap status of "likely not overlapped." The coverage-analysis circuit is also configured to (iv) determine whether the possible non-imaged portion of the region of interest lies substantially inside or substantially outside of the region of interest. The determination is at least partially based on the positions of the identified at least three digital images relative to the closed curve. FIG. 13 illustrates the positions of the first set of the identified at least three digital images (210.3, 210.5, 210.6, and 210.7) as substantially outside of the first closed curve 652. As a result, the coverage-analysis circuit would determine that the first possible non-imaged portion 218 of the surface lies inside of the region of interest. In a second example, a second possible non-imaged portion 219 of the surface is identified. A second set of identified at least three digital images includes digital images 210.1, 210.2, and 210.4. A second simple closed curve 654 is formed by linking at least one detected border region segment of each of the second set of at least three identified digital images, wherein the border region segments each have an overlap status of "likely not overlapped." FIG. 13 illustrates the positions of the second set of identified at least three digital images (210.1, 210.2, and 210.4) as substantially inside the second closed curve 654. As a result, the coverage-analysis circuit would determine that the second possible non-imaged portion 219 of the surface lies outside of the region of interest. Continuing with reference to FIG. 12, in an embodiment, the reporting circuit 636 includes a reporting circuit configured to output informational data indicative of the identified possible non-imaged portion of the region of interest and indicative of the determination whether the possible non-imaged portion of the region of interest lies inside or outside of the region of interest.

FIG. 13 partially illustrates another alternative embodiment of the coverage-analysis circuit 648. In an alternative embodiment, the coverage-analysis circuit includes a coverage-analysis circuit configured to (i) tentatively identify a particular portion of the region of interest 202 of the surface 201 as likely not included in the plurality of digital images 210 (hereafter "tentative non-imaged portion"). The "tentative non-imaged portion" is identified at least partially based on an analysis of the omitted-coverage list. The coverage-analysis circuit is also configured to (ii) determine if the "tentative non-imaged portion" likely includes an outer periphery portion of the region of interest included in the plurality of digital images. For example, a first "tentative non-imaged portion" of this alternative embodiment may be illustrated by the first non-imaged portion 218 and a second "tentative non-imaged portion" of this alternative embodiment may be illustrated by the second non-imaged portion 219. Any technique known to those of skill in the art may be used to make this determination. For example, the coverage-analysis circuit may use the previously described technique of defining a simple closed curve linking at least one border region segment of each of at least three identified digital images adjacent to a "tentative non-imaged portion of the region of interest" and determining whether the "tentative non-imaged portion of the region of interest" lies inside or outside of the region of interest. As described above, the first "tentative non-imaged portion" of this alternative embodiment by the first non-imaged portion 218 would be determined as "likely does not include an outer periphery of the region of interest included in the plurality of digital images." Also as described above, the second "tentative non-imaged portion" of this alternative embodiment illustrated by the second non-imaged portion 219 would be determined a "likely does include an outer periphery of the region of interest included in the plurality of digital images."

In this embodiment, the coverage-analysis circuit 648 is also configured (iii) if the identified "tentative non-imaged portion" likely does not include an outer periphery of the region of interest 202 included in the plurality of digital images 210, to classify the "tentative non-imaged portion" as a "possible non-imaged portion of the region of interest." Continuing with the above example, since the first "tentative non-imaged portion," illustrated by the first possible non-imaged portion 218, would be determined as likely does not include an outer periphery of the region of interest included in the plurality of digital images, the coverage-analysis circuit will classify it as a "possible non-imaged portion of the region of interest." The reporting circuit 636 will output informational data indicative of the possible non-imaged portion 218 of the region of interest. Continuing with the above example, since the second "tentative non-imaged portion," illustrated by the second possible non-imaged portion 219, would be determined as likely does include an outer periphery of the region of interest included in the plurality of digital images, the coverage-analysis circuit will not classify it as a "possible non-imaged portion of the region of interest." As a result, the reporting circuit will not output informational data indicative of the possible non-imaged portion of the region of interest 219. An advantage of this embodiment is that the reporting circuit will not output informational data indicative of "possible non-imaged portions of the region of interest" lying on the outer periphery of the plurality of digital images. Since the plurality of digital images only describe a part of the surface 201, these unbounded regions may be beyond the desired region of interest of the surface and are in effect winnowed out of the reporting.

Continuing with reference to FIG. 12, in an embodiment, the reporting circuit 636 includes a reporting circuit configured to output a rendering of the informational data in a form facilitating a human-perceivable representation of the informational data. For example, the reporting circuit may be configured to output a rendering of the informational data optimized in a form facilitating a human-perceivable representation of the informational data on a portable display, such as a display device associated with the communication device 642, or the screen 294 associated with the computing device 292. For example, the reporting circuit may be configured to output the informational data in a format facilitating a human-viewable representation of the informational data.

In an embodiment, the feature-detection 624 circuit includes a feature-detection circuit configured to extract at least one surface feature included in a digital image of the plurality of digital images 210. In an embodiment, the feature-detection circuit includes a feature-detection circuit configured to extract at least one surface feature included in a border region segment of a digital image of the plurality of digital images. See the border region segment 211.1 of FIG. 4 for an example of a surface feature included in a border region segment. In an embodiment, the feature-detection circuit includes a feature-detection circuit configured to extract at least one human-perceivable feature included in a digital image of the plurality of digital images. In an embodiment, the feature-detection circuit includes a feature-detection circuit configured to extract at least one human vision perceivable feature included in a digital image of the plurality of digital images. In an embodiment, the feature-detection circuit includes a feature-detection circuit configured to extract at least one feature included in a border region segment of a digital image of the plurality of digital images. In an embodiment, the feature-detection circuit includes a feature-detection circuit configured to extract at least one feature included in the field of view of a digital image of the plurality of digital images. In an embodiment, the feature-detection circuit includes a feature-detection circuit configured to detect and extract at least one feature included in a digital image of the plurality of digital images. In an embodiment, the feature-detection circuit includes a feature-detection circuit configured to detect and extract a human-perceivable feature included in a digital image of the plurality of digital images.

In an embodiment, the iteration control circuit 646 includes an iteration control circuit configured to iteratively designate a next digital image from the plurality of digital images 210 as the selected digital image (hereafter "iteratively designed selected digital image") until each digital image of the plurality of digital images has been designated. The iteration control circuit is configured to initiate a generation of data indicative of a border region-overlap status for each iteratively designated selected digital image. The iteration control circuit is configured to add the data indicative of a determined border region-overlap status for each iteratively designated selected digital image to the omitted-coverage list. In an embodiment, the system 620 further includes computer-readable media 239 configured to maintain the informational data.

FIG. 12 illustrates an alternative embodiment of the system 620. In the alternative embodiment, the system includes the feature-matching circuit 628 configured to determine a substantial correspondence between (x) a perceivable feature included in a border region segment of a selected digital image of a plurality of digital images and (y) at least one respective perceivable feature included in each digital image of the plurality of digital images other than the selected digital image. The each digital image of the plurality of digital images includes a respective portion of a region of interest of a surface. The alternative embodiment of the system includes the data collection circuit 632 configured to gather the determined substantial correspondences for the perceivable feature included in the border region segment of the selected digital image. The alternative embodiment of the system includes the overlap-analysis circuit 634 configured to generate data indicative of a border region-overlap status of the selected digital image. The data is generated at least partially in response to the gathered determined substantial correspondences for the perceivable feature. The alternative embodiment of the system includes the list management circuit 644 configured to add the data indicative of the determined border region-overlap status to an omitted-coverage list. The alternative embodiment of the system includes the iteration control circuit 646 configured to iteratively designate a next digital image from the plurality of digital images as the selected digital image until each digital image of the plurality of digital images has been designated. The iteration control circuit is also configured to initiate a processing of each of the iteratively designated next digital images by the feature-matching circuit, the data collection circuit, the overlap circuit, and the list management circuit. The alternative embodiment of the system includes the coverage-analysis circuit 648 configured to identify a particular portion of the region of interest as likely not included in the plurality of digital images (hereafter "possible non-imaged portion of the region of interest"). The identifying the possible non-imaged portion of the region of interest is at least partially based on the omitted-coverage list. The alternative embodiment of the system includes the reporting circuit 636 configured to output informational data indicative of the possible non-imaged portion of the region of interest.

FIG. 14 illustrates an example operational flow 700 implemented in a computing device. After a start operation, the operational flow includes a detection operation 730. The detection operation includes extracting at least one respective perceivable feature included in each digital image of a plurality of digital images. The each digital image of the plurality of digital images includes a respective portion of a region of interest of a surface. In an embodiment, the detection operation may be implemented using the feature-detection circuit 624 described in conjunction with FIG. 12. A feature correspondence operation 740 includes determining a substantial correspondence between (x) an extracted perceivable feature included in a border region segment of a selected digital image of the plurality of digital images and (y) an extracted at least one respective perceivable feature included in each digital image of the plurality of digital images other than the selected digital image. In an embodiment, the feature correspondence operation may be implemented using the feature-matching circuit 628 described in conjunction with FIG. 12. A data collection operation 750 includes gathering the determined substantial correspondences for the extracted perceivable feature included in the border region segment of the selected digital image. In an embodiment, the data collection operation may be implemented using the data collection circuit 632 described in conjunction with FIG. 12. An overlap-analysis operation 760 includes generating data indicative of a border region-overlap status of the selected digital image. The data is generated at least partially in response to the gathered determined substantial correspondences. In an embodiment, the overlap-analysis operation may be implemented using the overlap-analysis circuit 634 described in conjunction with FIG. 12. A list management operation 765 includes adding the data indicative of the determined border region-overlap status for the border region segment of the selected digital image to an omitted-coverage list. In an embodiment, the list management operation may be implemented using the list management circuit 644 described in conjunction with FIG. 12. A next-image selection operation 770 includes iteratively designating a next digital image from the plurality of digital images as the selected digital image until each digital image of the plurality of digital images has been designated. In an embodiment, the next-image selection operation may be implemented using the iteration control circuit 646 described in conjunction with FIG. 12. An iteration operation 775 includes initiating a processing of each of the iteratively designated next digital images, the processing includes operations 740, 750, 760, and 765. In an embodiment, the iteration operation may also be implemented using the iteration control circuit 646 described in conjunction with FIG. 12. A coverage-analysis operation 780 includes identifying a particular portion of the region of interest as likely not included in the plurality of digital images (hereafter "possible non-imaged portion of the region of interest"). The identification of the possible non-imaged portion of the region of interest is at least partially based on the omitted-coverage list. In an embodiment, the coverage-analysis operation may be implemented using the coverage-analysis circuit 648 described in conjunction with FIG. 12. A reporting operation 790 includes outputting informational data indicative of the possible non-imaged portion of the region of interest. In an embodiment, the reporting operation may be implemented using the reporting circuit 636 described in conjunction with FIG. 12. The operational flow includes an end operation.

FIG. 15 illustrates an alternative embodiment of the example of the operational flow 700 of FIG. 14. In an embodiment, the operational flow includes an operation 710 receiving the plurality of digital images. In an embodiment, the operational flow includes an operation 720 detecting a border region segment of the selected digital image.

FIG. 16 illustrates an alternative embodiment of the example of the operational flow 700 of FIG. 14. In an embodiment, the reporting operation 790 may include at least one additional operation. The at least one additional operation may include an operation 792 or an operation 794. The operation 792 includes outputting informational data usable in displaying a human-perceivable indication of the possible non-imaged portion of the region of interest. The operation 794 includes outputting informational data configured to provide a particular visual depiction of the possible non-imaged portion of the region of interest. In an embodiment, the operational flow 700 may include at least one additional operation 795. The at least one additional operation may include an operation 796, an operation 797, or an operation 798. The operation 796 includes displaying the informational data. The operation 797 includes maintaining the informational data in computer-readable storage media. The operation 798 includes providing a notification at least partially based on the informational data to at least one of a human, computer, or system.

FIG. 17 illustrates an example computer program product 800. The computer program product includes computer-readable media 810 bearing program instructions 820. The program instructions, when executed by a processor of a computing device, cause the computing device to perform a process. The process includes (a) extracting at least one respective perceivable feature included in each digital image of a plurality of digital images. The each digital image of the plurality of digital images includes a respective portion of a region of interest of a surface. The process includes (b) determining a substantial correspondence between (x) an extracted perceivable feature included in a border region segment of a selected digital image of the plurality of digital images and (y) an extracted at least one respective perceivable feature included in the each digital image of the plurality of digital images other than the selected digital image. The process includes (c) gathering the determined substantial correspondences for the extracted perceivable feature included in the border region segment of the selected digital image. The process includes (d) generating data indicative of a border region-overlap status of the selected digital image. The data is generated at least partially in response to the gathered determined substantial correspondences. The process includes (e) adding the data indicative of the determined border region-overlap status for the border region segment of the selected digital image to an omitted-coverage list. The process includes (f) iteratively designating a next digital image from the plurality of digital images as the selected digital image until each digital image of the plurality of digital images has been designated. The process includes (g) processing of each of the iteratively designated next digital images, the processing includes operations (b), (c), (d), and (e). The process includes (h) identifying a particular portion of the region of interest as likely not included in the plurality of digital images (hereafter "possible non-imaged portion of the region of interest"). The identifying the possible non-imaged portion of the region of interest is at least partially based on the omitted-coverage list. The process includes (i) outputting informational data indicative of the possible non-imaged portion of the region of interest.

In an embodiment, the (i) outputting informational data includes 822 (i) transforming the informational data into a particular visual depiction of a possible non-imaged portion of the region of interest and outputting the transformed informational data. In an embodiment, the process further includes 824 (j) outputting informational data includes providing a notification at least partially based on the informational data to at least one of a human, computer, or system. In an embodiment, the computer-readable media 810 includes a tangible computer-readable media 812. In an embodiment, the computer-readable media includes a communications media 814.

Figure 18:
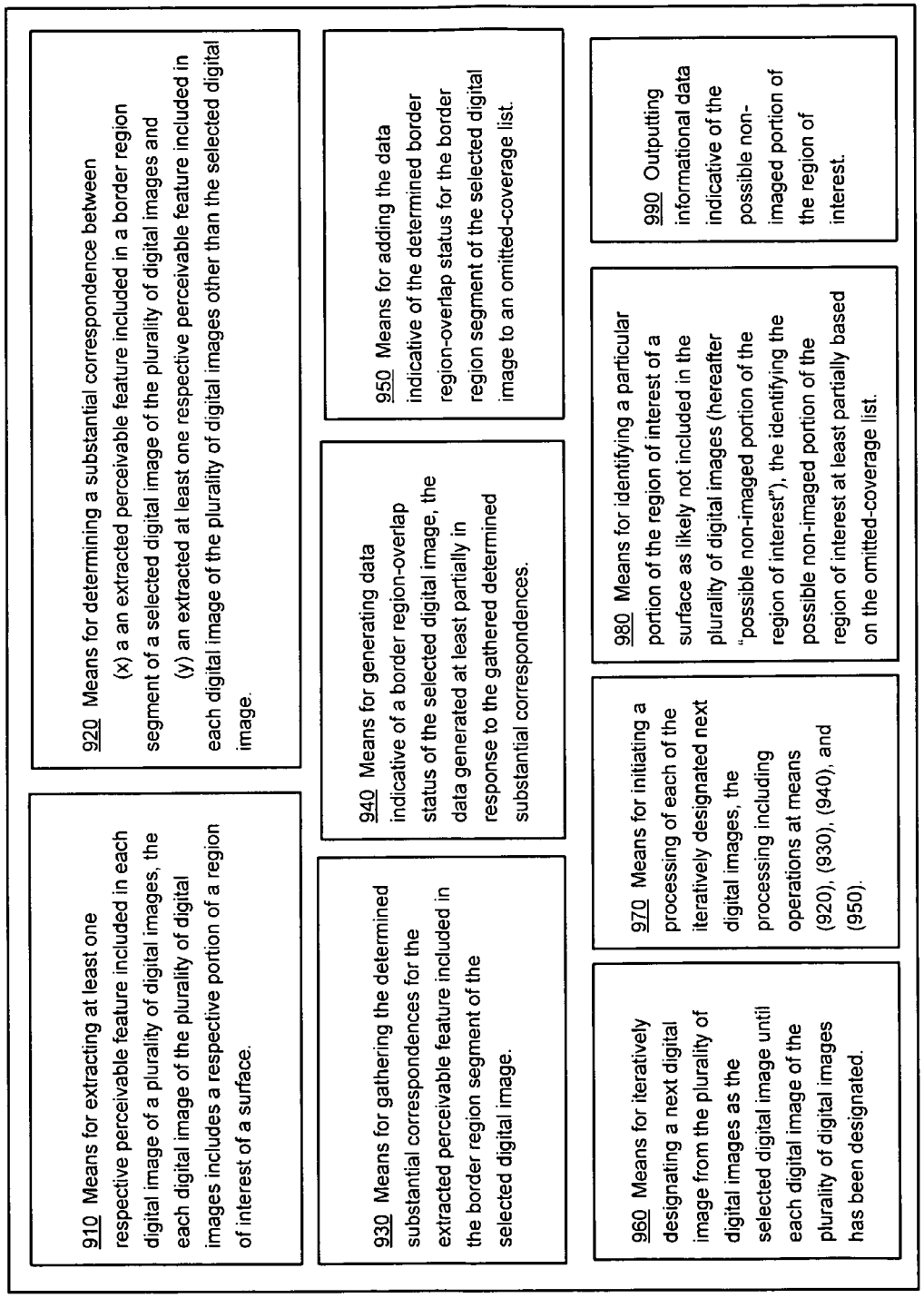
FIG. 18 illustrates an example system.

FIG. 18 illustrates an example system 900. The system includes means 910 for extracting at least one respective perceivable feature included in each digital image of a plurality of digital images. The each digital image of the plurality of digital images includes a respective portion of a region of interest of a surface. The system includes means 920 for determining a substantial correspondence between (x) an extracted perceivable feature included in a border region segment of a selected digital image of the plurality of digital images and (y) an extracted at least one respective perceivable feature included in each digital image of the plurality of digital images other than the selected digital image. The system includes means 930 for gathering the determined substantial correspondences for the extracted perceivable feature included in the border region segment of the selected digital image. The system includes means 940 for generating data indicative of a border region-overlap status of the selected digital image. The data is generated at least partially in response to the gathered determined substantial correspondences. The system includes means 950 for adding the data indicative of the determined border region-overlap status for the border region segment of the selected digital image to an omitted-coverage list. The system includes means 960 for iteratively designating a next digital image from the plurality of digital images as the selected digital image until each digital image of the plurality of digital images has been designated. The system includes means 970 for initiating a processing of each of the iteratively designated next digital images, the processing includes operations at means 920, 930, 940, and 950. The system includes means 980 for identifying a particular portion of the region of interest as likely not included in the plurality of digital images (hereafter "possible non-imaged portion of the region of interest"). The identification of the possible non-imaged portion of the region of interest is at least partially based on the omitted-coverage list. The system includes means 990 for outputting informational data indicative of the possible non-imaged portion of the region of interest.

Figure 19:
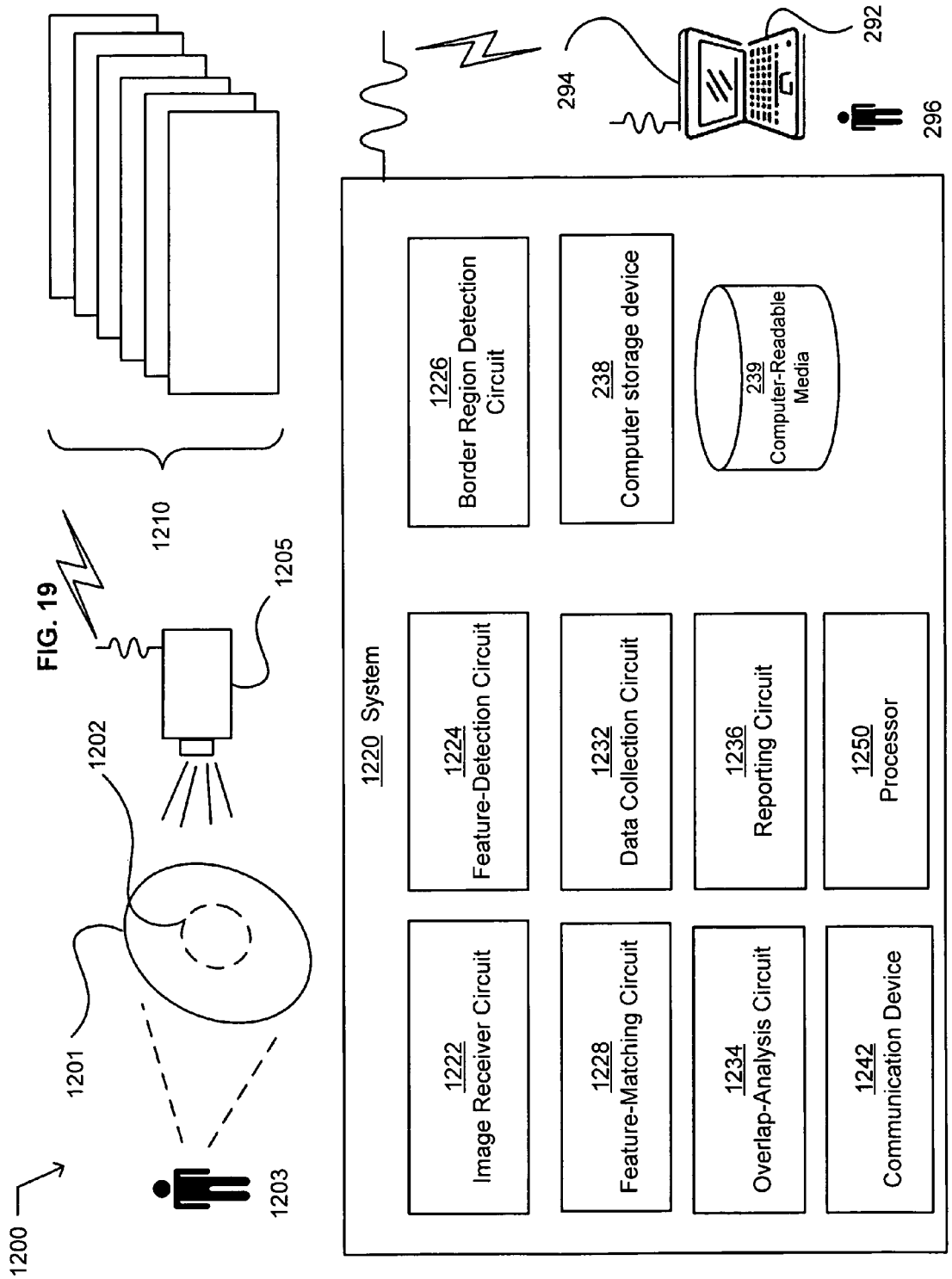
FIG. 19 illustrates an environment.

FIG. 19 illustrates an environment 1200. The environment includes a surface of the skin 1201 of an individual human 1203, a handheld digital image acquisition device 1205 (illustrated as a camera), a plurality of medical skin images 1210, a system 1220, and the computing device 292 having the screen 294 visible to the person 296.

The system 1220 includes a feature-detection circuit 1224 configured to extract at least one respective human-perceivable feature included in each medical image of a plurality of medical images 1210 of the surface of the skin 1201 of an individual human 1203 (hereafter "medical skin images"). The each medical image of plurality of medical skin images includes a respective portion of a region of interest 1202 of the surface of the skin of the individual human, and was acquired by the handheld digital image acquisition device 1205. The system includes a feature-matching circuit 1228 configured to determine a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The system includes a data collection circuit 1232 configured to gather the determined substantial correspondences for the human-perceivable feature included in the border region segment of the selected medical skin image. The system includes a reporting circuit 1236 configured to output informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image. In an embodiment, the system includes a processor 1250. In an embodiment, the processor may be at least substantially similar to the processing unit 21 described in conjunction with FIG. 1. In an embodiment, the processor may be at least substantially similar to the processor 120 described in conjunction with FIG. 2.

For example, a "medical skin image" may include a digital image of the skin of the individual human 1203 selected or captured by a health care provider during a medical procedure or examination, or by the individual 1203 during self-examination. The region of interest may have been selected for any reason, including a possible disease state, or cosmetic reasons. Alternatively, the region of interest may have been selected by a machine. For example, a "medical skin image" may be of an exterior skin surface, or an interior skin surface, such as the interior skin surface of a colon or stomach. For example, a "medical skin image" may include an image created using a technique or process for clinical purposes or medical science. For example, "a medical skin image" may include an image produced using a technique or process involving light in the visible, infrared, or ultraviolet spectrums. For example, a "medical skin image" may include an image that was acquired using at least two wavelength energies and rendered visible to the human eye using an enhancement or augmentation technique. For example, the wavelength energies may include visible light, near infrared, infrared, or ultrasound.

For example, a perceivable feature may include a human-vision perceivable feature. For example, a human-vision perceivable feature may include a feature that is visible to the naked eye or using natural human vision, including corrective lenses. In an embodiment, a perceivable feature may include an augmented human-vision perceivable feature, such as a feature visible to the naked eye as a result of computer implemented enhancement, or computer augmented vision.

In an embodiment, the system 1220 includes an image receiver circuit 1222 configured to receive the plurality of medical skin images 1210. In an embodiment, the image receiver circuit includes an image receiver circuit configured to retrieve the plurality of medical skin images acquired by the handheld digital image acquisition device 1205 from a memory and/or storage device of a handheld digital image acquisition device. For example, the image receiver circuit may be configured to pull the plurality of medical skin images from a memory and/or storage device of the handheld digital image acquisition device. In an embodiment, the image receiver circuit includes an image receiver circuit configured to import from third-party device the plurality of medical skin images acquired by the handheld digital image acquisition device. In an embodiment, the image receiver circuit includes an image receiver circuit configured to receive a push of the plurality of medical skin images from the handheld digital image acquisition device. In an embodiment, the plurality of medical skin images were acquired during an imaging session by the handheld digital image acquisition device. For example, an imaging session may be a single session, or a combination of multiple sessions.

In an embodiment, the handheld digital image acquisition device 1205 includes a handheld digital imaging device configured to capture the plurality of medical skin images. In an embodiment, the handheld digital image acquisition device includes a handheld digital image acquisition device held by the individual human. In an embodiment, the handheld digital image acquisition device includes a handheld digital image acquisition device held and operated by a third-party human, illustrated as the human 296.

In an embodiment, the reporting circuit 1236 includes a reporting circuit configured to output the informational data in substantially real-time. In an embodiment, the reporting circuit includes a reporting circuit configured in cooperation with the feature-detection circuit 1224, the feature matching circuit 1228, and the data collection circuit 1232 to output the informational data in substantially real-time. In an embodiment, substantially real-time includes while the handheld digital image acquisition device is in motion acquiring the plurality of medical skin images. For example, in this embodiment, the system 1220 outputs the informational data while additional medical skin images are being acquired. Substantially real-time informational data is anticipated to timely inform the user of the handheld digital image acquisition device during an image acquisition session of a possible non-imaged portion of the region of interest of the skin, and allow the user to position the handheld digital image acquisition device and acquire a medical skin image of the possible non-imaged portion before terminating the image acquisition session. In an embodiment, substantially real-time includes less than approximately 30 minutes after the plurality of medical skin images are received by the system. In an embodiment, substantially real-time includes less than approximately 15 minutes after the plurality of medical skin images are received by the system. In an embodiment, substantially real-time includes less than approximately 6 minutes after the plurality of medical skin images are received by the system. In an embodiment, substantially real-time includes less than approximately 2 minutes after the plurality of medical skin images are received by the system. In an embodiment, substantially real-time includes less than approximately 1 minute after the plurality of medical skin images are received by the system. In an embodiment, substantially real-time includes less than approximately 30 seconds after the plurality of medical skin images are received by the system.

In an embodiment, the system 1220 includes a border region detection circuit 1226 configured to detect a border region segment of a medical skin image of the plurality of medical skin images. In an embodiment, the feature matching circuit 1228 includes a feature-matching circuit configured to determine a substantial correspondence between (x) an extracted human-perceivable feature included in a detected border region segment of a selected medical skin image of the plurality of medical skin images and (y) an extracted at least one respective human-perceivable feature included in the each medical skin image of the plurality of medical skin images other than the selected medical skin image.

Figure 20:
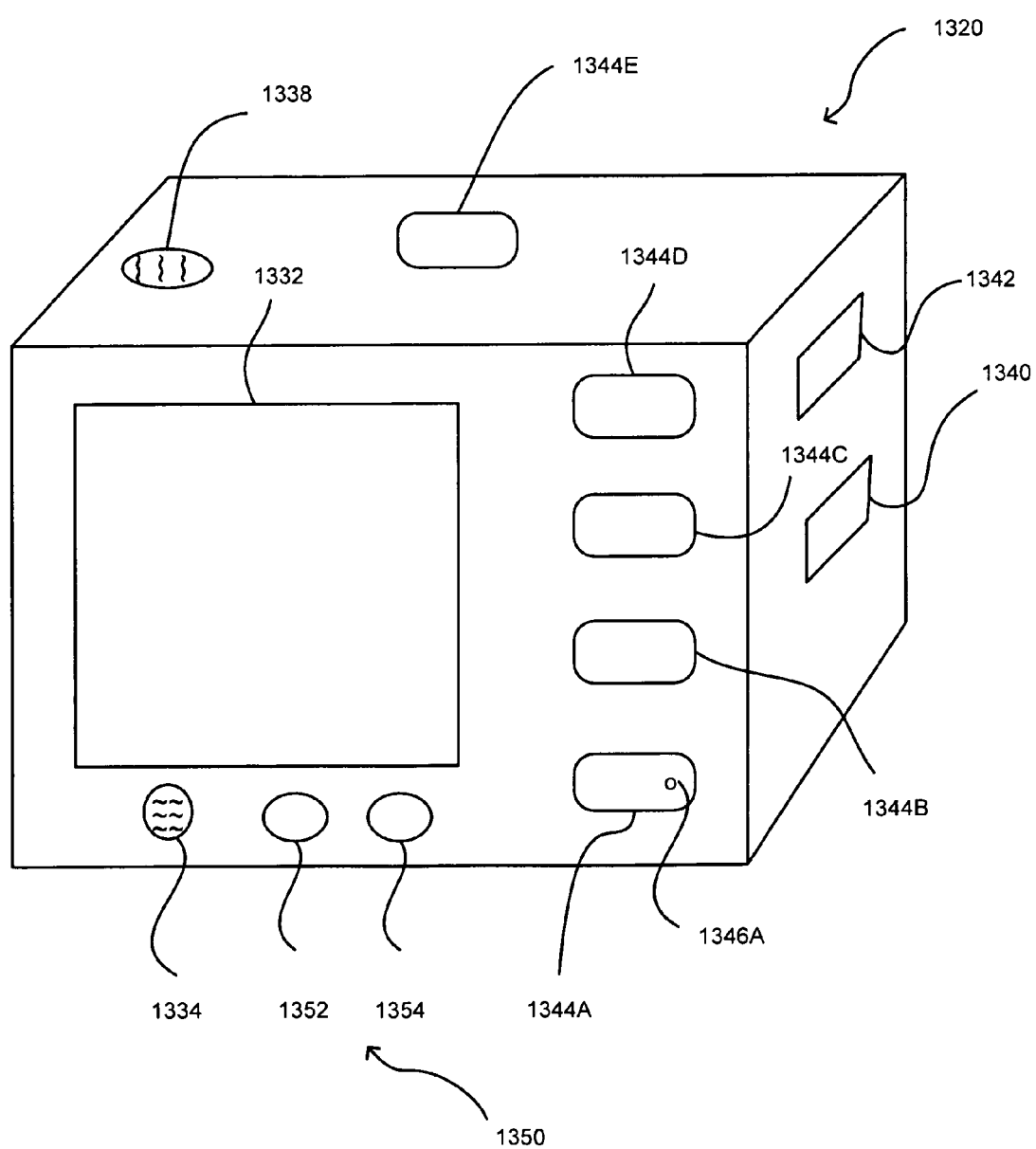
FIG. 20 illustrates a handheld digital image acquisition device.

FIG. 20 illustrates an embodiment of a handheld digital image acquisition device 1205 having image capture and image storage functionality. For example, the handheld digital acquisition device may include a handheld digital camera, such as a handheld digital camera commonly available on the consumer market, or an analog camera with a digital frame grabber. For example, the handheld digital acquisition device may include a cellular phone having a built-in digital camera, or a smart phone having a built-in digital camera. For example, the handheld digital acquisition device may include tablet computer, a laptop computer, a notebook computer, or the like and having a built-in digital camera.

The handheld digital image acquisition device 1205 includes a computing device (not shown), such as for example, the thin computing device 20 described in conjunction with FIG. 1, that is operable to interact with functional elements of the handheld digital image acquisition device. The handheld digital image acquisition device also includes a plurality of user interfaces 1320. The plurality of interfaces 1320 includes a display 1332. In alternative embodiments, the display may provide a textual, a visual display, and/or a graphical display. In a further embodiment, the display may include touch screen functionality operable to accept a user input. The plurality of user interfaces of the camera also includes a microphone 1334, a speaker 1338, and a plurality of tangible or virtual buttons 1344A-1344E. One or more of the tangible or virtual buttons may include a light emitter, such as a light emitting device 1346A. Further, one or more of the tangible or virtual buttons 1344A-1344E may include a vibrator operable to provide a tactile display. The display 1332 and the tangible or virtual buttons 1344A-1344E may have any functionality appropriate to the handheld digital image acquisition device. For example, the button 1344E may be assigned to operate a camera element, such as a shutter function. The button 1344A may be assigned an "enter" function, and buttons 1344B and 1344C may be respectively assigned a scroll up and scroll down function relative to a menu displayed on the display 1332. The button 1344D may be assigned to operate another camera element, such as a lens zoom function. The handheld digital image acquisition device also includes context sensors 1350, which may be selected, for example, to produce relevant information about an environment extrinsic to the handheld digital image acquisition device. The context sensors are illustrated as an external temperature sensor 1352 and a light intensity sensor 1354. The handheld digital image acquisition device further includes a USB port 1340, a network port 1342, and/or a wireless port (not shown).

In addition, the handheld digital image acquisition device 1205 includes a lens (not shown) and an image acquisition module (not shown). The image acquisition module controls the lens, a shutter, an aperture, and/or other elements as necessary to capture an image through the lens. In an embodiment, capturing images using a handheld digital image acquisition device may be equated with photography as performed by conventional digital cameras. A captured image may be processed, stored, viewed, and/or distributed by the handheld digital image acquisition device. The handheld digital image acquisition device also includes a system memory (not shown), such as the system memory 22 of the thin computing device 20 of FIG. 1. The system memory includes saved operating systems and programs necessary to operate the handheld digital image acquisition device. In addition, the handheld digital image acquisition device may include a computer readable media (not shown). The handheld digital image acquisition device may be configured to capture still images, to capture streaming images, or to capture both still and streaming images.

The handheld digital image acquisition device 1205 includes operability to receive a user input through an interface of the plurality of interfaces 1320. For example, in an embodiment, detecting a user touch to the button 1344D may be received as an instruction and/or a selection. Another detected user touch to another user interface of the plurality of user interfaces 1320 may be received as another instruction and/or a selection. The user touch may be detected by a user interface physically incorporated in the handheld digital image acquisition device 1205. In an alternative embodiment, a user input may be received by detecting a signal responsive to a sound or voice received by the microphone 1334. For example, a detection and recognition of a signal responsive to a spoken command to the microphone 1334 may be received as an instruction to activate a program associated with the handheld digital image acquisition device. Further, a detection of a signal responsive to a sound or voice may be received by the microphone 1334.

Returning to FIG. 19, in an embodiment, the system 1220 includes an overlap-analysis circuit 1234 configured to generate data indicative of a border region-overlap status of the selected medical skin image. The data is generated at least partially in response to the gathered determined substantial correspondences between the extracted perceivable feature included in the border region segment of the selected medical skin image and the at least one respective perceivable feature included in the each medical skin image of the plurality of medical skin images other than the selected medical skin image. In an embodiment, the reporting circuit includes a reporting circuit configured to output informational data indicative of the border region-overlap status of the selected medical skin image. The informational data is at least partially based on the data indicative of a border region-overlap status of the selected medical skin image.

In an embodiment, the system 1220 is a standalone system, and not physically incorporated within the handheld digital image acquisition device 1205. In an embodiment, the standalone system is configured to wirelessly communicate with the handheld digital image acquisition device. In an embodiment, the system 1220 is physically incorporated within the handheld digital image acquisition device 1205, for example within the embodiment of the handheld digital image acquisition device 1205 as illustrated in FIG. 20.

In an embodiment, the system 1220 includes computer-readable media 239 configured to maintain the informational data indicative of the possible non-imaged portion of the region of interest adjacent to the selected medical skin image. In an embodiment, the system includes a communication device configured to provide a notification at least partially based on the informational data to at least one of a human, computer, or system. For example, the communications device may be incorporated into the system as illustrated by the communication device 1242. In another example, the communication device may be a third-party device in communication with the system as illustrated by the computing device 292 having the screen 294. In an embodiment, the system includes a communication device configured to display a human-perceivable depiction of the informational data. In an embodiment, the system includes a communication device configured to output a signal usable in displaying a human-perceivable depiction of the informational data. For example, the human-perceivable depiction may include an audio depiction of the informational data or a visual depiction of the informational data.

FIG. 21 illustrates an example operational flow 1500 implemented in a computing device. After a start operation, the operational flow includes a feature-detection operation 1530. The feature-detection operation includes extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. In an embodiment, the feature-detection operation may be implemented using the feature-detection circuit 1224 described in conjunction with FIG. 19. A matching operation 1540 includes determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. In an embodiment, the matching operation may be implemented using the feature-matching circuit 1228 described in conjunction with FIG. 19. A data collection operation 1550 includes gathering the determined substantial correspondences for the human-perceivable feature included in the border region segment of the selected medical skin image. In an embodiment, the data collection operation may be implemented using the data collection circuit 1232 described in conjunction with FIG. 19. A reporting operation 1560 includes outputting informational data indicative of a possible non-imaged portion of the region of interest of the skin of the individual human adjacent to the selected medical skin image. The informational data is responsive to an absence of a determined substantial correspondence between the extracted human-perceivable feature included in the border region segment of the selected medical skin image and the extracted at least one respective feature included in the each medical skin image of the plurality of medical skin images other than the selected medical skin image. In an embodiment, the reporting operation may be implemented using the reporting circuit 1236 described in conjunction with FIG. 19. The operational flow includes an end operation.

FIG. 22 illustrates an alternative embodiment of the operational flow 1500 of FIG. 21. In an embodiment, the operational flow includes an operation 1510, which includes receiving the plurality of medical skin images. In an embodiment, the operational flow includes an operation 1520, which includes detecting the border region segment of a medical skin image of the plurality of medical skin images. In an embodiment, the operational flow may include an operation 1575. The operation 1575 includes iteratively designating a next medical skin image from the plurality of medical skin image as the selected medical skin image until each medical skin image of the plurality of medical skin images has been designated. The operation 1575 also includes initiating a processing of each of the iteratively designated next medical skin image, the processing includes operations 1530, 1540, and 1550. In an embodiment, the operational flow may include at least one additional operation 1580. The at least one additional operation may include an operation 1582, an operation 1584, or an operation 1586. The operation 1582 includes displaying the informational data. The operation 1584 includes maintaining the informational data in computer-readable storage media. The operation 1586 includes providing a notification at least partially based on the informational data to at least one of a human, computer, or system.

FIG. 23 illustrates an alternative embodiment of the operational flow 1500 of FIG. 21. In an embodiment, the operational flow may include at least one additional operation, such as the operation 1570. The operation 1570 includes generating data indicative of a border region-overlap status of the selected medical skin image. The data is generated at least partially in response to the determined substantial correspondences between the human-perceivable feature included in the border region segment of the selected medical skin image and the extracted at least one respective perceivable feature included in the each medical skin image of the plurality of medical skin images other than the selected medical skin image. The operation 1570 may include at least one additional operation, such as an operation 1572. The operation 1572 includes generating data indicative of a possible non-imaged portion of the region of interest adjacent to the selected medical skin image. The data is generated at least partially in response to the determined substantial correspondences between the extracted human-perceivable feature included in the border region segment of the selected medical skin image and the extracted at least one respective perceivable feature included in the each medical skin image of the plurality of medical skin images other than the selected medical skin image.

In an embodiment, the reporting operation 1560 may include at least one additional operation. The at least one additional operation may include an operation 1562, an operation 1564, an operation 1566, an operation 1568, or an operation 1569. The operation 1562 includes outputting informational data in substantially real time. The informational data is indicative of a possible non-imaged portion of the region of interest of the skin of the individual human adjacent to the selected medical skin image. The operation 1564 includes outputting informational data is indicative of a possible non-imaged portion of the region of interest of the skin of the individual human adjacent to the selected medical skin image. The informational data is at least partially based on the data indicative of a border region-overlap status of the selected medical skin image. The operation 1566 includes outputting informational data indicative of a possible non-imaged portion of the region of interest adjacent to the selected medical skin image. The informational data is at least partially based on the data indicative of a possible non-imaged portion of the region of interest adjacent to the selected medical skin image. The operation 1568 includes outputting informational data usable in displaying a human-perceivable indication of a possible non-imaged portion of the region of interest of the surface. The operation 1569 includes transforming the informational data into a particular visual depiction of a possible non-imaged portion of the region of interest of the surface, and outputting the transformed informational data. For example, the particular visual depiction may include a depiction of a location of the possible non-imaged portion of the region of interest or a bearing of the possible non-imaged portion of the region of interest relative to a determinable location.

FIG. 24 illustrates an alternative embodiment of the operational flow 1500 of FIG. 21. In an embodiment, the operational flow may include at least one additional operation, such as the operational flow 1590. The operational flow 1590 includes an operation 1591, an operation 1593, an operation 1596, and an operation 1598. The operation 1591 includes extracting at least one human-perceivable feature included in a follow-on medical image of the skin of the individual human (hereafter "follow-on medical skin image"). The follow-on medical skin image includes an image of a portion of the region of interest of the surface of the skin of the individual human, and was acquired by the handheld digital image acquisition device subsequent to the acquisition of the plurality of medical skin images. For example, a follow-on medical image may include a medical image acquired subsequent to acquisition of the plurality of medical images. For example, a follow-on medical image may include a medical image acquired as a consequence of the informational data outputted in operation 1560. For example, a follow-on medical image may include a medical image that follows something else as a consequence or natural development, such as a follow-up.

The operation 1593 includes determining a substantial correspondence between (x) an extracted human-perceivable feature included in a border region segment of the follow-on medical skin image and (y) an extracted at least one human-perceivable feature included in the selected medical skin image. The operation 1596 includes gathering the determined substantial correspondence for the border region segment of the follow-on medical skin image. The operation 1598 includes outputting updated informational data indicative of a possible non-imaged portion of the region of interest of the skin of the individual human adjacent to the selected medical skin image. The informational data is responsive to an absence of a determined substantial correspondence for the border region segment of the follow-on medical skin image.

In an embodiment, the operation 1593 may include at least one additional operation, such as an operation 1594. The operation 1594 includes determining a substantial correspondence between (x) an extracted human-perceivable feature included in a border region segment of the follow-on medical skin image and (y) an extracted at least one respective human-perceivable feature included in the each medical skin image of the plurality of medical skin images.

FIG. 25 illustrates an example computer program product 1600. The computer program product includes computer-readable media 1610 bearing program instructions 1620. The program instructions, when executed by a processor of a computing device, cause the computing device to perform a process. The process includes extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The process includes determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The process includes gathering the determined substantial correspondences for the border region segment of the selected medical skin image. The process includes outputting informational data indicative of a possible non-imaged portion of the region of interest of the skin of the individual human adjacent to the selected medical skin image. The informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

In an embodiment, the computer-readable media includes a tangible computer-readable media 1612. In an embodiment, the computer-readable media includes a communications media 1614.

FIG. 26 illustrates an alternative embodiment of the computer program product 1600 of FIG. 24. In an embodiment, the process includes 1622 receiving the plurality of medical skin images. In an embodiment, the process includes 1624 detecting a border region segment of a medical skin image of the plurality of medical skin images. In an embodiment, the process includes 1626 displaying the informational data. In an embodiment, the process includes 1628 maintaining the informational data in computer-readable storage media.

FIG. 27 illustrates an example system 1700. The example system includes means 1710 for extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The system includes means 1720 for determining a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The system includes means 1730 for gathering the determined substantial correspondences for the border region segment of the selected medical skin image. The system includes means 1740 for outputting informational data indicative of a possible non-imaged portion of the region of interest of the skin of the individual human adjacent to the selected medical skin image. The informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

Figure 28:
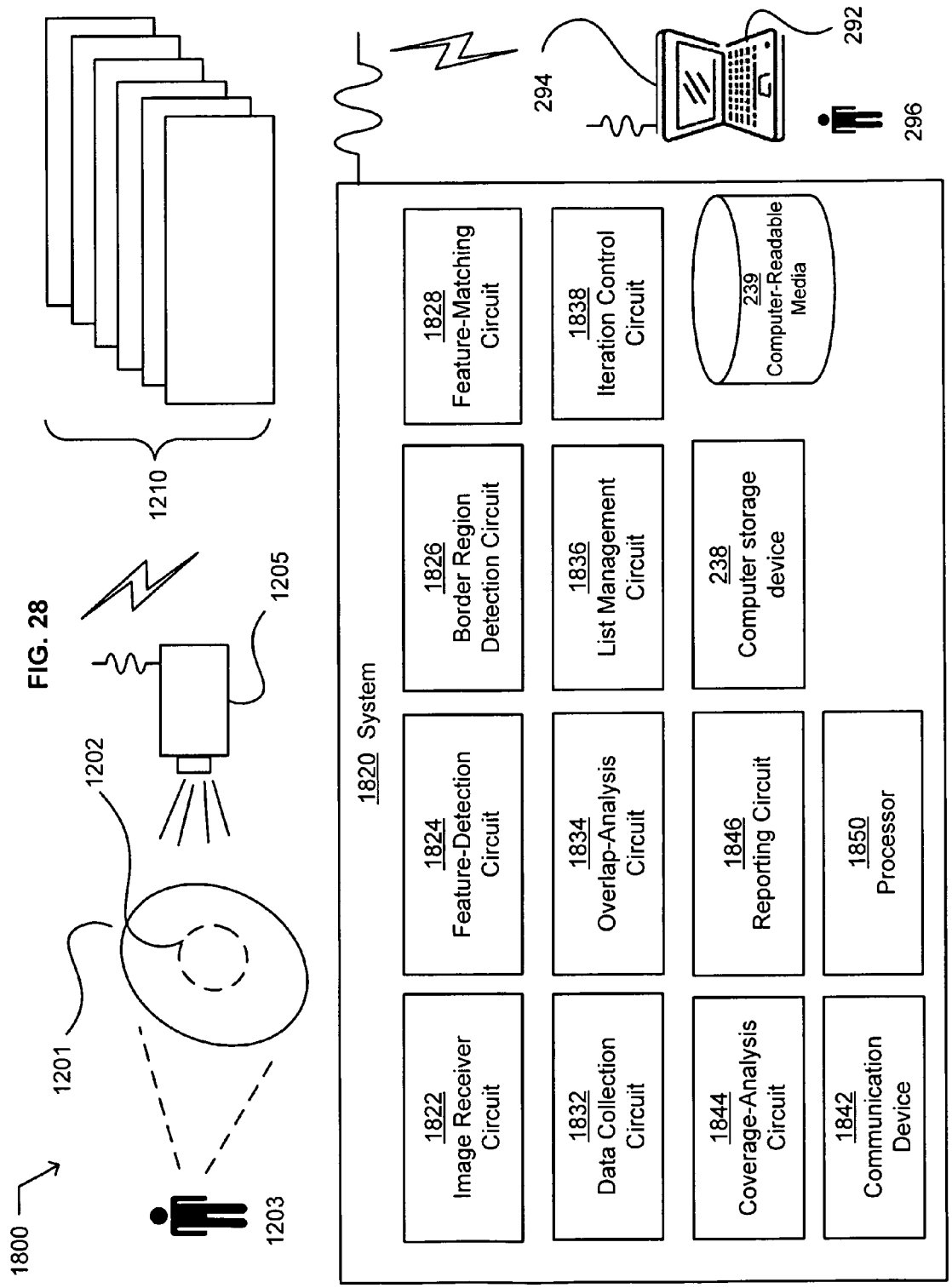
FIG. 28 illustrates an example environment.

FIG. 28 illustrates an example environment 1800. The example environment includes the surface of the skin 1201, the handheld digital image acquisition device 1205, the plurality of medical skin images 1210, a system 1820, and the computing device 292 having the screen 294 visible to the person 296.

The system 1820 includes a feature-detection circuit 1824 configured to extract at least one respective human-perceivable feature included in each medical image of a plurality of medical images 1210 of the surface of the skin 1201 of an individual human 1203 (hereafter "medical skin images"). The each medical image of plurality of medical skin images includes a respective portion of the region of interest 1202 of a surface of the skin of the individual human, and was acquired by the handheld digital image acquisition device 1205. The system includes a feature matching circuit 1828 configured to determine a substantial correspondence between (x) an extracted human-perceivable feature included in a border region segment of a selected medical skin image of the plurality of medical skin images and (y) an extracted at least one respective human-perceivable feature included in the each medical skin image of the plurality of medical skin images other than the selected medical skin image. The system includes a data collection circuit 1832 configured to gather the determined substantial correspondences for the extracted human-perceivable feature included in the border region segment of the selected medical skin image.

The system 1820 includes an overlap-analysis circuit 1834 configured to generate data indicative of a border region-overlap status of the selected medical skin image. The data is generated at least partially in response to the determined substantial correspondences. The system includes a list management circuit 1836 configured to add the data indicative of the determined border region-overlap status for the border region segment of the selected medical skin image to an omitted-coverage list. The system includes an iteration control circuit 1838 configured to iteratively designate a next medical skin image from the plurality of medical skin images as the selected medical skin image until each medical skin image of the plurality of medical skin images has been designated. The iteration control circuit is also configured to initiate a processing of each of the iteratively designated next medical skin images by the feature-matching circuit 1828, the data collection circuit 1832, the overlap-analysis circuit 1834, and the list management circuit 1836. The system includes a coverage-analysis circuit 1844 configured to identify a particular portion of the skin surface as likely not included in the plurality of medical skin images (hereafter "possible non-imaged portion of the region of interest"). The identification of the possible non-imaged portion of the region of interest 1202 is at least partially based on the omitted-coverage list. The system includes a reporting circuit 1846 configured to output user-assistance information at least partially based on the identified possible non-imaged portion of the skin.

In an embodiment, the system 1820 includes an image receiver circuit 1822 configured to receive the plurality of medical skin images 1210. In an embodiment, the system includes a border region detection circuit 1826 configured to detect a border region segment of a medical skin image of the plurality of medical skin images.

In an embodiment, the coverage-analysis circuit 1844 includes a coverage-analysis circuit configured to identify a particular portion of the surface of the skin 1201 as likely not included in the plurality of medical skin images 1210 (hereafter "possible non-imaged portion of the skin") and to identify at least one medical skin image of the plurality of medical skin images as spatially proximate to the possible non-imaged portion of the region of interest 1202 (hereafter "signpost medical skin image"). The identification of the possible non-imaged portion of the skin and the identification of the signpost medical skin image is at least partially based on the omitted-coverage list. In an embodiment, the reporting circuit 1846 includes a reporting circuit configured to output user-assistance information indicative of the possible non-imaged portion of the region of interest adjacent to the selected medical skin image and indicative of the signpost medical skin image.

In an embodiment, the coverage-analysis circuit 1844 includes a coverage-analysis circuit configured to identify a particular portion of the region of interest 1202 as likely not included in the plurality of medical skin images 1210 (hereafter "possible non-imaged portion of the region of interest"). The identification of the possible non-imaged portion of the region of interest at least partially based on the omitted-coverage list. The coverage-analysis circuit is configured to identify at least three medical skin images of the plurality of medical skin images immediately adjacent to the possible non-imaged portion of the region of interest. The identification of the at least three medical skin images is at least partially based on the omitted-coverage list. The coverage analysis circuit is configured to define a substantially simple closed curve. The coverage-analysis circuit is configured to determine whether the possible non-imaged portion of the region of interest lies inside or outside of the region of interest, The determination is at least partially based on the positions of the identified at least three medical skin images relative to the closed curve. For example, see description in conjunction with FIG. 13. Continuing with reference to FIG. 28, in an embodiment, the reporting circuit 1846 includes a reporting circuit configured to output user-assistance information indicative of the identified possible non-imaged portion of the region of interest and indicative of the determination whether the possible non-imaged portion of the region of interest lies inside or outside of the region of interest.

In an embodiment of the system 1820, the user-assistance information includes a user-assistance corresponding to a location of the possible non-imaged portion of the region of interest 1202. In an embodiment of the system, the user-assistance information includes user-assistance information corresponding to spatially orientating the handheld digital image acquisition device 1205 in an alignment to acquire a medical skin image of the possible non-imaged portion of the region of interest. In an embodiment of the system, the user-assistance information includes user-assistance information corresponding to selecting a parameter facilitating an acquisition of a medical skin image of the possible non-imaged portion of the region of interest. For example, the parameter may include a magnification, orientation, alignment, or lighting facilitating an acquisition of a medical skin image. In an embodiment of the system, the user-assistance information includes user-assistance corresponding to initiating an acquisition by a user-held digital image acquisition device of a medical skin image. In an embodiment, the user-assistance information includes user instructions corresponding to operating the user-held digital image acquisition device in acquiring a medical skin image. In an embodiment, the user-assistance information includes user-assistance responsive to a request entered by the user in conjunction with acquiring a medical skin image of the possible non-imaged portion of the region of interest. For example, the request entered by the user may be based upon a menu of available user-assistances.

In an embodiment, the system 1820 includes computer-readable media 239 configured to maintain the user-assistance information corresponding to the identified possible non-imaged portion of the region of interest 1202 and to the signpost medical skin image.

In an embodiment, the reporting circuit 1846 includes a reporting circuit configured to output user-assistance information in substantially real-time. The user-assistance information is at least partially based on the identified possible non-imaged portion of the surface of the skin 1201. In an embodiment, the reporting circuit includes a reporting circuit configured to output user-assistance information usable in displaying a human-perceivable indication of the possible non-imaged portion of the region of interest of the surface. In an embodiment, the reporting circuit includes a reporting circuit configured to output a rendering of the user-assistance information in a form facilitating a human-perceivable representation of the user-assistance information. For example, the rendering may include a pre-rendered user-assistance information. For example, the rendering may include an optimized representation of the user-assistance information. For example, the rendering may include a rendering of the user-assistance information structured in a format facilitating a human-perceivable representation of the user-assistance information. For example, the rendering may include a rendering of the user-assistance information in a form facilitating a human-vision perceivable representation or an augmented human-vision perceivable representation of the user-assistance information.

In an embodiment, the system 1820 includes the computer-readable media 239 configured to maintain the user-assistance information corresponding to the identified possible non-imaged portion of the region of interest 1202 and to the signpost medical skin image. In an embodiment, the system includes a communications device configured to display a particular human-perceivable depiction of the user-assistance information. For example, the communication device may include the communications device 1842. For example, the communications device may include a display of the handheld digital image acquisition device 1205. For example, the communication device may be a third-party device in communication with the system as illustrated by the computing device 292 having the screen 294. For example, the human-perceivable depiction may include a visual or an audio human-perceivable depiction of the user-assistance information. In an embodiment, the system includes a processor 1850. In an embodiment, the processor may be at least substantially similar to the processing unit 21 described in conjunction with FIG. 1. In an embodiment, the processor may be at least substantially similar to the processor 120 described in conjunction with FIG. 2.

FIG. 29 illustrates an example operational flow 1900 implemented in a computing device. After a start operation, the operational flow includes a detection operation 1930. The detection operation includes extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. In an embodiment, the detection operation may be implemented using the feature-detection circuit 1824 described in conjunction with FIG. 28. A feature matching operation 1940 includes determining a substantial correspondence between (x) an extracted human-perceivable feature included in a border region segment of a selected medical skin image of the plurality of medical skin images and (y) an extracted at least one respective human-perceivable feature included in each medical skin image of the plurality of medical skin images other than the selected medical skin image. In an embodiment, the feature matching operation may be implemented using the feature matching circuit 1828 described in conjunction with FIG. 28. A data collection operation 1950 includes gathering the determined substantial correspondences for the extracted human-perceivable feature included in the border region segment of the selected medical skin image. In an embodiment, the data collection operation may be implemented using the data collection circuit 1832 described in conjunction with FIG. 28.

An overlap-analysis operation 1960 includes generating data indicative of a border region-overlap status of the selected medical skin image. The data is generated at least partially in response to the determined substantial correspondences. In an embodiment, the overlap-analysis operation may be implemented using the overlap-analysis circuit 1834 described in conjunction with FIG. 28. A list management operation 1965 includes adding the data indicative of the determined border region-overlap status for the border region segment of the selected medical skin image to an omitted-coverage list. In an embodiment, the list management operation may be implemented using the list management circuit 1836 described in conjunction with FIG. 28. A next-image selection operation 1970 includes iteratively designating a next medical skin image from the plurality of medical skin images as the selected medical skin image until each medical skin image of the plurality of medical skin images has been designated. In an embodiment, the next-image selection operation may be implemented using the iteration control circuit 1838 described in conjunction with FIG. 28. An iteration operation 1975 includes processing of each of the iteratively designated next medical skin images by operations 1940, 1950, 1960, and 1965. In an embodiment, the iteration operation may also be implemented using the iteration control circuit 1838 described in conjunction with FIG. 28.

A coverage-analysis operation 1980 includes identifying a particular portion of the skin surface as likely not included in the plurality of medical skin images (hereafter "possible non-imaged portion of the skin"). The identifying the possible non-imaged portion of the skin is at least partially based on the omitted-coverage list. In an embodiment, the coverage-analysis operation may be implemented using the coverage-analysis circuit 1844 described in conjunction with FIG. 28. A reporting operation 1985 includes outputting user-assistance information at least partially based on the identified possible non-imaged portion of the skin. In an embodiment, the reporting operation may be implemented using the reporting circuit 1846 described in conjunction with FIG. 28. The operational flow includes an end operation.

FIG. 30 illustrates an alternative embodiment of the operational flow 1900 of FIG. 29. In an embodiment, the operational flow includes an operation 1910. The operation 1910 includes receiving the plurality of medical skin images. In an embodiment, the operational flow includes an operation 1920. The operation 1920 includes detecting a border region segment of a medical skin image of the plurality of medical skin images. In an embodiment, the reporting operation 1985 may include at least one additional operation. The at least one additional operation may include an operation 1986, an operation 1987, or an operation 1988. The operation 1986 includes outputting user-assistance information in substantially real-time and at least partially based on the identified possible non-imaged portion of the skin. The operation 1987 includes outputting user-assistance information usable in displaying a human-perceivable indication of the possible non-imaged portion of the region of interest of the surface. The operation 1988 includes transforming the user-assistance information into a particular visual depiction of a possible non-imaged portion of the region of interest of the surface, and outputting the transformed user-assistance information. In an embodiment, the operational flow includes a storage operation 1990. The storage operation 1990 includes maintaining the user-assistance information in computer-readable storage media. In an embodiment, the storage operation may be implemented using the computer-readable media 239 described in conjunction with FIG. 28.

FIG. 31 illustrates an example computer program product 2000. The computer program product includes computer-readable media 2010 bearing program instructions 2020. The program instructions, when executed by a processor of a computing device, cause the computing device to perform a process. The process includes (i) extracting at least one respective human-perceivable feature included in each medical image of a plurality of medical images of the skin of an individual human (hereafter "medical skin images"). The each medical image of plurality of medical skin images includes a respective portion of a region of interest of a surface of the skin of the individual human, and was acquired by a handheld digital image acquisition device. The process includes (ii) determining a substantial correspondence between (x) an extracted human-perceivable feature included in a border region segment of a selected medical skin image of the plurality of medical skin images and (y) an extracted at least one respective human-perceivable feature included in each medical skin image of the plurality of medical skin images other than the selected medical skin image. The process includes (iii) gathering the determined substantial correspondences for the extracted human-perceivable feature included in the border region segment of the selected medical skin image. The process includes (iv) generating data indicative of a border region-overlap status of the selected medical skin image. The data is generated at least partially in response to the determined substantial correspondences. The process includes (v) adding the data indicative of the determined border region-overlap status for the border region segment of the selected medical skin image to an omitted-coverage list. The process includes (vi) iteratively designating a next medical skin image from a plurality of medical skin images as the selected medical skin image until each medical skin image of the plurality of medical skin images has been designated. The process includes (vii) processing of each of the iteratively designated next medical skin images, the processing includes operations (ii), (iii), (iv), and (v). The process includes (viii) identifying a particular portion of the skin surface as likely not included in the plurality of medical skin images (hereafter "possible non-imaged portion of the skin"). The identifying the possible non-imaged portion of the skin is at least partially based on the omitted-coverage list. The process includes (ix) outputting user-assistance information at least partially based on the identified possible non-imaged portion of the skin.

In an embodiment, the computer-readable media 2010 includes tangible computer-readable media 2012. In an embodiment, the computer-readable media includes communications media 2014.

FIG. 32 illustrates an alternative embodiment of the computer program product 2000 of FIG. 31. In an embodiment, the process includes 2022 receiving the plurality of medical skin images. In an embodiment, the process includes 2024 detecting a border region segment of a medical skin image of the plurality of medical skin images. In an embodiment, the process includes 2026 displaying the user-assistance information. In an embodiment, the process includes 2028 maintaining the user-assistance information in computer-readable storage media. In an embodiment, the process includes (i) outputting user-assistance information includes 2029 outputting user-assistance information in substantially real time and at least partially based on the identified possible non-imaged portion of the skin.

Figure 33:
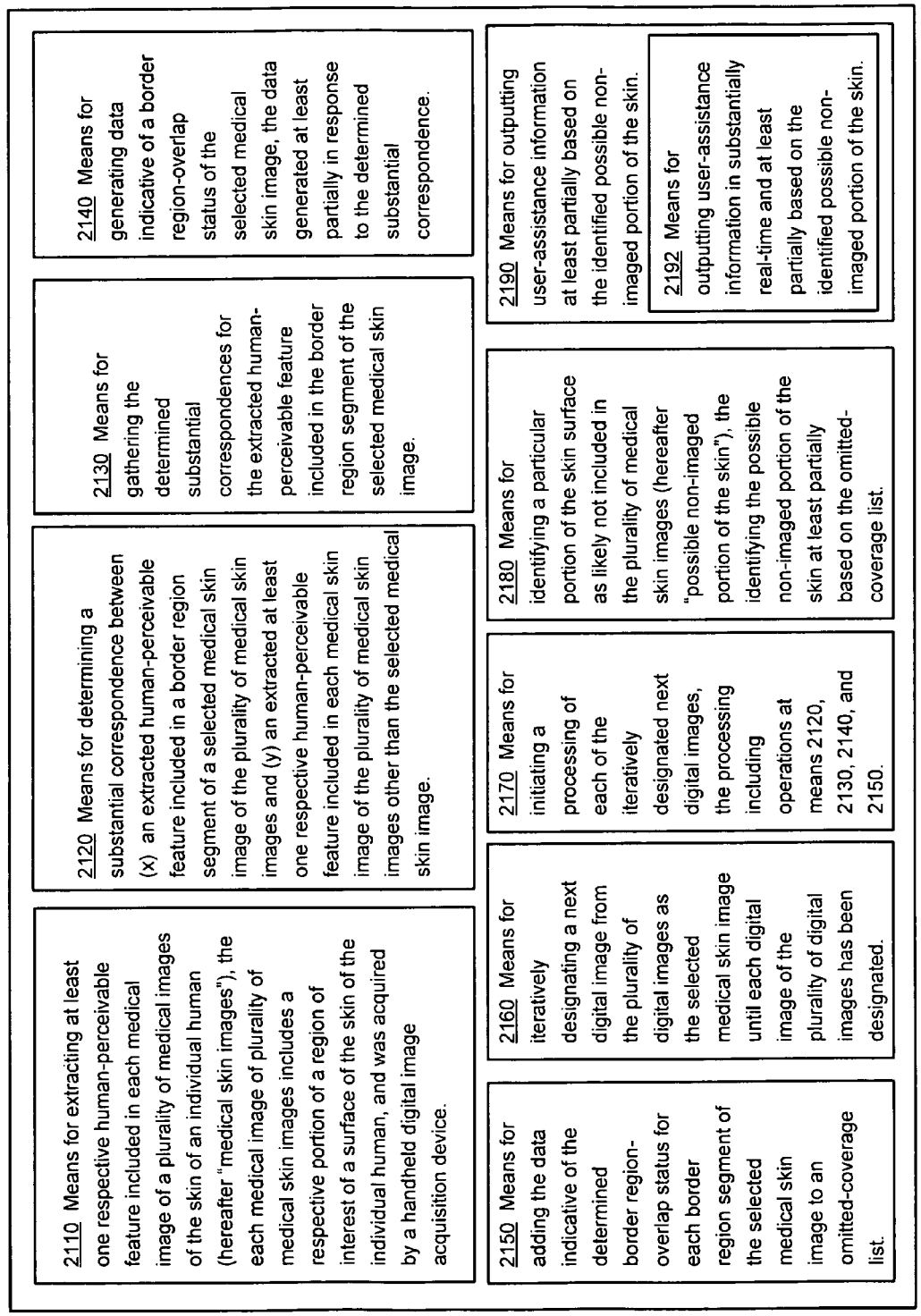
FIG. 33 illustrates an example system.

FIG. 33 illustrates an example system 2100. The system includes means 2110 for extracting at least one respective human-perceivable feature included in each medical image of a plurality of medical images of the skin of an individual human (hereafter "medical skin images"). The each medical image of the plurality of medical skin images includes a respective portion of a region of interest of a surface of the skin of the individual human, and was acquired by a handheld digital image acquisition device. The system includes means 2120 for determining a substantial correspondence between (x) an extracted human-perceivable feature included in a border region segment of a selected medical skin image of the plurality of medical skin images and (y) an extracted at least one respective human-perceivable feature included in each medical skin image of the plurality of medical skin images other than the selected medical skin image. The system includes means 2130 for gathering the determined substantial correspondences for the extracted human-perceivable feature included in the border region segment of the selected medical skin image. The system includes means 2140 for generating data indicative of a border region-overlap status of the selected medical skin image. The data is generated at least partially in response to the determined substantial correspondences. The system includes means 2150 for adding the data indicative of the determined border region-overlap status for the border region segment of the selected medical skin image to an omitted-coverage list. The system includes means 2160 for iteratively designating a next medical skin image from the plurality of medical skin images as the selected medical skin image until each medical skin image of the plurality of medical skin images has been designated. The system includes means 2170 means for initiating a processing of each of the iteratively designated next medical skin images by means

2120, 2130, 2140, and 2150. The system includes means 2180 for identifying a particular portion of the skin surface as likely not included in the plurality of medical skin images (hereafter "possible non-imaged portion of the skin"). The identifying the possible non-imaged portion of the skin is at least partially based on the omitted-coverage list. The system includes means 2190 for outputting user-assistance information at least partially based on the identified possible non-imaged portion of the skin.

In an alternative embodiment, the means 2190 includes means 2192 for outputting user-assistance information in substantially real-time and at least partially based on the identified possible non-imaged portion of the skin.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   (a) a feature-detection circuit configured to extract at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;
   (b) a feature-matching circuit configured to determine a substantial correspondence between
      (x) an extracted human-perceivable feature included in a border region segment of a selected medical skin image of the plurality of medical skin images and
      (y) an extracted at least one respective human-perceivable feature included in the each medical skin image of the plurality of medical skin images other than the selected medical skin image;

(c) a data collection circuit configured to gather the determined substantial correspondences for the human-perceivable feature included in the border region segment of the selected medical skin image; and (d) a reporting circuit configured to output informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

2. The system of claim 1, further comprising:
an image receiver circuit configured to receive the plurality of medical skin images.

3. The system of claim 2, wherein the image receiver circuit includes:
an image receiver circuit configured to retrieve the plurality of medical skin images acquired by the handheld digital image acquisition device from a memory and/or storage device of the handheld digital image acquisition device.

4. The system of claim 2, wherein the image receiver circuit includes:
an image receiver circuit configured to import from third-party device the plurality of medical skin images acquired by the handheld digital image acquisition device.

5. The system of claim 2, wherein the image receiver circuit includes:
an image receiver circuit configured to receive a push of the plurality of medical skin images from the handheld digital image acquisition device.

6. The system of claim 1, wherein the plurality of medical skin images were acquired during an imaging session by the handheld digital image acquisition device.

7. The system of claim 1, wherein the handheld digital image acquisition device includes a handheld digital imaging device configured to capture the plurality of medical skin images.

8. The system of claim 1, wherein the handheld digital image acquisition device includes a handheld digital image acquisition device held by the individual human.

9. The system of claim 1, wherein the handheld digital image acquisition device includes a handheld digital image acquisition device held and operated by a third-party human.

10. The system of claim 1, wherein the reporting circuit includes a reporting circuit configured to output the informational data in substantially real-time.

11. The system of claim 10, wherein the reporting circuit includes:
a reporting circuit configured in cooperation with the feature-detection circuit, the feature-matching circuit, and the data collection circuit to output the informational data in substantially real-time.

12. The system of claim 10, wherein substantially real-time includes while the handheld digital image acquisition device is in motion acquiring the plurality of medical skin images.

13. The system of claim 10, wherein substantially real-time includes less than approximately 15 minutes after the plurality of medical skin images are received by the system.

14. The system of claim 10, wherein substantially real-time is less than approximately 2 minutes after the plurality of medical skin images are received by the system.

15. The system of claim 10, wherein substantially real-time includes less than approximately 30 seconds after the plurality of medical skin images are received by the system.

16. The system of claim 10, wherein substantially real-time includes less than approximately 7 seconds after the plurality of medical skin images are received by the system.

17. The system of claim 10, wherein substantially real-time includes less than approximately 2 seconds after the plurality of medical skin images are received by the system.

18. The system of claim 1, further comprising:
a border region detection circuit configured to detect the border region segment of a medical skin image of the plurality of medical skin images.

19. The system of claim 18, wherein the feature-matching circuit includes:
a feature-matching circuit configured to determine a substantial correspondence between
(x) an extracted human-perceivable feature included in a detected border region segment of a selected medical skin image of the plurality of medical skin images and
(y) an extracted at least one respective human-perceivable feature included in the each medical skin image of the plurality of medical skin images other than the selected medical skin image.

20. The system of claim 1, further comprising:
an overlap-analysis circuit configured to generate data indicative of a border region-overlap status of the selected medical skin image, the data generated at least partially in response to the gathered determined substantial correspondences between the extracted perceivable feature included in the border region segment of the selected medical skin image and the at least one respective perceivable feature included in the each medical skin image of the plurality of medical skin images other than the selected medical skin image.

21. The system of claim 20, wherein the reporting circuit includes:
a reporting circuit configured to output informational data indicative of the border region-overlap status of the selected medical skin image, the informational data at least partially based on the data indicative of a border region-overlap status of the selected medical skin image.

22. The system of claim 1, wherein the system is physically incorporated within the handheld digital image acquisition device.

23. The system of claim 1, wherein the system is configured to wirelessly communicate with the handheld digital image acquisition device.

24. The system of claim 1, further comprising:
a communication device configured to provide a notification at least partially based on the informational data to at least one of a human, computer, or system.

25. The system of claim 1, further comprising:
a communication device configured to display a human-perceivable depiction of the informational data.

26. The system of claim 1, further comprising:
a communication device configured to output a signal usable in displaying a human-perceivable depiction of the informational data.

27. A method implemented in a computing device, the method comprising:
(a) extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;
(b) determining a substantial correspondence between
(x) an extracted human-perceivable feature included in a border region segment of a selected medical skin image of the plurality of medical skin images and
(y) an extracted at least one respective human-perceivable feature included in the each medical skin image of the plurality of medical skin images other than the selected medical skin image;
(c) gathering the determined substantial correspondences for the human-perceivable feature included in the border region segment of the selected medical skin image; and
(d) outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

28. The method of claim 27, wherein the outputting informational data includes:
outputting informational data in substantially real time, the informational data indicative of a possible non-imaged portion of the region of interest of the skin of the individual human adjacent to the selected medical skin image.

29. The method of claim 27, further comprising:
generating data indicative of a border region-overlap status of the selected medical skin image, the data generated at least partially in response to the determined substantial correspondences between the human-perceivable feature included in the border region segment of the selected medical skin image and the extracted at least one respective perceivable feature included in the each medical skin image of the plurality of medical skin images other than the selected medical skin image.

30. The method of claim 27, further comprising:
iteratively designating a next medical skin image from the plurality of medical skin images as the selected medical skin image until each medical skin image of the plurality of medical skin images has been designated, and
initiating a processing of each of the iteratively designated next medical skin image, the processing including operations (b), (c), and (d) of claim 27.

31. The method of claim 27, wherein the outputting informational data includes:
outputting informational data usable in displaying a human-perceivable indication of a possible non-imaged portion of the region of interest of the surface.

32. The method of claim 27, wherein the outputting informational data includes:
transforming the informational data into a particular visual depiction of a possible non-imaged portion of the region of interest of the surface, and outputting the transformed informational data.

33. The method of claim 27, further comprising:
displaying the informational data.

34. The method of claim 27, further comprising:
(e) extracting at least one human-perceivable feature included in a follow-on medical image of the skin of the individual human (hereafter "follow-on medical skin image"), the follow-on medical skin image including an image of a portion of the region of interest of the surface of the skin of the individual human, and acquired by the handheld digital image acquisition device subsequent to the acquisition of the plurality of medical skin images;
(f) determining a substantial correspondence between
(x) an extracted human-perceivable feature included in a border region segment of the follow-on medical skin image and
(y) an extracted at least one human-perceivable feature included in the selected medical skin image;
(g) gathering the determined substantial correspondences for the border region segment of the follow-on medical skin image; and
(h) outputting updated informational data indicative of a possible non-imaged portion of the region of interest of the skin of the individual human adjacent to the selected medical skin image, the informational data responsive to an absence of a determined substantial correspondence for the border region segment of the follow-on medical skin image.

35. A computer program product comprising:
(a) a non-transitory computer-readable medium including program instructions stored thereon which, when executed by a processor of a computing device, cause the computing device to perform a process including:
(i) extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;
(ii) determining a substantial correspondence between
(x) an extracted human-perceivable feature included in a border region segment of a selected medical skin image of the plurality of medical skin images and
(y) an extracted at least one respective human-perceivable feature included in the each medical skin image of the plurality of medical skin images other than the selected medical skin image;
(iii) gathering the determined substantial correspondences for the border region segment of the selected medical skin image; and
(iv) outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

36. The computer program product of claim 35, wherein the process further includes:
receiving the plurality of medical skin images.

37. The computer program product of claim 35, wherein the process further includes:
detecting a border region segment of a medical skin image of the plurality of medical skin images.

38. The computer program product of claim 35, wherein the process further includes:
displaying the informational data.

39. The computer program product of claim 35, wherein the non-transitory computer-readable medium includes a tangible computer-readable media.

40. A system comprising:
- means for extracting at least one respective human-perceivable feature included in each medical image of a plurality of medical images of the skin of an individual human (hereafter "medical skin images"), the each medical image of plurality of medical skin images includes a respective portion of a region of interest of a surface of the skin of the individual human, and was acquired by a handheld digital image acquisition device;
- means for determining a substantial correspondence between
  - (x) an extracted human-perceivable feature included in a border region segment of a selected medical skin image of the plurality of medical skin images and
  - (y) an extracted at least one respective human-perceivable feature included in the each medical skin image of the plurality of medical skin images other than the selected medical skin image;
- means for gathering the determined substantial correspondences for the border region segment of the selected medical skin image; and
- means for outputting informational data indicative of a possible non-imaged portion of the region of interest of the skin of the individual human adjacent to the selected medical skin image, the informational data responsive to an absence of a determined substantial correspondence between the extracted human-perceivable feature included in the border region segment of the selected medical skin image and the extracted at least one respective feature included in the each medical skin image of the plurality of medical skin images other than the selected medical skin image.

* * * * *